(12) United States Patent
Shibagaki

(10) Patent No.: US 6,199,426 B1
(45) Date of Patent: Mar. 13, 2001

(54) METHOD OF DETECTION OF OUTPUT FLUCTUATION IN INTERNAL COMBUSTION ENGINE

(75) Inventor: Nobuyuki Shibagaki, Toyota (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 0 days.

(21) Appl. No.: 08/989,418

(22) Filed: Dec. 12, 1997

(30) Foreign Application Priority Data

Dec. 17, 1996 (JP) .................................................. 8-337297
Dec. 17, 1996 (JP) .................................................. 8-337299

(51) Int. Cl.⁷ .............................. G01L 3/26; G01M 15/00
(52) U.S. Cl. ............................................. 73/117.3; 73/116
(58) Field of Search ................................... 73/117.3, 116; 123/436, 568.27

(56) References Cited

U.S. PATENT DOCUMENTS

| | | |
|---|---|---|
| 4,691,286 | 9/1987 | Obayashi et al. . |
| 4,697,561 | 10/1987 | Citron . |
| 4,744,243 * | 5/1988 | Tanaka ................................ 73/117.3 |
| 5,144,927 | 9/1992 | Denz . |
| 5,200,899 * | 4/1993 | Ribbens et al. ......................... 73/116 |
| 5,574,217 * | 11/1996 | McCombie ............................. 73/116 |
| 5,602,331 * | 2/1997 | Prevost .................................. 73/116 |
| 5,652,380 * | 7/1997 | Machida ................................ 73/116 |
| 5,670,713 * | 9/1997 | Machida et al. ...................... 73/117.3 |

FOREIGN PATENT DOCUMENTS

| | | |
|---|---|---|
| 41-38-765-A1 | 7/1992 | (DE) . |
| 0-709-663-A1 | 5/1996 | (EP) . |
| 2-291459 | 12/1990 | (JP) . |
| 5-1614 | 1/1993 | (JP) . |
| B2 7-33809 | 4/1995 | (JP) . |

* cited by examiner

Primary Examiner—Benjamin R. Fuller
Assistant Examiner—Octavia Davis
(74) Attorney, Agent, or Firm—Oliff & Berridge, PLC

(57) ABSTRACT

An engine in which an elapsed time Ta(i) of 30° crank angle near top dead center of the compression stroke and an elapsed time Tb(i) of 30° crank angle near 90° after top dead center of the compression stroke are found. The difference DTa(i) of the elapsed times Ta(i) in a 720° crank angle range is found for the first cylinder and the second cylinder where combustion is performed after the first cylinder. The assumed elapsed time Tb'(i) assuming that there is no torque fluctuation is calculated from the difference of elapsed times DTa(i) of the first cylinder and the second cylinder and the assumed elapsed time Tb'(i) is used to calculate the amount of torque fluctuation.

19 Claims, 31 Drawing Sheets

| TORQUE FLUCTUATION LEVEL | FEEDBACK CORRECTION VALUE |
|---|---|
| | $+a_4$ |
| LVLH(3) | |
| | $+a_3$ |
| LVLH(2) | |
| | $+a_2$ |
| LVLH(1) | |
| | $+a_1$ |
| LVLLFB | |
| | $-b_1$ |
| LVLL(1) | |
| | $-b_2$ |
| LVLL(2) | |
| | $-b_3$ |
| LVLL(3) | |
| | $-b_4$ |

METHOD OF DETECTION OF OUTPUT FLUCTUATION IN INTERNAL COMBUSTION ENGINE

BACKGROUND OF THE INVENTION

1. Field of the Invention

The present invention relates to a method of detection of output fluctuation in a multi-cylinder engine.

2. Description of the Related Art

Known in the art is an internal combustion engine which finds a first angular velocity of the crankshaft in the time required for the crankshaft to rotate from 30° to 60° after top dead center of the compression stroke from this period, finds a second angular velocity of the crankshaft in the time required for the crankshaft to rotate from 90° to 120° after top dead center of the compression stroke from this time, finds the torque generated by a cylinder from the square of the first angular velocity and the square of the second angular velocity, and calculates the amount of torque fluctuation from the amount of fluctuation of the generated torque (see Japanese Examined Patent Publication (Kokoku) No. 7-33809).

That is, when combustion is performed in a cylinder, the combustion pressure causes the angular velocity of the crankshaft to rise from a first angular velocity $\omega a$ to a second angular velocity $\omega b$. At this time, if the moment of inertia of rotation of the engine is I, the combustion pressure causes the kinetic energy to rise from $(\frac{1}{2}) \cdot I \omega a^2$ to $(\frac{1}{2}) \cdot I \omega b^2$. Roughly speaking, the amount of rise of the kinetic energy $(\frac{1}{2}) \cdot I \cdot (\omega b^2 - \omega a^2)$ causes a torque to be generated, so the generated torque becomes proportional to $(\omega b^2 - \omega a^2)$. Therefore, the generated torque is found from the difference between the square of the first angular velocity $\omega a$ and the square of the second angular velocity $\omega b$ and, therefore, in the above-mentioned internal combustion engine, the amount of torque fluctuation is calculated from the thus found generated torque.

However, if the generated torque is calculated based on the angular velocity $\omega a$ and $\omega b$ in this way, when for example the engine drive system experiences torsional vibration, the generated torque calculated based on the angular velocities $\omega a$ and $\omega b$ will no longer express the true generated torque. That is, when the engine drive system does not experience a torsional vibration, the second angular velocity $\omega b$ increases from the first angular velocity $\omega a$ by exactly the amount of increase of the angular velocity caused by the combustion pressure. As opposed to this, when the engine drive system experiences a torsional vibration, the second angular velocity $\omega b$ will include in addition to the amount of increase of the angular velocity caused by the combustion pressure the amount of change of the angular velocity caused by the torsional vibration of the engine drive system in the period from detection of the first angular velocity $\omega a$ to detection of the second angular velocity $\omega b$. For example, if the angular velocity increased due to the torsional vibration of the engine drive system in the period from detection of the first angular velocity $\omega a$ to detection of the second angular velocity $\omega b$, the amount of increase of the second angular velocity $\omega b$ with respect to the first angular velocity $\omega a$ will include in addition to the amount of increase of the angular velocity due to the combustion pressure the amount of increase of the angular velocity due to the torsional vibration of the engine drive system. Therefore, even if the amount of increase of the second angular velocity $\omega b$ due to the combustion pressure is constant when a torsional vibration occurs in the engine drive system, that is, even when there is no change in the generated torque, the generated torque calculated based on the angular velocities $\omega a$, $\omega b$ will fluctuate and therefore there will be the problem that it will not be possible to calculate the true torque fluctuation.

SUMMARY OF THE INVENTION

An object of the present invention is to provide a method of detection of output fluctuation in a multi-cylinder engine which is capable of accurately detecting an output fluctuation and a torque fluctuation of an engine.

According to the present invention, there is provided a method of detection of output fluctuation of a multi-cylinder engine in which combustion is performed in a first cylinder and then combustion is performed in a second cylinder, comprising the steps of setting a first crank angle range in a crank angle region from the end of a compression stroke to the beginning of an expansion stroke for each cylinder, setting a second crank angle range in a crank angle region in the middle of the expansion stroke a predetermined crank angle away from the first crank angle range, detecting a first angular velocity of the crankshaft in the first crank angle range, detecting a second angular velocity of the crankshaft in the second crank angle range, finding an amount of change between the first angular velocity at the time of a previous combustion and the first angular velocity at the time of a next combustion for the first cylinder, finding an amount of change between the first angular velocity at the time of a previous combustion and the first angular velocity at the time of a next combustion for the second cylinder, finding an assumed second angular velocity at the time of the next combustion of the first cylinder when assuming that the output of the first cylinder will not fluctuate, on the basis of the amount of change of the first angular velocity for the first cylinder, the amount of change of the first angular velocity of the second cylinder, and the second angular velocity at the time of the previous combustion of the first cylinder, and detecting the output fluctuation of the first cylinder based on the assumed second angular velocity and the actual second angular velocity at the time of the next combustion of the first cylinder.

BRIEF DESCRIPTION OF THE DRAWINGS

The present invention may be more fully understood from the description of the preferred embodiments of the invention set forth below together with the accompanying drawings, in which.

DESCRIPTION OF THE PREFERRED EMBODIMENTS

Figure 1:
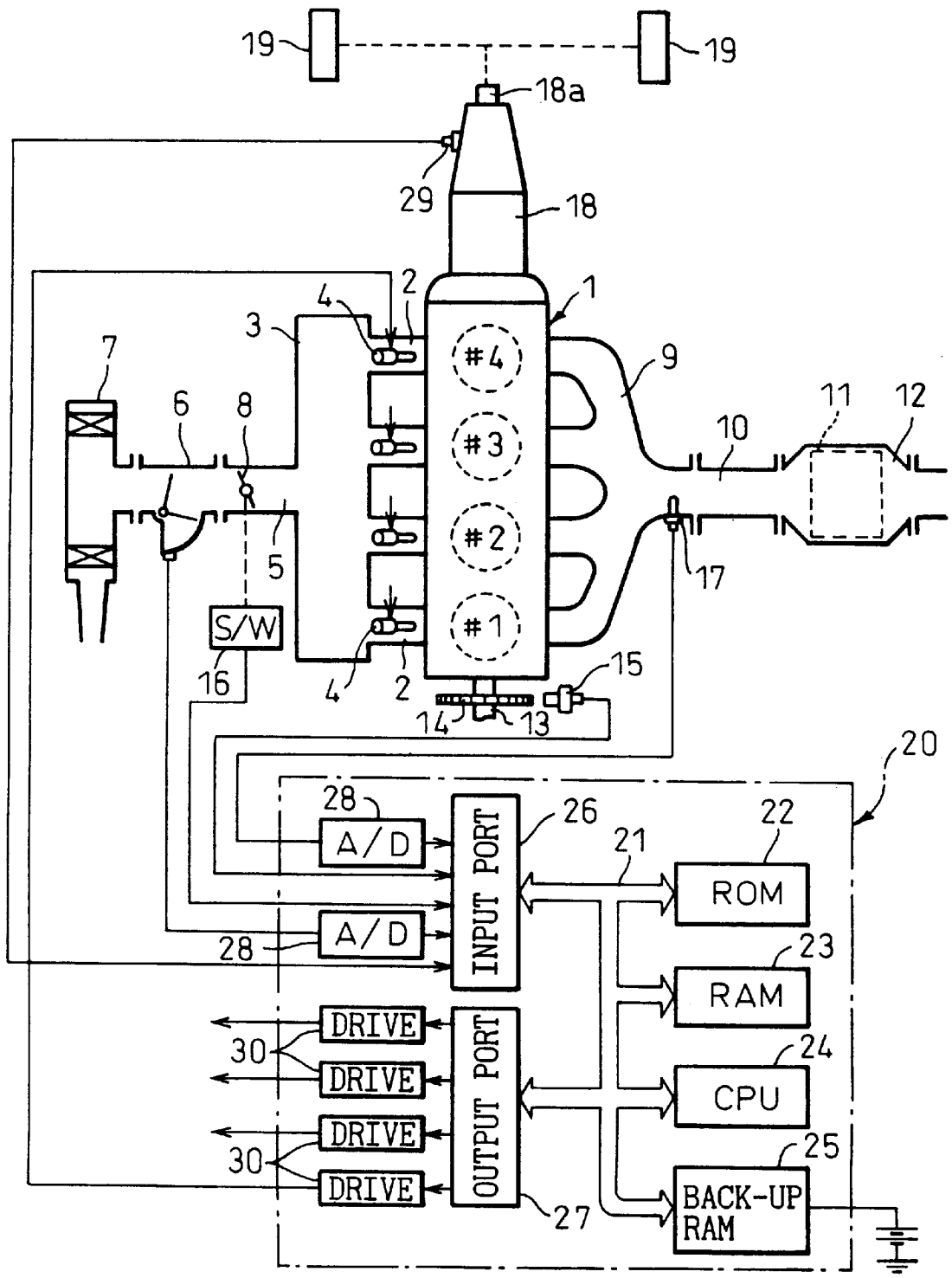
FIG. 1 is an overall view of an internal combustion engine.

Referring to FIG. 1, 1 shows an engine body provided with four cylinders consisting of the No. 1 cylinder #1, No. 2 cylinder #2, No. 3 cylinder #3, and No. 4 cylinder #4. The cylinders #1, #2, #3, and #4 are respectively connected through the corresponding intake pipes 2 to a surge tank 3. In the intake tubes 2 are provided fuel injectors 4 for injecting fuel toward the corresponding intake ports. The surge tank 3 is connected through an intake duct 5 and an air flow meter 6 to an air cleaner 7. In the intake duct 5, a throttle valve 8 is arranged. On the other hand, the cylinders #1, #2, #3, and #4 are connected through an intake manifold 9 and an exhaust pipe 10 to a casing 12 accommodating an NOx absorbent 11. This NOx absorbent 11 has the function of absorbing the NOx included in the exhaust gas when the air-fuel ratio is lean and discharging and reducing the absorbed NOx when the air-fuel ratio is the stoichiometric air-fuel ratio or rich.

The electronic control unit 20 is comprised of a digital computer and is provided with a ROM (read only memory) 22, a RAM (random access memory) 23, a CPU (microprocessor) 24, a backup RAM 25 connected to a constant power supply, an input port 26, and an output port 27 connected with each other by a bidirectional bus 21. The output shaft 13 of the engine has attached to it a rotor 14 with outer teeth. A crank angle sensor 15 comprising an electromagnetic pickup is arranged facing the outer teeth of the rotor 14. As shown in FIG. 1, in this embodiment, the rotor 14 has an outer tooth formed on its periphery at every 30° crank angle and, for example, has part of the outer teeth removed for detecting the top dead center of the compression stroke of the No. 1 cylinder. Therefore, except for the portion where the outer teeth are removed, that is, the non-tooth portion, the crank angle sensor 15 generates an output pulse every time the output shaft 13 turns by 30° crank angle. This output pulse is input to the input port 26.

The air flow meter 6 generates an output voltage proportional to the amount of intake air. This output voltage is input through a corresponding A/D converter 28 to the input port 26. Further, the throttle valve 8 has attached to it an idle switch 16 for detecting when the throttle valve 8 is at the idling opening position. The output signal of this idle switch 16 is input to the input port 26. Further, the intake manifold 9 has disposed in it an air-fuel ratio sensor ($O_2$ sensor) 17 for detecting the air-fuel ratio. The output signal of this air-fuel ratio sensor 17 is input through the corresponding AD converter 28 to the input port 26. Further, the engine body 1 has a transmission 18 attached to it. The output shaft 18a of the transmission 18 is connected to drive shafts 19. The transmission 18 also has attached to it a vehicle speed sensor 29 for generating an output pulse proportional to the vehicle speed. The output pulse of the vehicle speed sensor 29 is input to the input port 26. On the other hand, the output port 27 is connected through the corresponding drive circuit 30 to the fuel injectors 4.

In the internal combustion engine shown in FIG. 1, the fuel injection time TAU is calculated based on the following equation:

$$TAU=TP \cdot FLEAN \cdot FLLFB \cdot FAF+TAUV$$

Here, TP shows a basic fuel injection time, FLEAN a lean correction coefficient, FLLFB a lean limit feedback correction coefficient, FAF a stoichiometric air-fuel ratio feedback correction coefficient, and TAUV an invalid injection time.

The basic fuel injection time TP shows the injection time required for making the air-fuel ratio the stoichiometric air-fuel ratio. This basic fuel injection time TP is found from experiments. This basic fuel injection time TP is stored in the ROM 22 in advance in the form of a map shown in FIG. 2 as a function of the engine load Q/N (amount of intake air Q/engine speed N) and the engine speed N.

The lead correction coefficient FLEAN is a correction coefficient for making the air-fuel ratio a lean air-fuel ratio. This lean correction coefficient FLEAN is stored in advance in the ROM 22 in the form of the map shown in FIG. 4 as a function of the engine load Q/N and the engine speed N.

Figure 5:
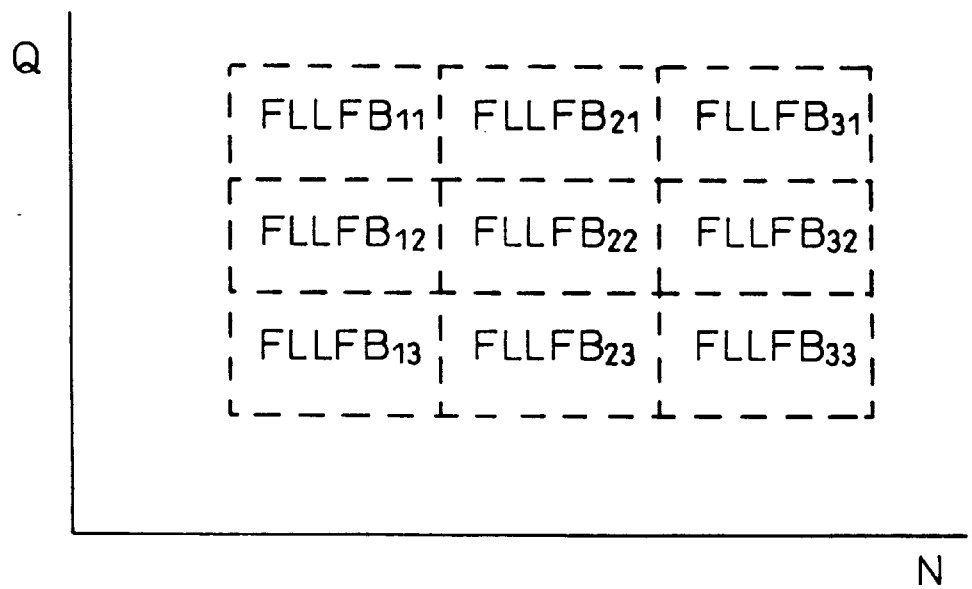
FIG. 5 is a view of a map of a lean limit feedback correction coefficient.

The lean limit feedback correction coefficient FLLFB is a correction coefficient for maintaining the air-fuel ratio at the lean limit. In this embodiment according to the present invention, the learning region for the lean air-fuel ratio feedback control for the amount of intake air Q and the engine speed N is divided into nine regions as shown in FIG. 5 for example. Lean limit feedback correction coefficients $FLLFB_{11}$ to $FLLFB_{33}$ are set for the learning regions.

The stoichiometric air-fuel ratio feedback correction coefficient FAF is a coefficient for maintaining the air-fuel ratio at the stoichiometric air-fuel ratio. The stoichiometric air-fuel ratio feedback correction coefficient FAF is controlled based on the output signal of the air-fuel ratio sensor 17 so as to maintain the air-fuel ratio at the stoichiometric air-fuel ratio. At this time, the stoichiometric air-fuel ratio feedback correction coefficient FAF varies substantially about 1.0.

Figure 4:
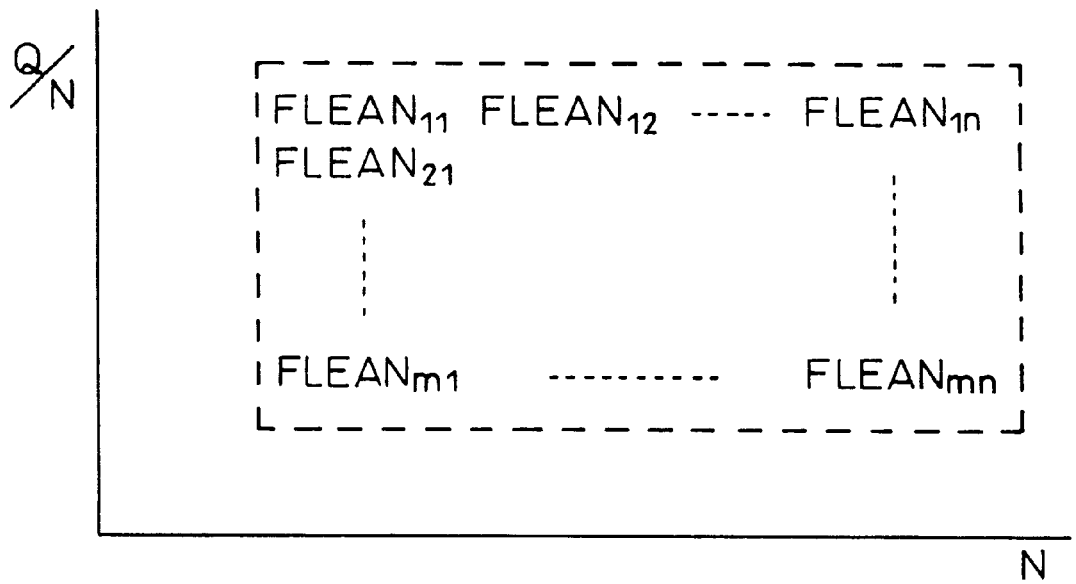
FIG. 4 is a view of a map of a lean correction coefficient.

The lean correction coefficient FLEAN is set in accordance with the operating state of the engine for the operating region enclosed by the broken lines in FIG. 4. In this operating region, the air-fuel ratio is maintained at the lean air-fuel ratio. As opposed to this, in the operating region outside the region enclosed by the broken line in FIG. 4, the air-fuel ratio is maintained at the stoichiometric air-fuel ratio. When the air-fuel ratio is to be maintained at the stoichiometric air-fuel ratio, the lean correction coefficient FLEAN and the lean limit feedback correction coefficient FLLFB are fixed at 1.0 and the stoichiometric air-fuel ratio feedback correction coefficient FAF is controlled based on the output signal of the air-fuel ratio sensor 17.

On the other hand, when the air-fuel ratio is to be maintained at the lean air-fuel ratio, the stoichiometric air-fuel ratio feedback correction coefficient FAF is fixed at 1.0, that is, the feedback control based on the output signal of the air-fuel ratio sensor 17 is stopped, and the lean correction coefficient FLEAN and the lean limit feedback correction coefficient FLLFB are used to control the air-fuel ratio to the lean air-fuel ratio.

Figure 3:
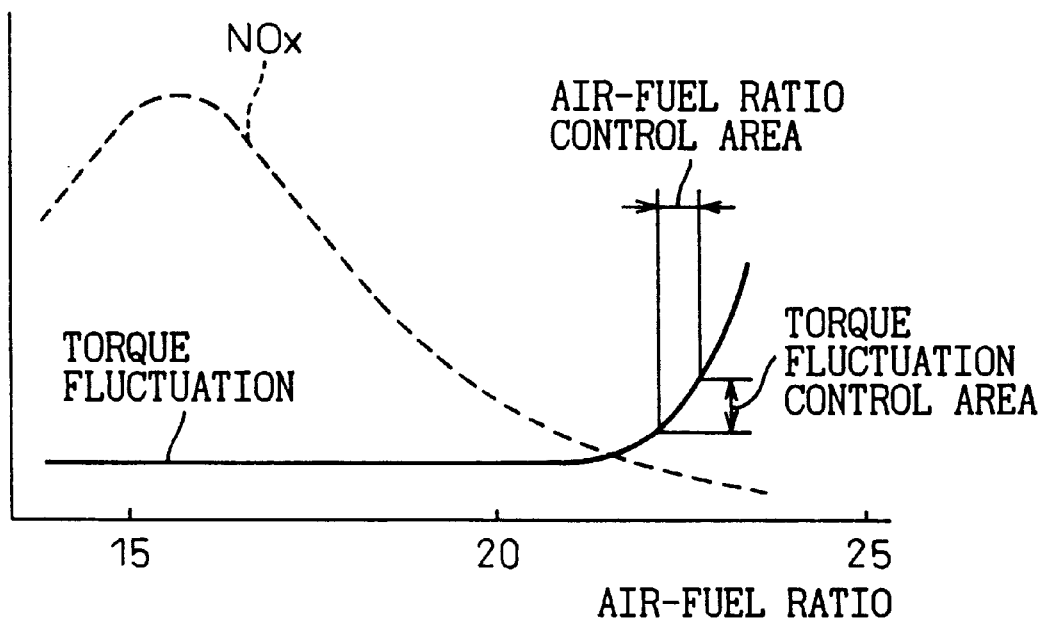
FIG. 3 is a view of the amount of generation of NOx and torque fluctuation.

Next, the lean limit feedback control will be explained referring to FIG. 3. FIG. 3 shows the relationship between the amount of torque fluctuation of the engine output and the amount of generation of NOx and the air-fuel ratio. The leaner the air-fuel ratio, the smaller the fuel consumption rate. Further, the leaner the air-fuel ratio, the smaller the amount of generation of NOx. Therefore, viewed from these points, the air-fuel ratio should desirably be made as lean as possible. Note, however, that when the air-fuel ratio becomes leaner than a certain extent, the combustion becomes unstable and, as a result, as shown in FIG. 3, the amount of torque fluctuation becomes large. Therefore, in this embodiment according to the present invention, as shown in FIG. 3, the air-fuel ratio is maintained in the air-fuel ratio control region where the torque fluctuation starts to increase.

That is, explaining this in more detail, the lean correction coefficient FLEAN is determined so that the air-fuel ratio becomes the middle of the air-fuel ratio control region shown in FIG. 3 when the lean limit feedback correction coefficient FLLFB is made 1.0. On the other hand, the lean limit feedback correction coefficient FLLFB is controlled to within the torque fluctuation control region shown in FIG. 3 in accordance with the amount of torque fluctuation. When the amount of torque fluctuation becomes larger, the lean limit feedback correction coefficient FLLFB is increased, that is, the air-fuel ratio is made smaller, while when the amount of torque fluctuation becomes smaller, the lean limit feedback correction coefficient FLLFB is reduced, that is, the air-fuel ratio is made larger. In this way, the air-fuel ratio is controlled to within the air-fuel ratio control region shown in FIG. 3.

Note that the lean limit feedback correction coefficient FLLFB is set to cover the engine operating region where the lean correction coefficient FLEAN is set.

If the amount of torque fluctuation is controlled to within the torque fluctuation control region shown in FIG. 3, an excellent drivability of the vehicle may be ensured while the fuel consumption rate and the amount of generation of NOx can be greatly reduced. However, since the amount of torque fluctuation is controlled to be within the torque fluctuation control region in this way, the amount of torque fluctuation must be detected.

Various methods have been proposed in the past for calculating the amount of torque fluctuation. Mentioning typical ones, there are the method of providing a combustion pressure sensor in the combustion chamber and calculating the amount of torque fluctuation based on the output signal of this combustion pressure sensor or the method of, as explained at the beginning, calculating the amount of torque fluctuation from the difference between the square of the first angular velocity $\omega a$ and the square of the second angular velocity $\omega b$.

If a combustion pressure sensor is used, there is the advantage that the torque generated in the cylinder provided with the combustion pressure sensor can be reliably detected, but there is conversely the disadvantage that the combustion pressure sensor is required. As opposed to this, the angular velocities $\omega a$ and $\omega b$ can be calculated from the output signal of the crank angle sensor provided in the internal combustion engine in the past, so when calculating the output torque based on the angular velocities $\omega a$ and $\omega b$, there is the advantage that there is no need to mount a new sensor. However, in this case, as explained at the beginning, if the engine drive system experiences torsional vibration, there is the problem that the generated torque can no longer be accurately detected. It is clear, however, that if this problem could just be solved, then the method of calculation of the torque based on the angular velocity, which does not require a new sensor, would be preferable. Therefore, the present invention calculates the generated torque based on the angular velocities and thereby can accurately detect the amount of torque fluctuation even if the engine drive system experiences torsional vibration.

Next, the new method according to the present invention for calculating the output fluctuation and torque fluctuation of the engine.

Figure 6A:
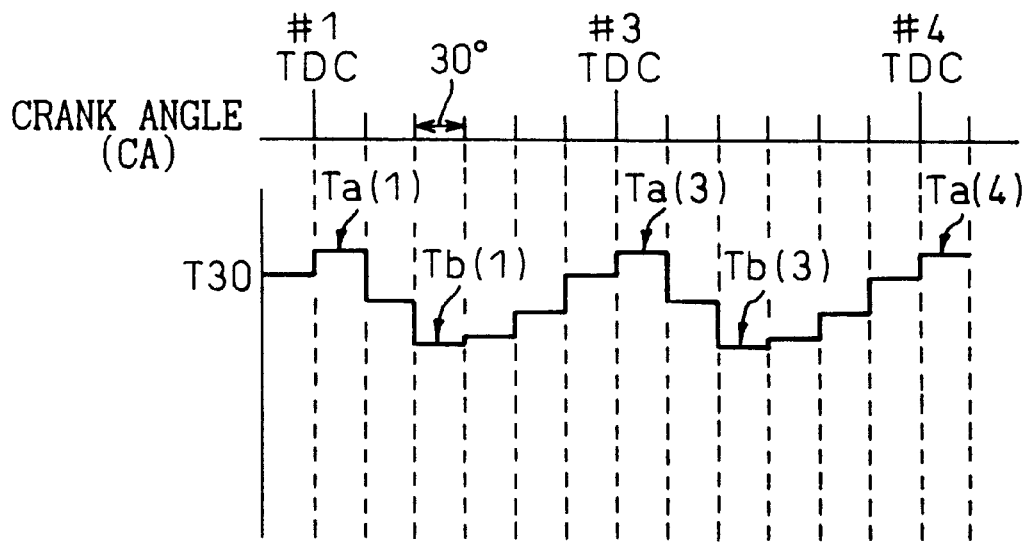
FIGS. 6A and 6B are time charts of the changes in the elapsed times Ta(i) and Tb(i) of 30° crank angle.
Figure 6B:
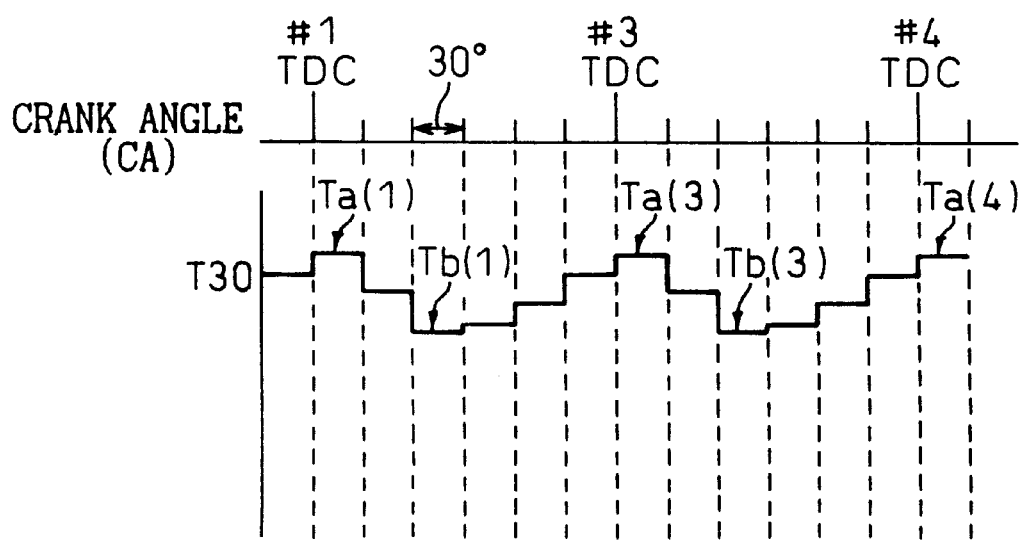

First, the method of calculating the drive force generated by each cylinder and the torque generated in each cylinder will be explained while referring to FIGS. 6A and 6B showing the steady operating state where the engine drive system does not experience torsional vibration. As explained above, the crank angle sensor 15 produces an output pulse each time the crankshaft rotates by 30° crank angle. Further, the crank angle sensor 15 is arranged to generate an output pulse at the top dead center TDC of the compression stroke of the cylinders #1, #2, #3,and #4. Therefore, the crank angle sensor 15 produces an output pulse for each 30° crank angle from the top dead center TDC of the compression stroke of the cylinders #1, #2, #3,and #4. Note that, the ignition sequence of the internal combustion engine used in the present invention is 1-3-4-2.

In FIGS. 6A and 6B, the vertical axis T30 shows the elapsed time of 30° crank angle from when the crank angle sensor 15 produces an output pulse to when it produces the next output pulse. Further, Ta(i) shows the elapsed time from the top dead center of the compression stroke (hereinafter referred to as TDC) to 30° after top dead center of the compression stroke (hereinafter referred to as ATDC) of the No. i cylinder, while Tb(i) shows the elapsed time from ATDC 60° to ATDC 90° of the No. i cylinder. Therefore, for example, Ta(1) shows the elapsed time from TDC to ATDC 30° of the No. 1 cylinder, while Tb(1) shows the elapsed time from ATDC 60° to ATDC 90° of the No. 1 cylinder. On the other hand, if the 30° crank angle is divided by the elapsed time T30, the result of the division shows the angular velocity ω. In this embodiment according to the present invention, 30° crank angle/Ta(i) is referred to as the first angular velocity ωa in the No. i cylinder, while 30° crank angle /Tb(i) is referred to as the second angular velocity ωb in the No. i cylinder. Therefore, 30° crank angle/Ta(1) shows the first angular velocity ωa of the No. 1 cylinder, while 30° crank angle/Tb(1) shows the second angular velocity ωb of the No. 1 cylinder.

Taking note of the No. 1 cylinder of FIGS. 6A and 6B, when the combustion is started and the combustion pressure rises, the elapsed time falls from Ta(1) to Tb(1) then rises from Tb(1). In other words, the angular velocity ω of the crankshaft rises from the first angular velocity ωa to the second angular velocity ωb, then falls again from the second angular velocity ωb. That is, the combustion pressure causes the angular velocity ω of the crankshaft to increase from the first angular velocity ωa to the second angular velocity ωb. FIG. 6A shows the case where the combustion pressure is relatively high, while FIG. 6B shows the case where the combustion pressure is relatively low. As shown in FIGS. 6A and 6B, when the combustion pressure is high, the amount of reduction of the elapsed time (Ta(i)–Tb(i)) becomes larger compared with when the combustion pressure is low, therefore the amount of increase (ωb–ωa) of the angular velocity ω becomes larger. When the combustion pressure becomes higher, the drive force generated by the cylinder becomes larger, therefore if the amount of increase (ωb–ωa) of the angular velocity ω becomes larger, the drive force generated by the cylinder becomes larger. Therefore, it is possible to calculate the drive force generated by a cylinder from the difference (ωb–ωa) between the first angular velocity ωa and the second angular velocity ωb.

On the other hand, if the moment of inertia of rotation of the engine is I, the combustion pressure causes the kinetic energy to increase from $(\frac{1}{2})I\omega a^2$ to $(\frac{1}{2})I\omega b^2$. The amount of increase of the kinetic energy $(\frac{1}{2}) \cdot I' (\omega b^2 - \omega a^2)$ expresses the torque generated by that cylinder, therefore it becomes possible to calculate the torque generated by a cylinder from the difference $(\omega b^2 - \omega a^2)$ between the square of the first angular velocity ωa and the square of the second angular velocity ωb.

By detecting the first angular velocity ωa and the second angular velocity ωb in this way, it becomes possible to calculate the drive force generated by the corresponding cylinder and the torque generated by the corresponding cylinder from the detected values. Note that the change in the elapsed time T30 shown in FIGS. 6A and 6B differs somewhat depending on the engine, therefore the crank angle range for detecting the first angular velocity ωa and the crank angle range for detecting the second angular velocity ωb are set in accordance with the engine so that (ωb–ωa) best expresses the drive force generated by the engine or so that $(\omega b^2 - \omega a^2)$ best expresses the torque generated by the engine. Therefore, depending on the engine, the crank angle range for detecting the first angular velocity ωa may be from before the top dead center of the compression stroke BTDC 30° to TDC, while the crank angle range for detecting the second angular velocity ωb may be from ATDC 90° to ATDC 120°.

Therefore, explaining the method of detecting the angular velocities ωa and ωb in general terms, the first crank angle range is set in the crank angle region from the end of the compression stroke to the beginning of the expansion stroke, the second crank angle range is set in a crank angle region in the middle of the expansion stroke a predetermined crank away from the first crank angle range, the first angular velocity ωa of the crankshaft in the first crank angle range is detected, and the second angular velocity of the crankshaft ωb in the second crank angle range is detected.

As explained above, by detecting the angular velocities ωa and ωb, it becomes possible to calculate the drive force and the torque generated by a corresponding cylinder based on the detected values. The engine drive system, however, experiences torsional vibration occurring at the natural frequency of the drive system due to the successive explosive actions of the cylinders. If the engine drive system experiences such torsional vibration, it no longer becomes possible to accurately detect the drive force and the torque generated by a cylinder based on the angular velocities ωa and ωb. Next, this will be explained with reference to FIG. 7 and FIG. 8.

Figure 7:
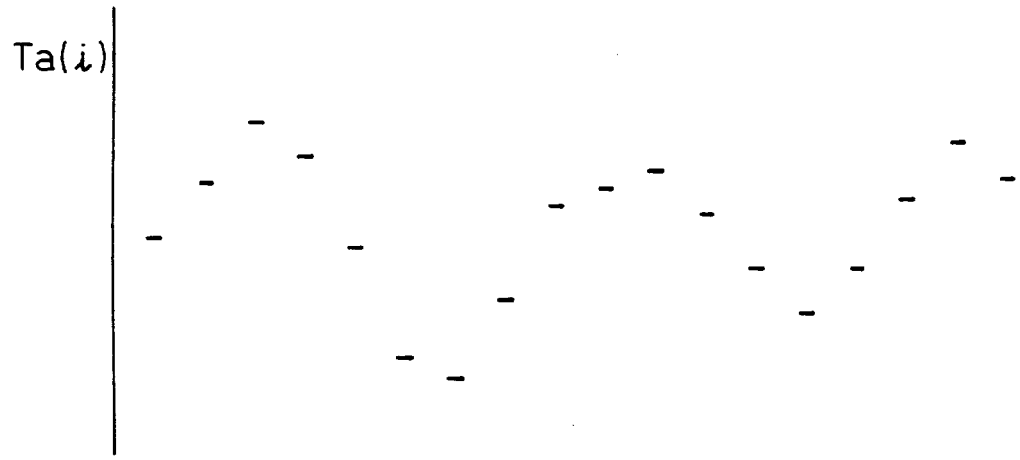
FIG. 7 is a time chart of the changes in the elapsed time Ta(i) of 30° crank angle.

FIG. 7 shows the changes in the elapsed time Ta(i) successively calculated for each cylinder when the engine drive system experiences torsional vibration. When the engine drive system experiences torsional vibration, this torsional vibration causes the angular velocity of a crankshaft to be cyclically increased and decreased, so the elapsed time Ta(i) increases and decreases cyclically as shown in FIG. 7.

Figure 8:
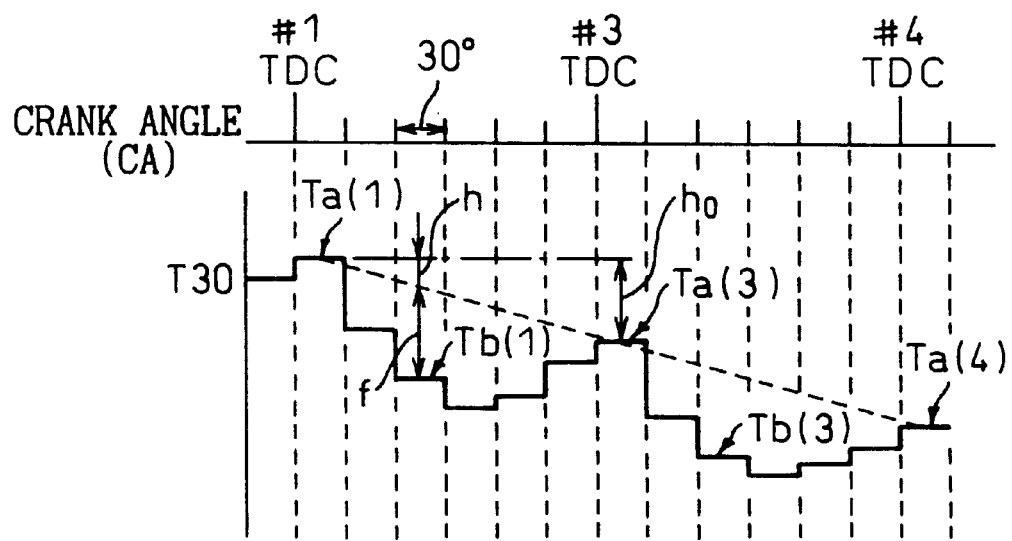
FIG. 8 is a time chart of the changes in the elapsed times Ta(i) and Tb(i) of 30° crank angle.

On the other hand, FIG. 8 shows the portion where the elapsed time Ta(i) is reduced in an enlarged manner. As shown in FIG. 8, the elapsed time Ta(i) falls by exactly the time $h_0$ between Ta(1) and Ta(3). This reduction of the time $h_0$ is believed to be due to an increase in the amount of torsion due to the torsional vibration. In this case, the amount of decrease of the elapsed time due to the torsional vibration between Ta(1) and Ta(3) is believed to increase substantially linearly along with the elapse of time, therefore this amount of decrease of the elapsed time due to the torsional vibration is shown by the difference between the broken line connecting Ta(1) and Ta(3) and the horizontal line passing through Ta(1). Therefore, between Ta(1) and Tb(1), the torsional vibration causes the elapsed time to fall by exactly h.

In this way, when torsional vibration occurs in the engine drive system, Tb(1) is lower in elapsed time than Ta(1), but this lower elapsed time includes the amount of decrease f of the elapsed time due to the combustion pressure and the amount of decrease h of the elapsed time due to the torsional vibration. Therefore, to find just the elapsed time Tb'(1) decreased due to the combustion pressure, it becomes necessary to add h to Tb(1). That is, even if finding the drive force or torque generated by each cylinder based on the detected elapsed time Ta(i) and Tb(i), it is not possible to find the true drive output or torque and therefore not possible to find the true output fluctuation or torque fluctuation of the engine.

Further, in a multi-cylinder internal combustion engine, in addition to the torsional vibration of the engine drive system, there is torsional vibration of the crankshaft itself. When this torsional vibration of the crankshaft itself occurs, it is no longer possible to find the true output fluctuation or torque fluctuation of the engine. Next, this will be explained with reference to FIG. 9.

Figure 9:
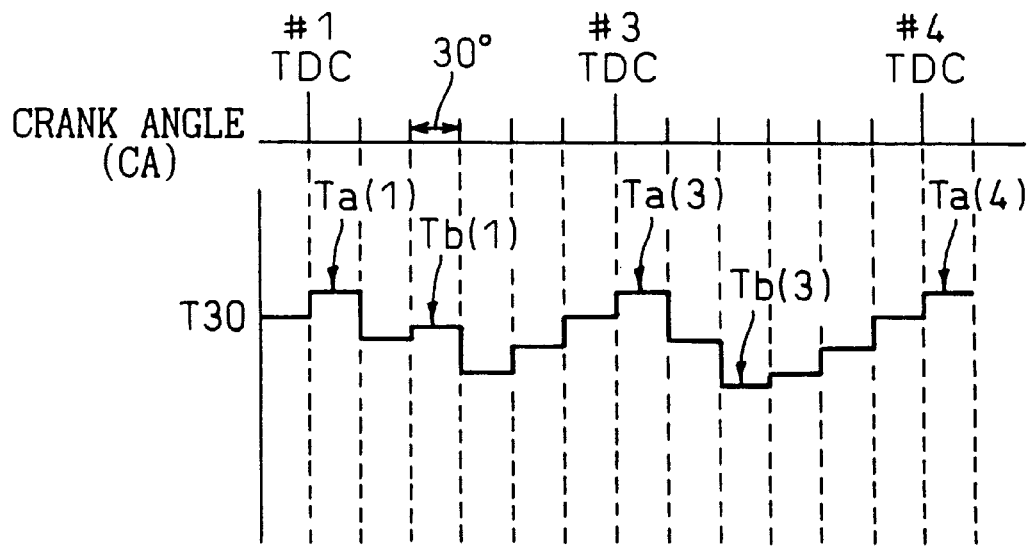
FIG. 9 is a time chart of the changes in the elapsed times Ta(i) and Tb(i) of 30° crank angle.

In a multi-cylinder internal combustion engine, for example, a four-cylinder internal combustion engine as shown in FIG. 1, a large torsional vibration occurs in the No. 1 cylinder and the No. 2 cylinder. That is, in a cylinder where almost no torsional vibration of the crankshaft itself occurs, for example, the No. 3 cylinder #3, as shown in FIG. 9, the elapsed time gradually falls from Ta(3) to Tb(3), but in the No. 1 cylinder #1, the elapsed time does not gradually fall from Ta(1) to Tb(1) and the torsional vibration of the crankshaft itself causes the elapsed time Tb(1) to become longer. As a result, it is not possible to find the true drive force or torque for the No. 1 cylinder #1 even if finding the drive force or torque generated by the No. 1 cylinder #1 based on the detected elapsed times Ta(1) and Tb(1), therefore it is not possible to find the true output fluctuation or torque fluctuation of the engine.

Therefore, in the present invention, use is made of a new method of calculation which enables calculation of the true output fluctuation and torque fluctuation of the engine even if torsional vibration of the engine drive system occurs and even if torsional vibration of the crankshaft occurs. Next, this new method of calculation will be explained with reference to FIG. 10.

Figure 10:
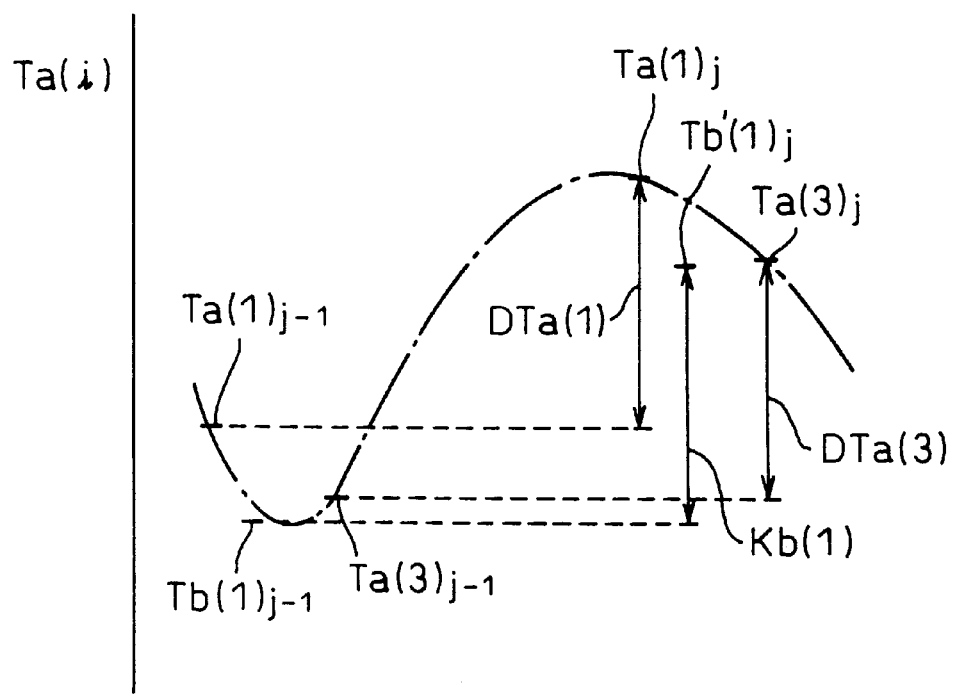
FIG. 10 is a time chart of the changes in the elapsed time Ta(i) of 30° crank angle.

In FIG. 10, $Ta(1)_{j-1}$ and $Tb(1)_{j-1}$ show the elapsed times at the time of the previous combustion of the No. 1 cylinder #1. $Ta(1)_j$ and $Tb(1)_j$ show the elapsed times at the time of the next combustion of the No. 1 cylinder #1. On the other hand, $Ta(3)_{j-1}$ shows the elapsed time at the time of the previous combustion of the No. 3 cylinder #3 performed after the previous combustion of the No. 1 cylinder #1, while $Ta(3)_j$ shows the elapsed time at the time of the next combustion of the No. 3 cylinder #3.

First, the difference DTa(1) ($=Ta(1)_j-Ta(1)_{j-1}$) between $Ta(1)_j$ and $Ta(1)_{j-1}$ and the difference DTa(3) ($=Ta(3)_j-Ta(3)_{j-1}$) between $Ta(3)_j$ and $Tb(3)_{j-1}$ are found. Next, the assumed elapsed time from ATDC 60° to ATDC 90° at the time of the next combustion of the No. 1 cylinder #1, when assuming that the output torque at the time of the previous combustion of the No. 1 cylinder #1 and the output torque at the time of the next combustion are identical, is made Tb'(1) and the difference Kb(1) ($=Tb'(1)_j-Tb(1)_{j-1}$) between $Tb'(1)_j$ and $Tb(1)_{j-1}$ is found. The differences DTa (1), Kb(1), and DTa(3) become as shown in FIG. 11 when rewritten as heights on a straight line.

Figure 11:
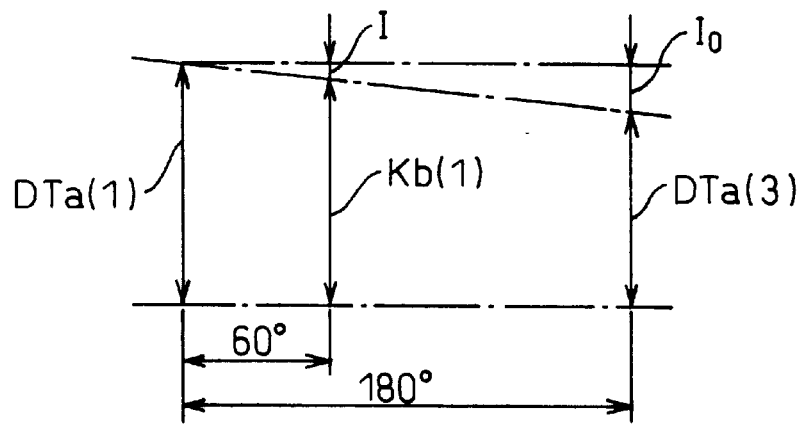
FIG. 11 is a view of the relationship between the differences of elapsed times DTa(i) and K(b(i)

The difference of elapsed times falls by exactly the time $I_0$ between the differences of elapsed times DTa(1) and DTa(3) as shown in FIG. 11. Even if torsional vibration occurs in the crankshaft itself, the effect of the torsional vibration does not appear in the difference of the elapsed times and therefore the decrease of the time $I_0$ in the difference of elapsed times is due to the torsional vibration of the drive system. In this case, the amount of decrease of the difference of elapsed times due to the torsional vibration of the engine drive system may be considered to increase substantially linearly along with the elapse of time between DTa(1) and DTa(3). Therefore, if it is assumed that the output torque at the time of the previous combustion of the No. 1 cylinder #1 and the output torque at the time of the next combustion are identical, the difference of elapsed times can be considered to decrease by exactly I due to the torsional vibration of the engine drive system between the differences of elapsed times DTa(1) and Kb(1). Therefore, as will be understood from FIG. 11, the assumed difference of elapsed times Kb(1) when assuming that the output torque at the time of previous combustion of the No. 1 cylinder #1 and the output torque at the time of the next combustion are identical is expressed as an interpolated value from DTa(1) and DTA(3) and becomes as shown in the following equation:

$$Kb(1)=(2DTa(1)+DTa(3))/3$$

The assumed elapsed time $Tb'(1)_j$ of the No. 1 cylinder #1 when assuming that the output torque at the time of the previous combustion of the No. 1 cylinder #1 and the output torque at the time of the next combustion are identical is expressed as follows:

$$Tb'(1)_j=Tb(1)_{j-1}+Kb(1)$$

Therefore, the assumed output torque DNS(1) at the time of the next combustion of the No. 1 cylinder #1 when assuming that the output torque at the time of the previous combustion of the No. 1 cylinder #1 and the output torque at the time of the next combustion are identical is expressed as follows:

$$DNS(1) = \{30°/Tb'(1)_j\}^2 - \{30°/Ta(1)_j\}^2$$
$$= \{30°/Tb(1)_{j-1} + Kb(1)\}^2 - \{30°/Ta(1)_j\}^2$$

On the other hand, when calculating the actual output torque using the actual elapsed time $Tb(1)_j$ from ATDC 60° to ATDC 90° at the time of the next combustion of the No. 1 cylinder #1, the output torque DNS(1) is expressed by the following equation:

$$DNS(1)=\{30°/Tb(1)_j\}^2-\{30°/Ta(1)_j\}^2$$

In this case, the difference between the assumed output torque DNS(1) of the No. 1 cylinder #1 and the actual output torque DN(1) shows the amount of torque fluctuation of the No. 1 cylinder #1. Therefore, the amount of torque fluctuation DLN(1) of the No. 1 cylinder #1 is shown by the following equation:

$$DLN(1)=DNS(1)-DN(1)=\{30°/Tb'(1)_j\}^2-\{30°/Tb(1)_j\}^2$$

Expressed generally, the amount of torque fluctuation DLN(i) of the No. i cylinder can be shown by the following equation:

$$DLN(i)=DNS(i)-DN(i)=\{30°/Tb'(i)\}^2-\{30°/Tb(i)_j\}^2$$

That is, the amount of torque fluctuation of the No. i cylinder can be found from the error between the square of the assumed second angular velocity of the No. i cylinder and the square of the actual second angular velocity. By calculating the amount of torque fluctuation by this method, even if torsional vibration occurs in the engine drive system, it is possible to accurately detect the amount of torque fluctuation of the cylinders even if torsional vibration occurs in the crankshaft itself.

On the other hand, when calculating the amount of torque fluctuation by this method, it is not possible to accurately detect the amount of torque fluctuation of the cylinders if there is a variation in the spaces of the outer teeth formed along the outer circumference of the rotor 14 (FIG. 1). Therefore, in this embodiment of the present invention, even if there is a variation in the spaces of the outer teeth of the rotor 14, it is made possible to correct the elapsed times Ta(i), Tb(i) detected so as to enable accurate detection of the amount of torque fluctuation of the cylinders. Next, an explanation will be made of the method of correction of the elapsed time Ta(i) with reference to FIG. 12.

In this embodiment of the present invention, the elapsed time Ta(i) is calculated based on the following equation:

$$Ta(i)=\text{(time required from } TDC \text{ to } ATDC \text{ 30° of No. } i \text{ cylinder)} \cdot (1+KTA(i))$$

Here, KTA(i) shows the correction coefficient for the No. i cylinder. The correction coefficient KTa(i) is calculated at the time when the fuel supply is stopped during a deceleration operation where torsional vibration of the engine drive system does not occur and torsional vibration of the crankshaft does not occur either.

Figure 12:
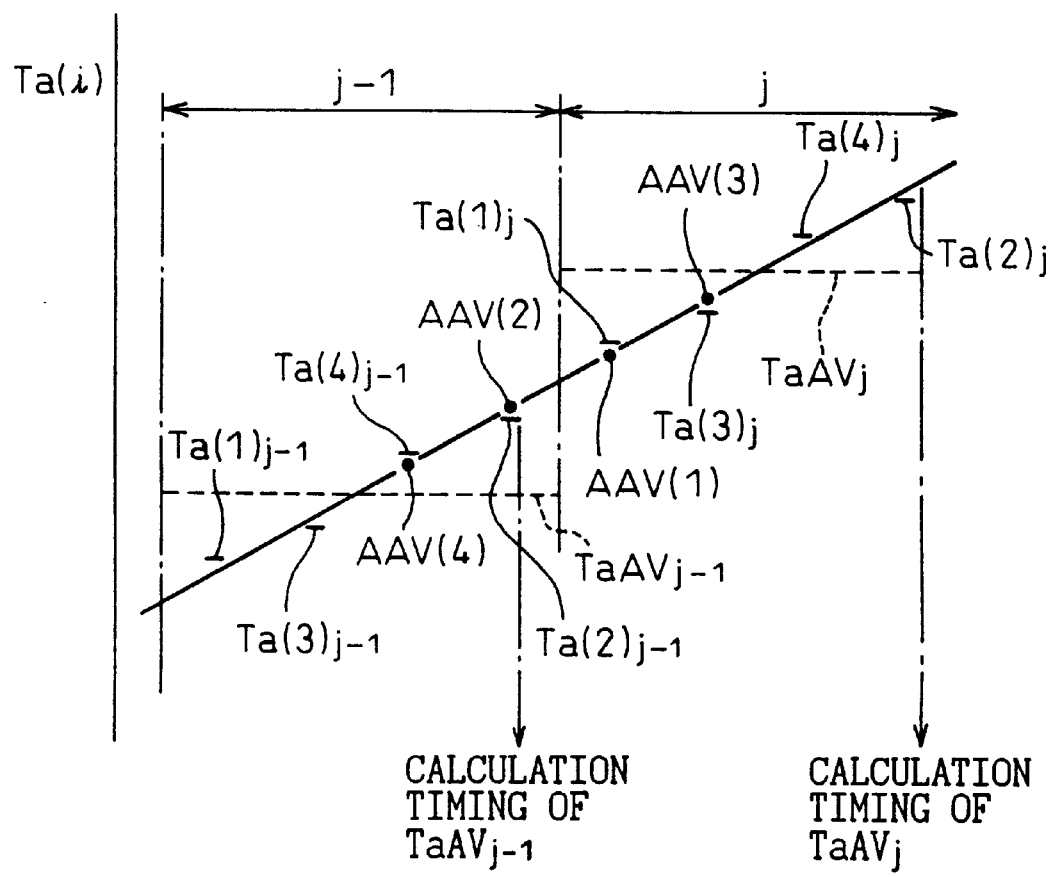
FIG. 12 is a time chart of the changes in the elapsed time Ta(i) at the time of deceleration operation.

FIG. 12 shows the change of the elapsed time Ta(i) at the time of a deceleration operation. At the time of a deceleration operation, the rotational speed of the crankshaft gradually falls, so the elapsed time Ta(i) gradually increases as shown by $Ta(1)_{j-1}$, $Ta(3)_{j-1}$, $Ta(4)_{j-1}$, $Ta(2)_{j-1}$, $Ta(1)_j$, $Ta(3)_j$, $Ta(4)_j$, and $Ta(2)_j$. At this time, if the spaces between the outer teeth of the rotor 14 are the same, the elapsed time Ta(i) can be considered to change along the solid line in FIG. 12. When the detected elapsed time Ta(i) deviates from the solid line of FIG. 12, it is considered that the spaces of the outer teeth for detection of the elapsed time Ta(i) deviated from the solid line deviate from the correct spaces. Therefore, in this embodiment of the present invention, when the elapsed time Ta(i) deviates from the line shown in FIG. 12, the elapsed time Ta(i) is corrected by the correction coefficient KTa(i) so that the elapsed time Ta(i) is positioned on the solid line of FIG. 12.

Explaining this in more detail, in this embodiment of the present invention, the average value $$TaAv_{j-1}\{=(Ta(1)_{j-1}++Ta(3)_{j-1}+Ta(4)_{j-1}+Ta(2)_{j-1})/4\}, TaAv_j\{=Ta(1)_j+Ta(3)_j+Ta(4)_j+Ta(2)_j)/4\},$$

... of the elapsed times Ta(i) of four cylinders in a 720° crank angle range (j−1), (j) ... Next, it is considered that the elapsed times $Ta(4)_{j-1}$, $Ta(2)_{j-1}$, $Ta(1)_j$, and $Ta(3)_j$ increase by an average constant rate of increase from the average value $TaAv_{j-1}$ to average value TaAVj, and the elapsed times AAV(4), AAV(2), AAV(1), and AAV(3) for the cylinders when considering an increase by an average constant rate of increase are found by the following equations:

$$AAV(4)=(TaAV_j-TaAV_{j-1})\cdot(1/8)+TaAV_{j-1}$$

$$AAV(2)=(TaAV_j-TaAV_{j-1})\cdot(3/8)+TaAV_{j-1}$$

$$AAV(1)=(TaAV_j-TaAV_{j-1})\cdot(5/8)+TaAV_{j-1}$$

$$AAV(3)=(TaAV_j-TaAV_{j-1})\cdot(7/8)+TaAV_{j-1}$$

Next, the ratios of deviation KAFC(4), KAFC(2), KAFC(1), and KAFC(3) for the actually measured elapsed times $Ta(4)_{j-1}$, $Ta(2)_{j-1}$, $Ta(1)_j$, and $Ta(3)_j$ for the elapsed times AAV(4), AAV(2), AAV(1), and AAV(3) for the cylinders are found based on the following equations:

$$KAFC(4)=(Ta(4)_{j-1}-AAV(4))/AAV(4)$$

$$KAFC(2)=(Ta(2)_{j-1}-AAV(2))/AAV(2)$$

$$KAFC(1)=(Ta(1)_j-AAV(1))/AAV(1)$$

$$KAFC(3)=(Ta(3)_j-AAV(3))/AAV(3)$$

Next, the basic correction coefficient kTaB(i) is found for each cylinder using the following equation:

$$KTaB(i)=KTa(i)_{j-1}-KAFC(i)/4$$

That is, the basic correction coefficient KTaB(i) is calculated by subtracting ¼ of the ratio of deviation KAFC(i) from the correction coefficient $KTa(i)_{j-1}$ up to then for each cylinder.

Next, the mean value tKTaM of the basic correction coefficient KTaB(i) is calculated based on the following equation:

$$tKTaM=\{KTaB(1)+KTaB(2)+KTaB(3)+KTaB(4)\}/4$$

Next, the correction coefficient KTa(i) for each cylinder is calculated by subtracting the average value tKTaM from the basic correction coefficient KTaB(i) as shown by the following equation:

$$KTa(i)=KTaB(i)-tKTaM$$

The correction coefficient $KTA(i)_{j-1}$ is not directly corrected based on the ratio of deviation KAFC(1). The basic correction coefficient KTaB(i) is found once in this way for the following reason. For example, assume that there is a ratio of deviation KAFC(1) for only the No. 1 cylinder #1 and that only the correction coefficient KTa(1) of the No. 1 cylinder #1 is corrected based on the ratio of deviation KAFC(1). In this case, the elapsed time Ta(1) of only the No. 1 cylinder #1 is increased or decreased. If the elapsed time Ta(1) of only the No. 1 cylinder #1 is increased or decreased, deviation will occur in the correction coefficients KTa(2), KTa(3), and KTa(4) of the remaining cylinders #2, #3, and #4.

To prevent this problem from occurring, the basic correction coefficient KTaB(i) is found once and the mean value tKTaM of the basic correction coefficient is subtracted from the basic correction coefficient KTaB(i) to find the final correction coefficient KTa(i). That is, for example, when the basic correction coefficient KTa(1) of the No. 1 cylinder #1 is increased, the mean value tKTaM of the basic correction coefficient is subtracted from the basic correction coefficients KTaB(i) of all of the cylinders #1, #2, #3, and #4. If tKTaM is subtracted from the basic correction coefficients KTaB(i) of all of the cylinders in this way, the correction coefficient KTa(1) of the No. 1 cylinder #1 will increase, but the correction coefficients KTa(2), KTa(3), and KTa(4) of the remaining cylinders #2, #3, and #4 will be decreased and the sum of KTa(1), KTa(2), KTa(3), and KTa(4) will be maintained constantly at zero. If the correction coefficient KTa(i) is corrected so that the sum of KTa(1), KTa(2), KTa(3), and KTa(4) is maintained constantly at zero, then no matter which correction coefficient KTa(i) is corrected, deviation will no longer occur in the other correction coefficients KTa(i).

In the embodiment shown in FIG. 12, when the elapsed time $Ta(1)_j$ of the No. 1 cylinder #1 for example is larger than the elapsed time AAV(1) when assuming an increase by an average constant rate of increase, the ratio of deviation KAFC(1) for the No. 1 cylinder #1 becomes a positive value. As a result, the correction coefficient KTa(1) is decreased until the ratio of deviation KAFC(1) becomes zero. If the ratio of deviation KAFC(1) becomes zero, the value of the correction coefficient KTAa(1) settles down to a constant value. At this time, the elapsed time Ta(1) matches with the elapsed time AVV(1). If the correction coefficients KTa(1) for all cylinders settle down to constant values, when the rotational speed of the rotor 14 is constant, the elapsed times Ta(i) of the cylinders corrected using the correction coefficients KTA(i) all become equal. Therefore, even if there is variation in the spaces of the outer teeth of the rotor 14, it is possible to accurately detect the torque fluctuation of the cylinders.

Figure 13:
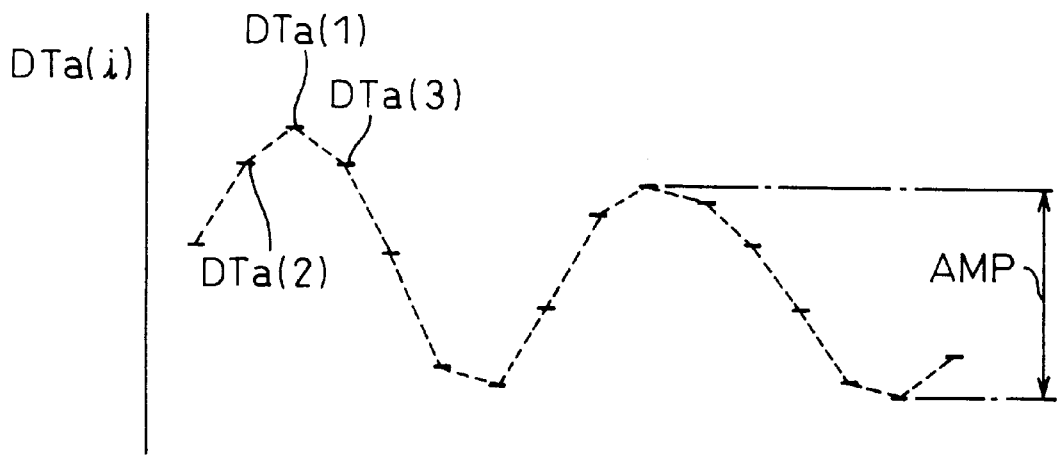
FIG. 13 is a time chart of the changes in the difference of elapsed times DTa(i)

Returning the discussion to the calculation of torque fluctuation once again, when torsional vibration occurs in the engine drive system, the difference in elapsed times DTa(i) fluctuates as shown in FIG. 10. This difference in elapsed times DTa(i), however, fluctuates even when the vehicle is driving over a bumpy road. Further, at this time, the degree of fluctuation of the DTa(i) becomes extremely large in some cases. FIG. 13 shows the fluctuation in DTa(i) when the vehicle is riding over a bumpy road. The AMP of FIG. 13 shows the difference between the minimum DTa(i) and the maximum DTa(i), that is, the amplitude. When this amplitude AMP is small, it is possible to accurately detect the output fluctuation and torque fluctuation of the cylinders by the method described up to here.

When the amplitude AMP becomes large, however, it no longer becomes possible to accurately detect the output fluctuation or torque fluctuation of the cylinder giving the maximum or minimum DTa(i). That is, in FIG. 13, first, assuming that the cylinder giving the maximum DTa(i) is the No. 1 cylinder #1, the amount of decrease I due to the torsional vibration of the assumed difference of elapsed times Kb(1) of the No. 1 cylinder #1 is found from the slope of the broken line connecting DTa(1) and DTa(3) in FIG. 11. Near where DTa(1) becomes maximum, the amount of increase or amount of decrease of the elapsed time due to the torsional vibration changes by a smooth curve passing through DTa(2), DTa(1), and DTa(3). Therefore, if the KB(1) of the No. 1 cylinder #1 is found from DTa(1) and DTa(3), the value of Kb(1) is calculated considerably smaller than the actual value. As a result, Kb(1) no longer shows the correct value and therefore the amount of output fluctuation and the amount of torque fluctuation can no longer be accurately detected. If the amplitude AMP becomes larger, the same thing happens in the cylinder giving the minimum DTa(i).

Further, the value of Kb(i) deviates from the actual value even in cylinders where the DTa(i) sharply changes from the DTa(i) of the cylinder where combustion was performed one time before, therefore it no longer becomes possible to accurately detect the output fluctuation and torque fluctuation. Therefore, in this embodiment according to the present invention, when the amplitude AMP is large, the amount of output fluctuation or amount of torque fluctuation is not sought for the cylinders giving the maximum or minimum DTa(i). Further, the amount of output fluctuation or the amount of torque fluctuation is not sought for cylinders where DTa(i) changes sharply from the DTa(i) of the cylinder where combustion was performed one time before.

Figure 23:
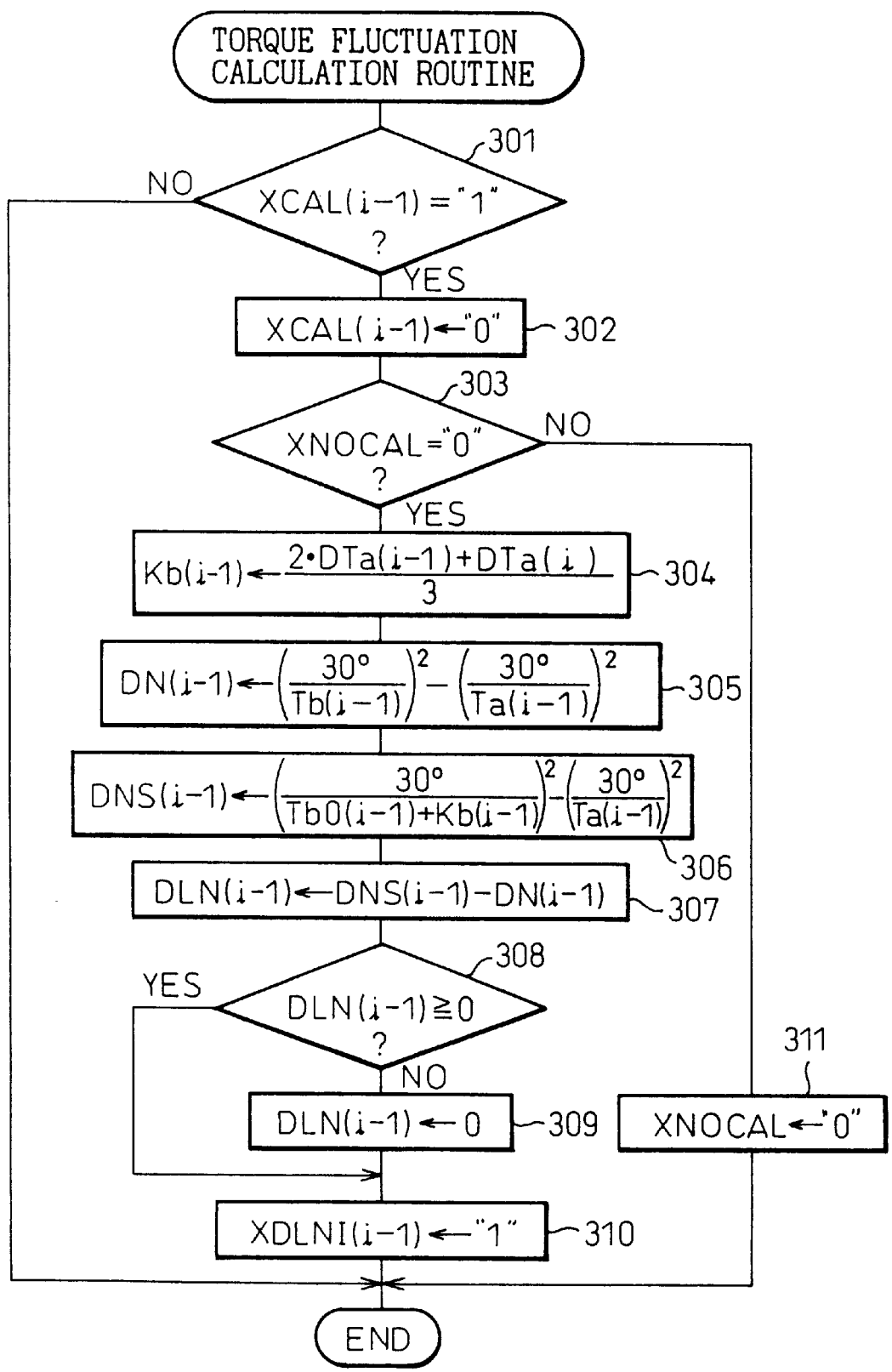
FIG. 23 is a flowchart for calculating the amount of fluctuation of torque.
Figure 24:
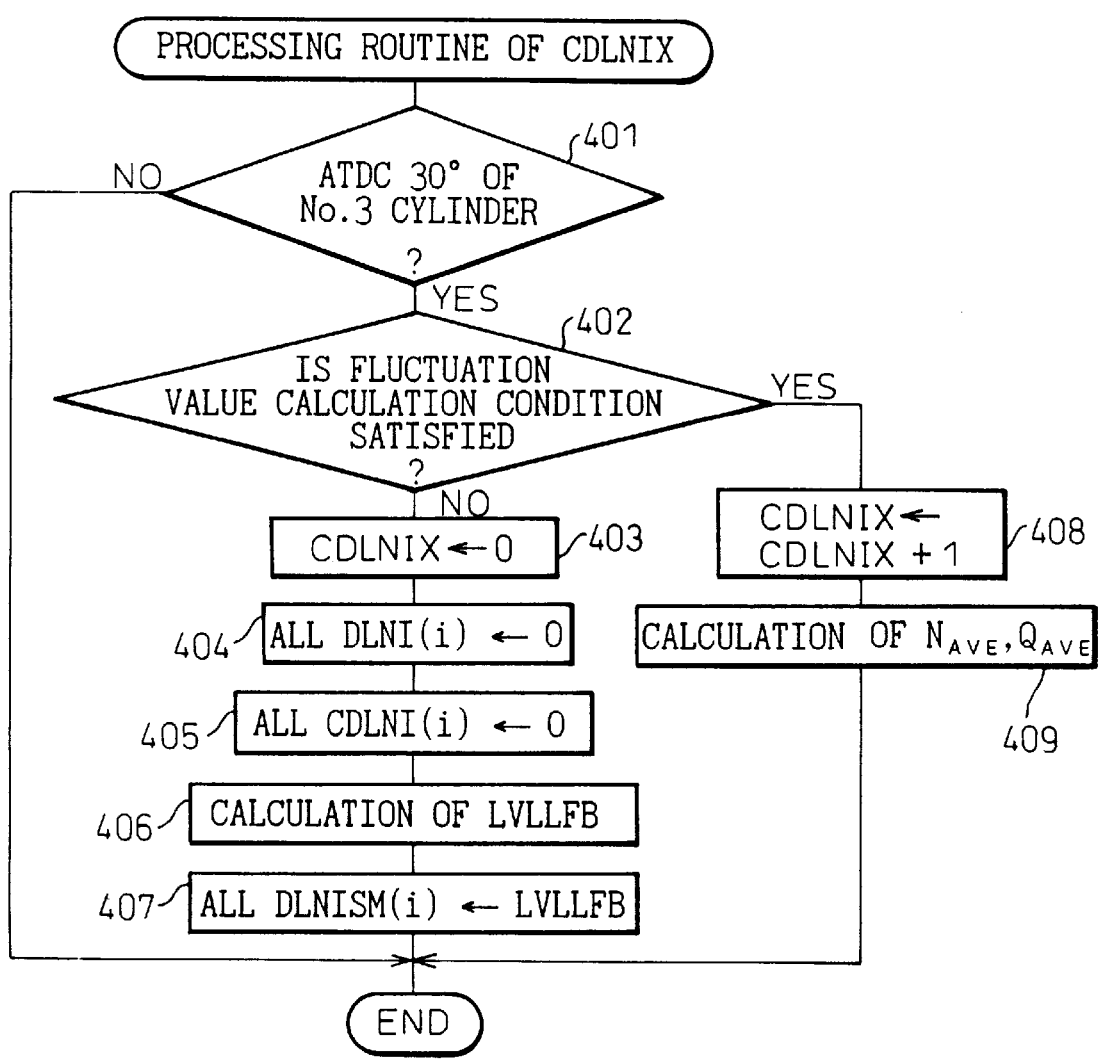
FIG. 24 is a flowchart for processing of the counter CDLNIX.
Figure 25:
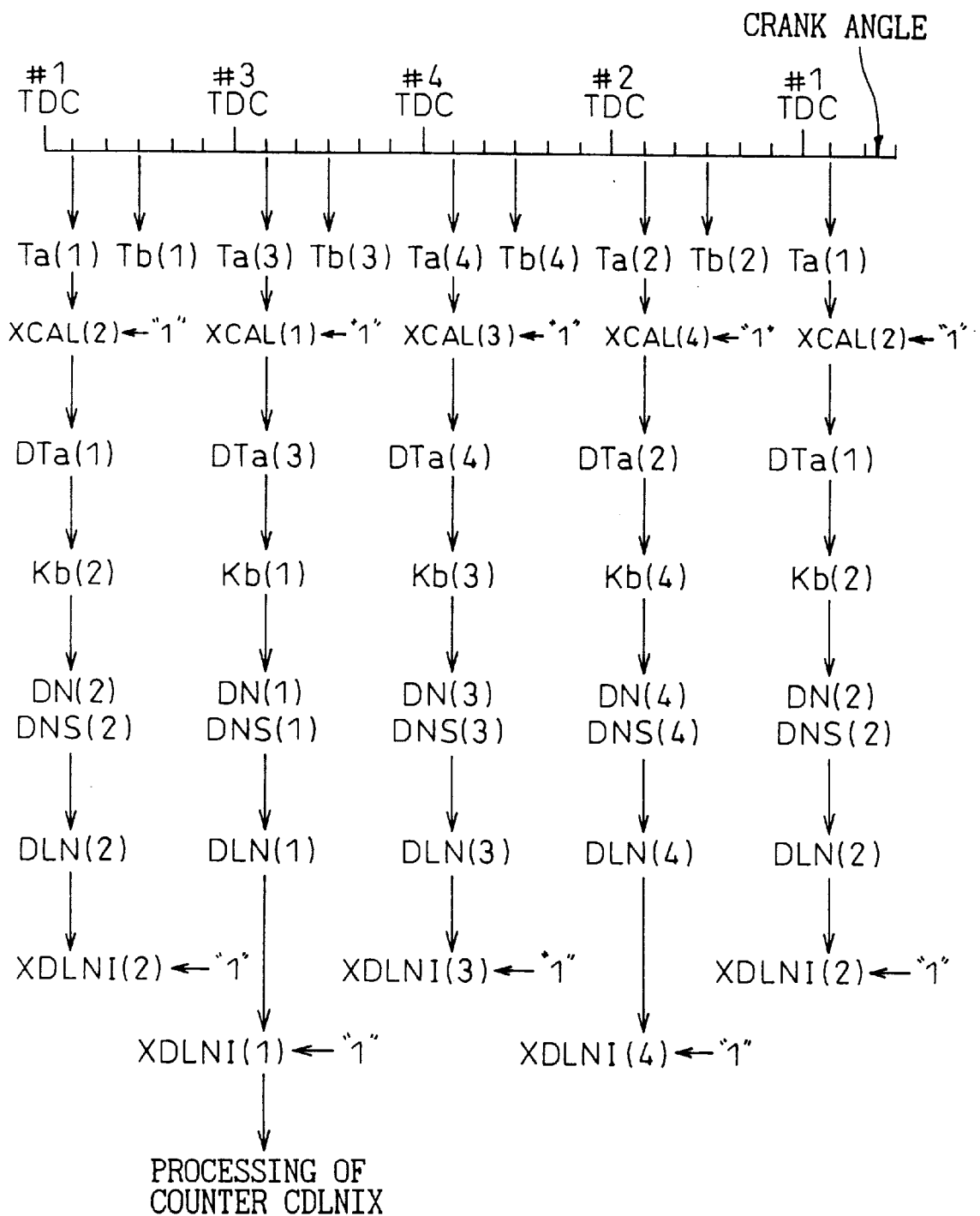
FIG. 25 is a view of the timings for calculation of various values.

Next, the routines for finding the amount of fluctuation of torque at each cylinder will be explained referring to FIG. 14 to FIG. 25. Note that, FIG. 25 shows the timing for calculation of the various values performed in each routine.

Figure 14:
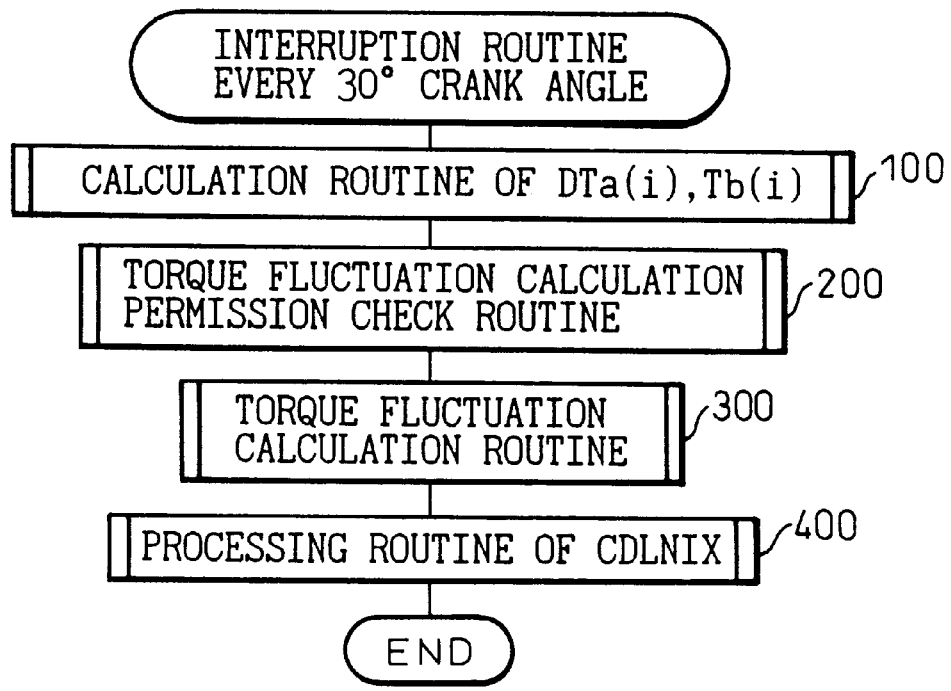
FIG. 14 is a flowchart of the interruption routine.
Figure 19:
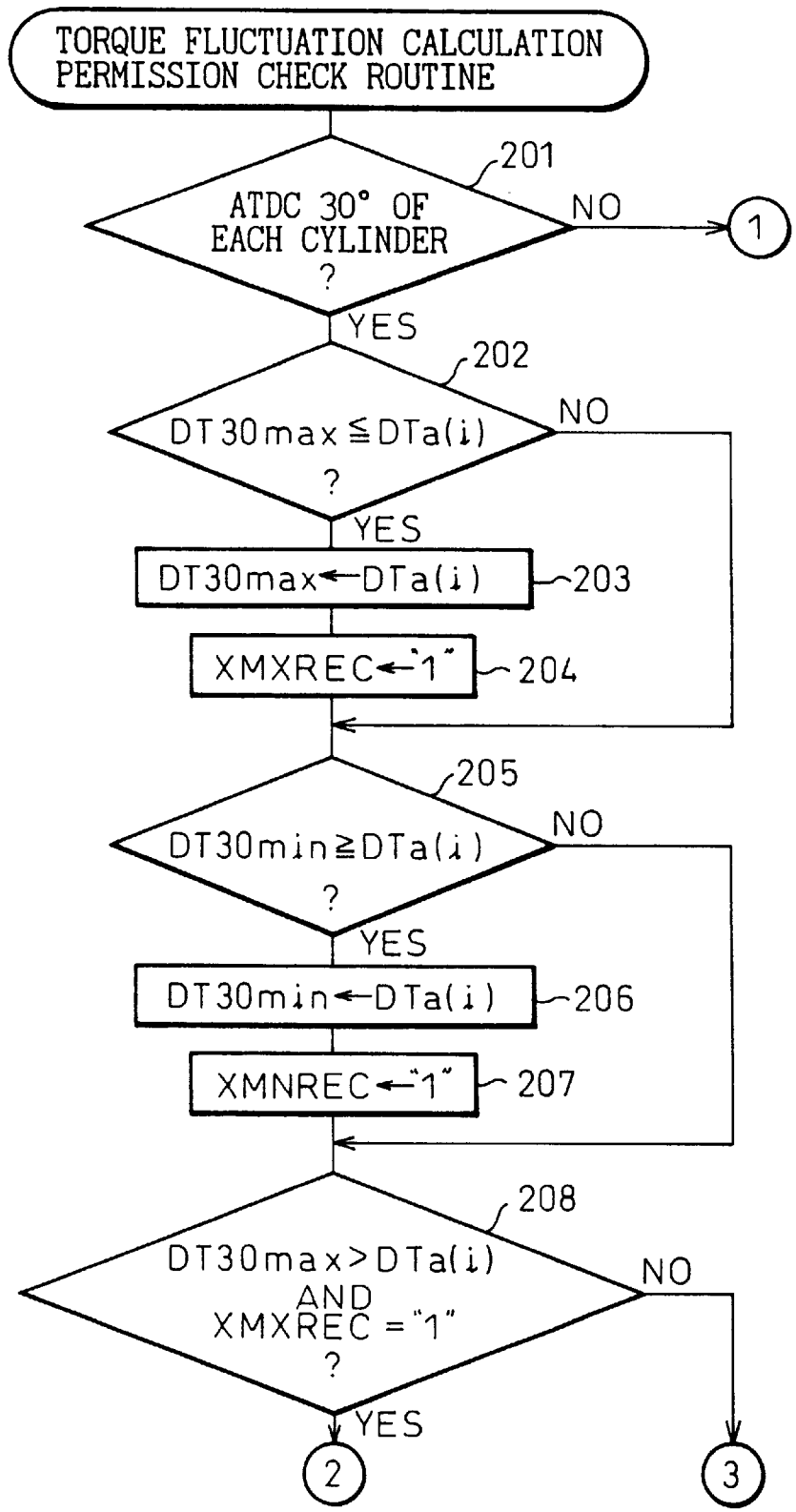
FIGS. 19 to 21 are flowcharts for checking the permission for calculation of the amount of torque fluctuation.
Figure 20:
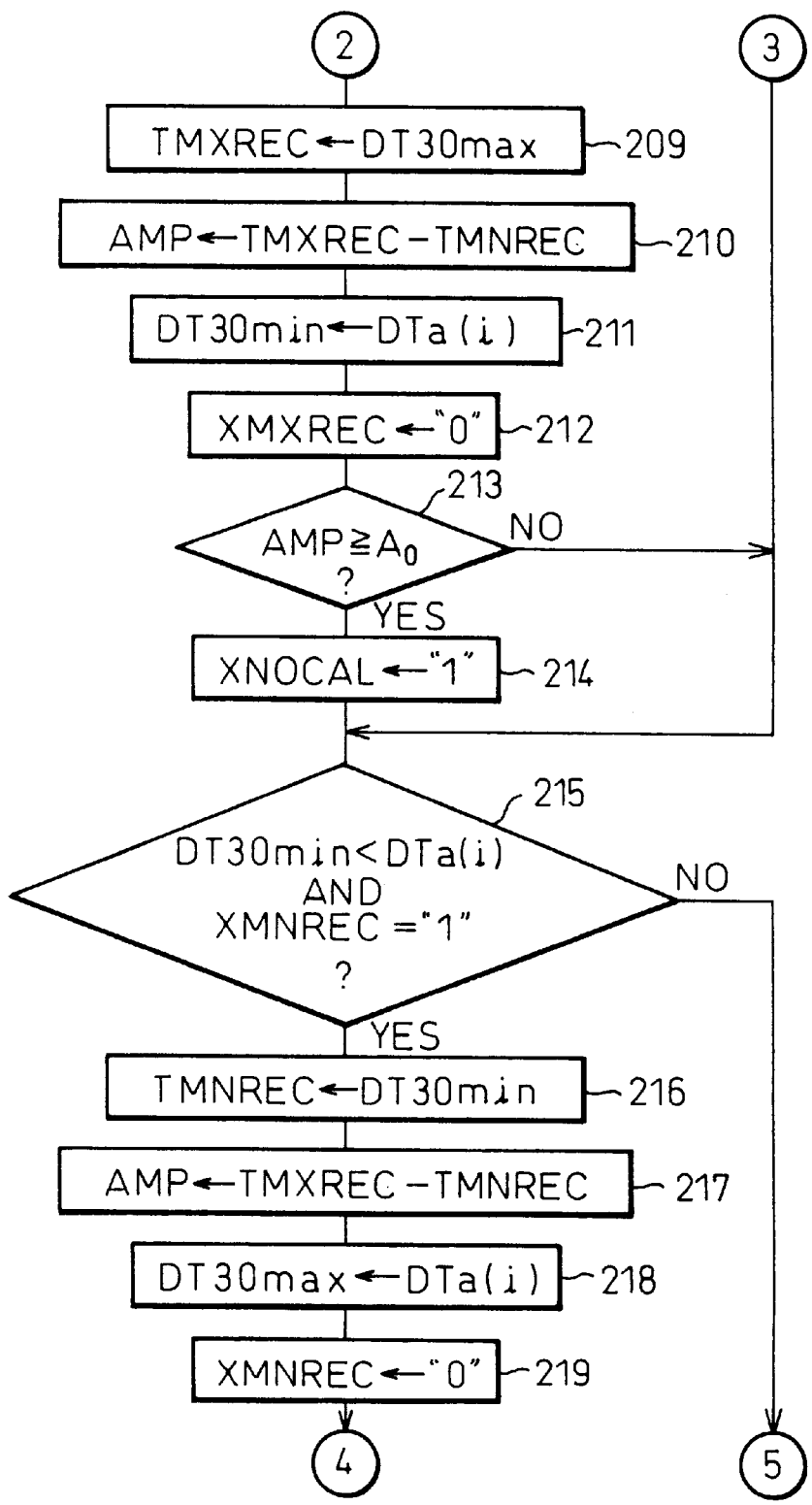
Figure 21:
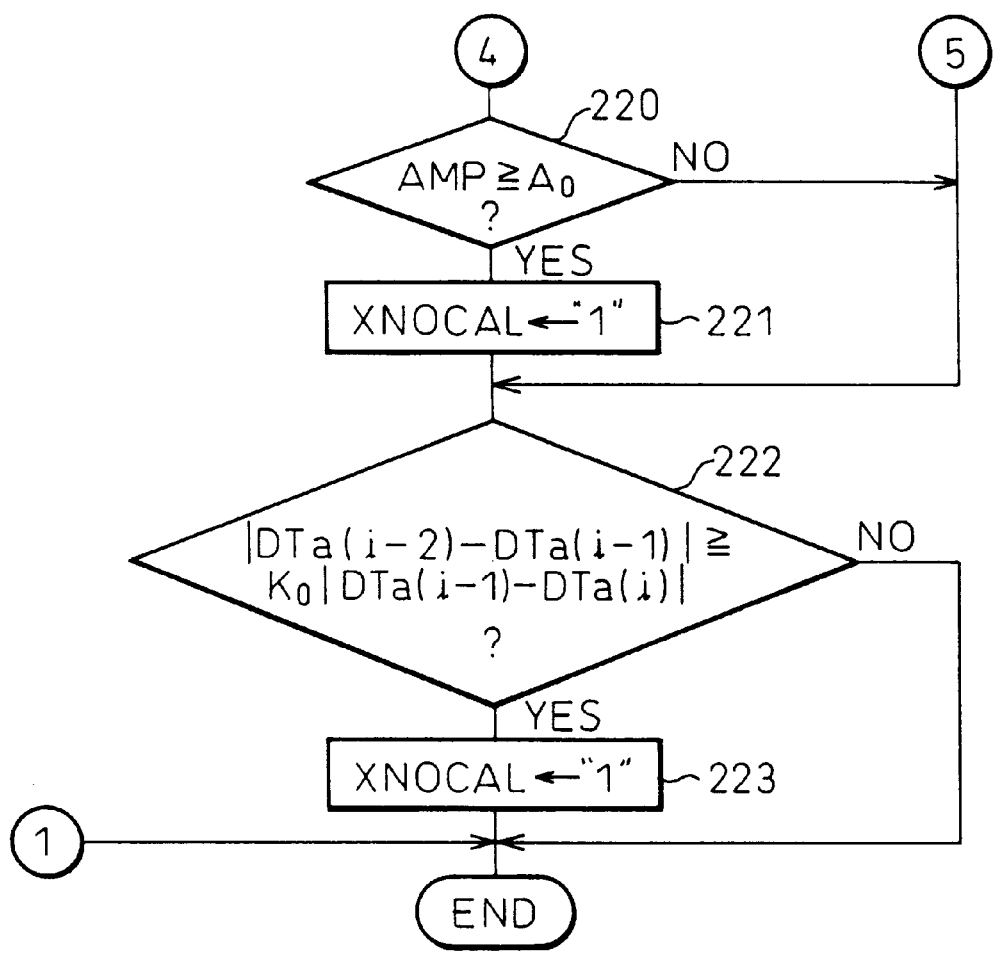

FIG. 14 shows an interruption routine performed at every 30° crank angle. Referring to FIG. 14, first the routine (step 100) for calculating the difference of elapsed times DTa(i) and the elapsed time Tb(i) is proceeded to. This routine is shown in FIG. 15 to FIG. 18. Next, the routine (step 200) for checking if calculation of the torque fluctuation is permitted or not is proceeded to. This routine is shown in FIG. 19 to FIG. 21. Next, the routine for calculating the torque fluctuation (step 300) is proceeded to. This routine is shown in FIG. 23. Next, the routine for processing of the counter CKLNIX used for calculating the torque fluctuation value is proceeded to. This routine is shown in FIG. 24.

Referring to FIG. 15 to FIG. 18 showing the routine for calculation of the difference of elapsed times DTa(i) and the elapsed time Tb(i), first, at step 101, the time TIME is made the TIME0. The electronic control unit 20 is provided with a free run counter showing the time. The time TIME is calculated from the count value of this free run counter. Next, at step 102, the current time TIME is fetched. Therefore, the TIME0 of step 101 expresses the time of 30° crank angle before.

Next, at step 103, whether the No. 1 cylinder is currently at ATDC 30° or not is judged. When the No. 1 cylinder is not currently at ATDC 30°, step 111 is jumped to, where it is judged whether the No. 1 cylinder is currently at ATDC 90° or not. When the No. 1 cylinder is not currently at ATDC 90°, the routine for calculation of the difference of elapsed times DTa(i) and the elapsed time Tb(i) is ended.

As opposed to this, when it is judged at step 103 that the No. 1 cylinder is currently at ATDC 30°, step 104 is proceeded to, where the elapsed time Ta(i) calculated 720° crank angle before is made TaO(i). Next, at step 105, the final elapsed time Ta(i) from TDC to ATDC 30° of the No. No. i cylinder is calculated based on the following equation:

$$Ta(i)=(TIME-TIME0) \cdot (1+KTa(i))$$

That is, for example, when the No. 1 cylinder #1 is currently at ATDC 30°, the final elapsed time Ta(1) from TDC to ATDC 30° of the No. 1 cylinder #1 is calculated from (TIME−TIME0)·(1+KTa(i)). Here, (TIME−TIME0) expresses the elapsed time Ta(1) actually measured from the crank angle sensor 15 and KTa(1) is a correction coefficient for correction of the error due to the spaces of the outer teeth of the rotor 14, therefore the final elapsed time Ta(1) obtained by multiplying (TIME−TIME0) with (1+KTa(1)) comes to accurately express the elapsed time when the crankshaft rotates by 30° crank angle.

Next, at step 106, the elapsed time Ta(i) currently calculated is reduced by the elapsed time TaO(i) calculated 720° crank angle before so as to calculate the difference of elapsed times DTa(i) (=Ta(i)−TaO(i)). Next, at step 107, it is judged if No. 2 cylinder #2 is currently at ATDC 30°. When the No. 2 cylinder #2 is not at ATDC 30°, the routine jumps to step 110, where the flag XCAL(i−1) cylinder where combustion had been performed one time before showing that the amount of torque fluctuation should be calculated is set (XCAL(i−1)−"1"). Next, the routine proceeds to step 111. In this embodiment according to the present invention, as explained above, since the ignition sequence is 1-3-4-2, when the No. 1 cylinder #1 is currently at ATDC 30°, the flag XCAL(2) of the No. 2 cylinder #2 where the combustion had been performed one time before showing that the amount of torque fluctuation should be calculated is set. In the same way, when the final elapsed time Ta(3) is calculated as shown in FIG. 25, the flag XCAL(1) is set, when the final elapsed time Ta(4) is calculated, the flag XCAL(3) is set, and when the final elapsed time Ta(2) is calculated, the flag XCAL(4) is set.

On the other hand, when it is judged at step 111 that the No. 1 cylinder is currently at ATDC 90°, step 112 is proceeded to, where the elapsed time Tb(i) calculated 720° crank angle before is made TbO(i). Next, at step 113, the final elapsed time Tb(i) from ATDC 60° to ATDC 90° of the No. i cylinder is calculated based on the following equation:

$$Tb(i)=(TIME-TIME0) \cdot (1+KTb(i))$$

That is, for example, when the No. 1 cylinder #1 is currently at ATDC 90°, the final elapsed time Tb(1) from ATDC 60° to ATDC 90° of the No. 1 cylinder #1 is calculated from (TIME−TIME0)·1+KTb(1)). In this case as well, since the value (1+KTb(1)) for correcting the error due to the spaces of the outer teeth of the rotor 14 is multiplied with (TIME−TIME0), the final elapsed time Tb(1) accurately expresses the elapsed time in the period when the crankshaft rotates by 30° crank angle. Next, at step 114, it is judged if the No. 2 cylinder #2 is currently at ATDC 90° or not. When the No. 2 cylinder #2 is not currently at ATDC 90°, the routine for calculation of the difference of elapsed times DTa(i) and the elapsed time Tb(i) is ended.

On the other hand, when it is judged at step 107 that the No. 2 cylinder #2 is currently at ATDC 30°, the routine proceeds to step 108, where the average value TaAVj of the elapsed times Ta(i) in the 720° crank angle range (j) is calculated based on the following equation:

$$TaAV_j = (Ta(1)+Ta(3)+Ta(4)+Ta(2))/4$$

Here, Ta(1), Ta(3), Ta(4), and Ta(2) correspond to Ta(1)$_j$, Ta(3)$_j$, Ta(4)$_j$, and Ta(2)$_j$ in FIG. 12. Next, the routine for calculation of the correction coefficient KTa(i) of step 109 is proceeded to. This routine is shown in FIG. 17.

Figure 17:
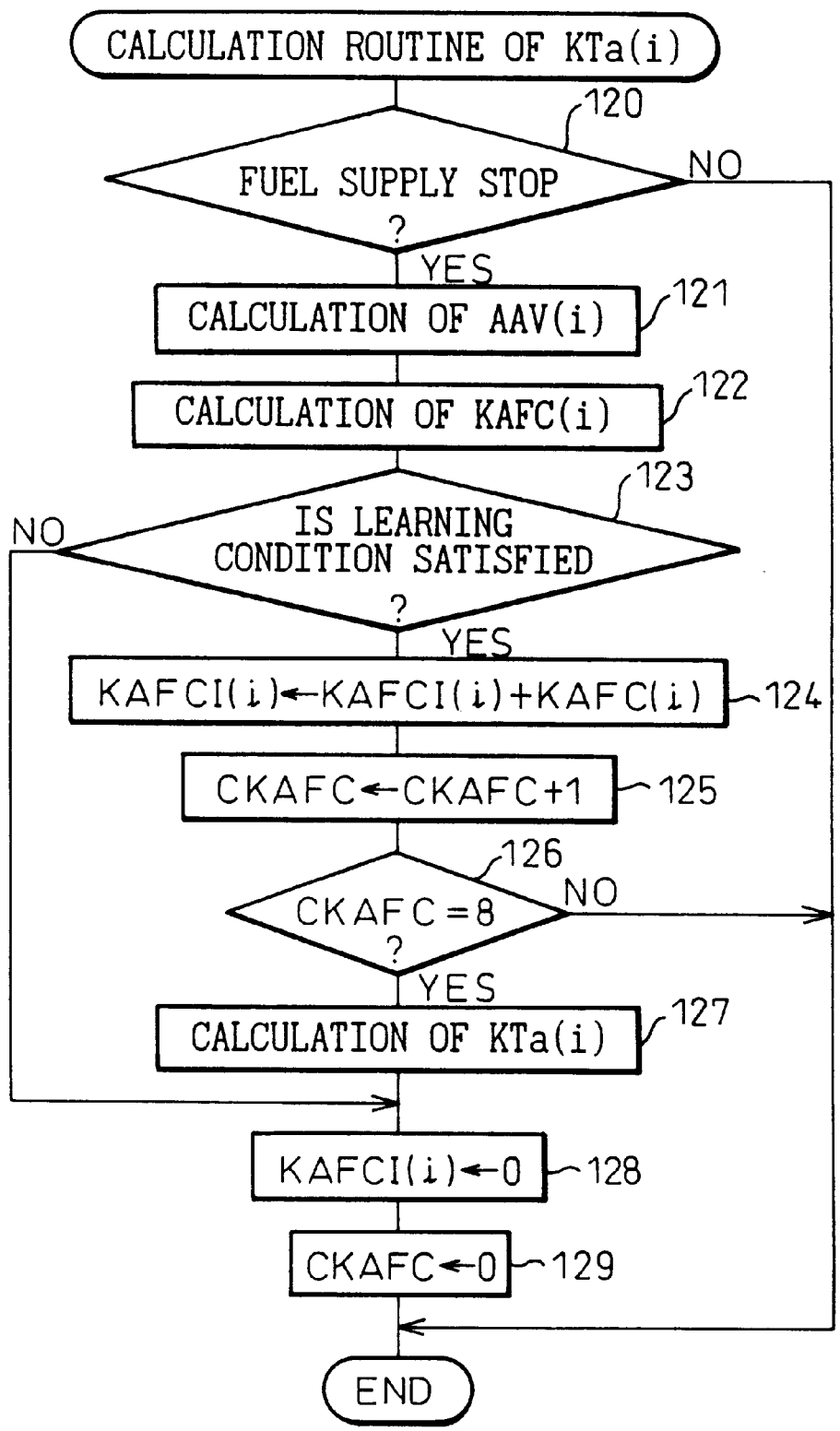
FIG. 17 is a flowchart of the calculation of KTa(i)

Referring to FIG. 17, first, at step 120, it is judged if the fuel supply is stopped during a deceleration operation or not. When the fuel supply is not stopped during a deceleration operation, the processing cycle ends, while when the fuel is stopped during the deceleration operation, step 121 is proceeded to. At step 121, the elapsed times AAV(4), AAV(2), AAV(1), and AAV(3) shown in FIG. 12 when assuming an increase by an average constant rate of increase are calculated as follows from the average value TaAV$_j$ of the elapsed times Ta(i) calculated at step 108 and the average value TaAV$_{j-1}$ of the elapsed time Ta(i) at the 720° crank angle range (j−1) of FIG. 12 calculated previously (=(Ta(1)+Ta(3)+Ta(4)+Ta(2))/4) (where Ta(1), Ta(3), Ta(4), and Ta(2) correspond to Ta(1)$_{j-1}$, Ta(3)$_{j-1}$, Ta(4)$_{j-1}$, and Ta(2)$_{j-1}$ shown in FIG. 12).

$$AAV(4)=(TaAV_j-TaAV_{j-1})\cdot(1/8)+TaAV_{j-1}$$

$$AAV(2)=(TaAV_j-TaAV_{j-1})\cdot(3/8)+TaAV_{j-1}$$

$$AAV(1)=(TaAV_j-TaAV_{j-1})\cdot(5/8)+TaAV_{j-1}$$

$$AAV(3)=(TaAV_j-TaAV_{j-1})\cdot(7/8)+TaAV_{j-1}$$

Next, at step 122, the ratios of deviation KAFC(4), KAFC(2), KAFC(1), and KAFC(3) for the actually detected elapsed times TaO(4), TaO(2), TaO(1), and TaO(3) for the elapsed times AAV(4), AAV(2), AAV(1), and AAV(3) are found based on the following equations: Here TaO(4), TaO(2), Ta(1), and Ta(3) correspond to the Ta(4)$_{j-1}$, Ta(2)$_{j-1}$, Ta(1)$_j$, and Ta(3)$_j$ shown in FIG. 12.

$$KAFC(4)=(TaO(4)-AAV(4))/AAV(4)$$

$$KAFC(2)=(TaO(2)-AAV(2))/AAV(2)$$

$$KAFC(1)=(Ta(1)-AAV(1))/AAV(1)$$

$$KAFC(3)=(Ta(3)-AAV(3))/AAV(3)$$

Next, at step 123, it is judged if the conditions for learning the correction coefficient KTa(i) are satisfied or not. For example, when a predetermined time has elapsed from when the fuel supply is stopped and the engine speed is in a predetermined range and the vehicle is driving over poor roads, for example, when the amplitude AMP of the difference of elapsed times DTa(i) shown in FIG. 13 exceeds a set value, it is judged that the learning conditions are not satisfied, the routine proceeds to step 128, where the cumulative count KAFCI(i) of the amount of deviation KAFC(i) is made zero. Next, at step 129, the count CKAFC is cleared.

As opposed to this, when the learning conditions are satisfied, step 124 is proceeded to, where the amount of deviation KAFC(i) for the cylinders is added to the corresponding cumulative value KAFCI(i). Next, at step 125, the cumulative count CKAFC is incremented by exactly 1. Next, at step 126, it is judged if the cumulative count CKAFC has become "8". When the cumulative count CKAFC is not "8", the processing cycle ends, while when the cumulative count CKAFC becomes "8", step 127 is proceeded to, where the correction coefficient KTa(i) is calculated. That is, when the amount of deviation KAFC(i) is cumulatively added eight times for each cylinder, step 127 is proceeded to, where the correction coefficient KTa(i) is calculated.

At step 127, the correction coefficient KTa(i) is calculated in the following way. That is, first, the cumulative value KAFCI(i) is replaced by KAFCE(i). Next, the basic correction coefficient KTaB(i) is calculated based on the following equation:

$$KTaB(i)=KTa(i)-(KAFCI(i)/8)/4$$

That is, when deviation occurs from the elapsed time AAC(i) when assuming the actually detected elapsed time Ta(i) increases by an average constant rate of increase, the value of the current correction coefficient KTa(i) revised by exactly ¼ of the average value of the cumulative value KAFCI(i) is made the basic correction coefficient KTaB(i). Next, the mean value tKTaM of the basic correction coefficient KTaB(i) for all of the cylinders is calculated based on the following equation:

$$tKTaM=(KTaB(1)+KTaB(2)+KTaB(3)+KTaB(4))/4$$

Next, the basic correction coefficient KTaB(i) is revised by the average value tKTaM as shown by the following equation so as to update the correction coefficient KTa(i).

$$KTa(i)=KTaB(i)-tKTaM$$

The correction coefficients KTa(i) for all cylinders at the time the fuel injection is stopped during a deceleration operation are updated in this way.

Figure 16:
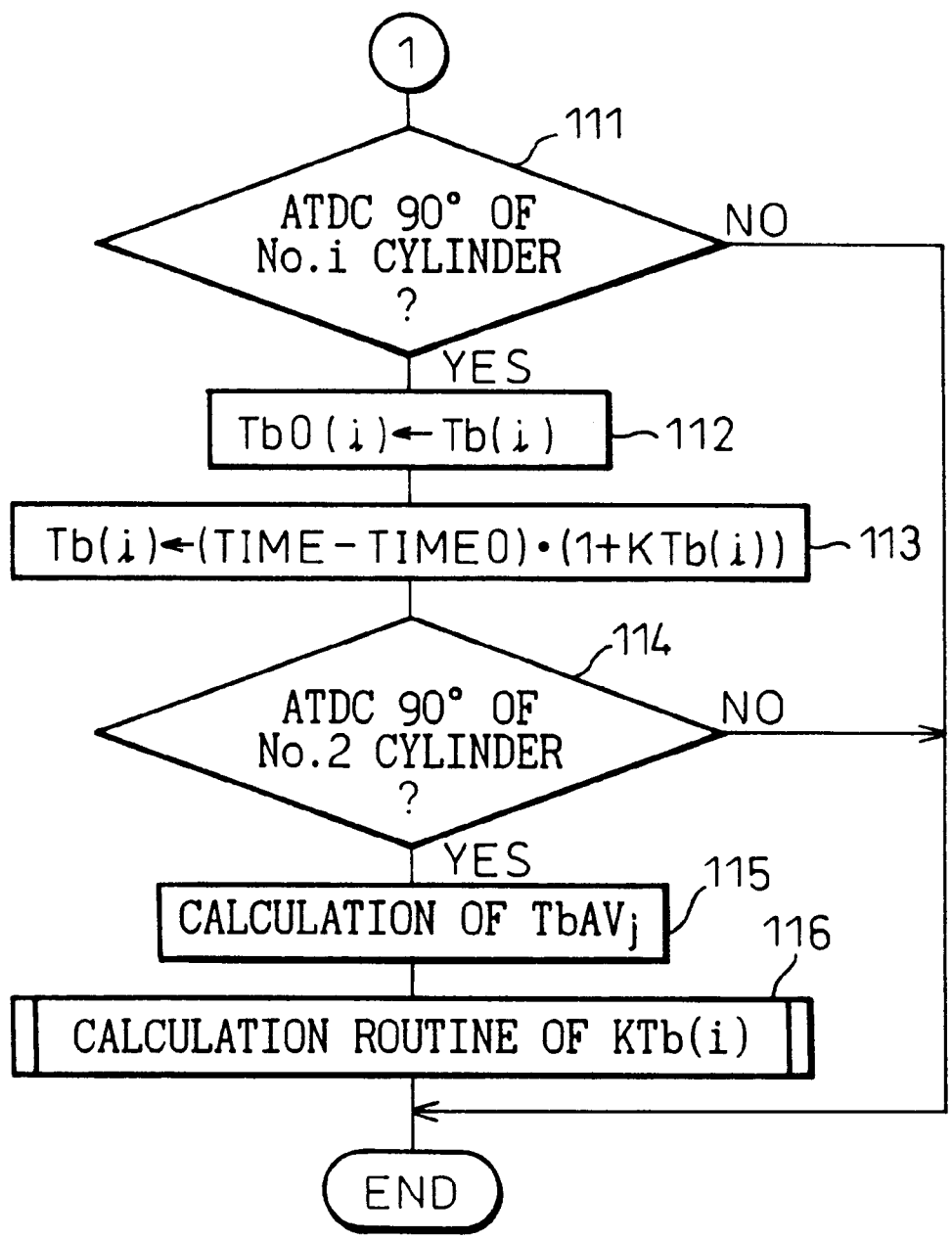

On the other hand, when it is judged at step 114 of FIG. 16 that the No. 2 cylinder #2 is currently at ATDC 90°, step 115 is proceeded to, where the same method as when finding TaAV$_j$ is used to calculate the average value TbAV$_j$ of the elapsed time Tb(i) in the 720° crank angle range based on the following equation:

$$TbAV_j=(Tb(1)+Tb(3)+Tb(4)+Tb(2))/4$$

Next, the routine for calculation of the correction coefficient KTb(i) of step 116 is proceeded to. This routine is shown in FIG. 18.

Figure 18:
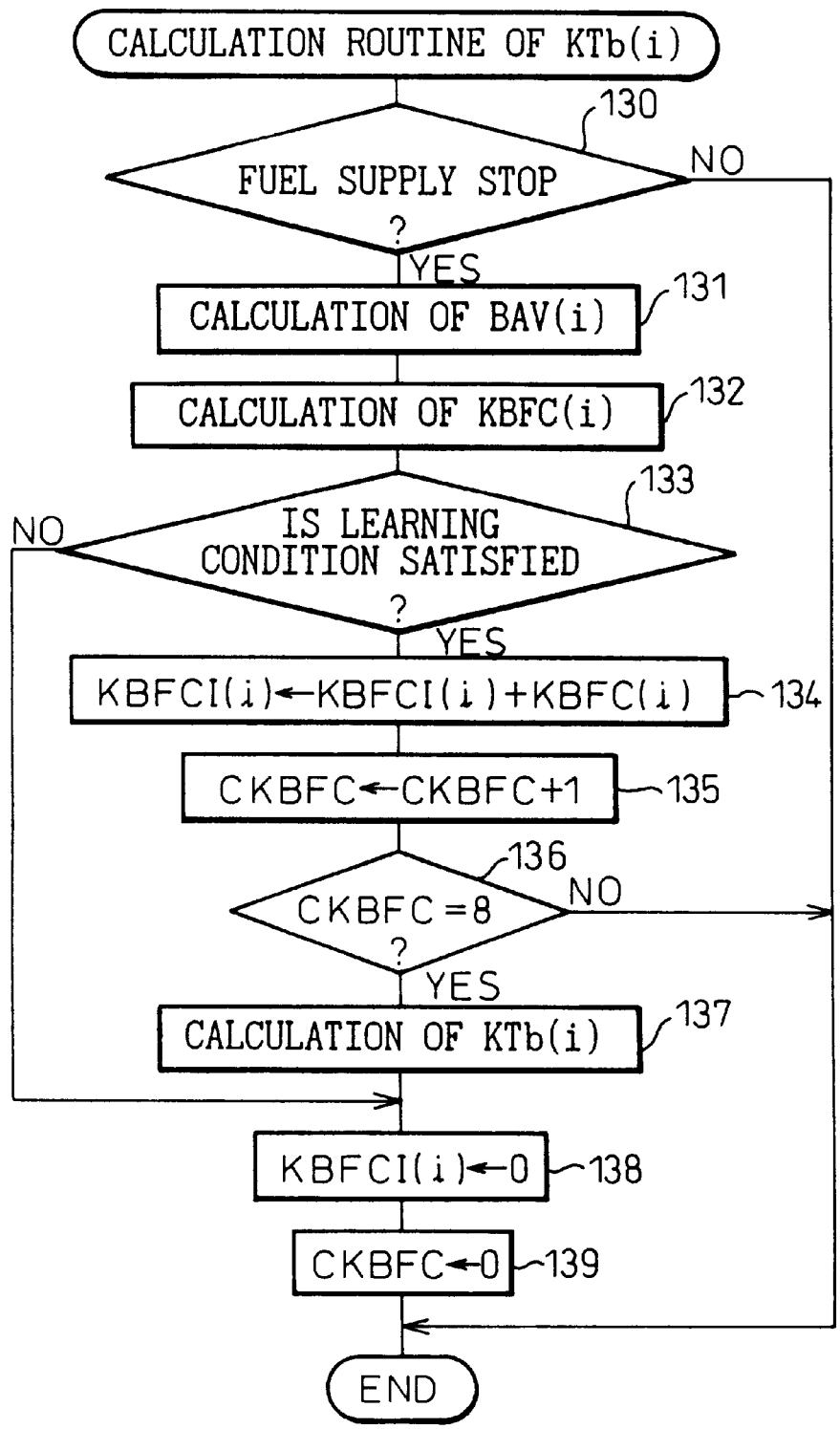
FIG. 18 is a flowchart of the calculation of KTb(i)

Referring to FIG. 18, first, at step 130, it is judged if the supply of fuel has been stopped during a deceleration operation. When the supply of fuel has not been stopped during a deceleration operation, the processing cycle is ended, while when the supply of fuel has been stopped during a deceleration operation, step 131 is proceeded to. At step 131, the elapsed times BAV(4), BAV(2), BAV(1), and BAV(3) when assuming an increase by an average constant rate of increase are calculated from the average value TbAV$_j$ of the elapsed time Tb(i) calculated at step 115 and the average value TbAV$_{j-1}$ of the elapsed time Tb(i) in the one previous 720° crank angle range (=(Tb(1)+Tb(3)+Tb(4)+Tb(2))/4).

$$BAV(4)=(TbAV_j-TbAV_{j-1})\cdot(1/8)+TbAV_{j-1}$$

$$BAV(2)=(TbAV_j-TbAV_{j-1})\cdot(3/8)+TbAV_{j-1}$$

$$BAV(1)=(TbAV_j-TbAV_{j-1})\cdot(5/8)+TbAV_{j-1}$$

$$BAV(3)=(TbAV_j-TbAV_{j-1})\cdot(7/8)+TbAV_{j-1}$$

Next, the ratios of deviation KBFC(4), KBFC(2), KBFC(1), and KBFC(3) for the actually detected elapsed times TbO(4), TbO(2), Tb(1), and Tb(3) for the elapsed times BAV(4), BAV(2), BAV(1), and BAV(3) are found based on the following equations:

$$KBFC(4)=(TbO(4)-BAV(4))/BAV(4)$$

$$KBFC(2)=(TbO(2)-BAV(2))/BAV(2)$$

$$KBFC(1)=(Tb(1)-BAV(1))/BAV(1)$$

$$KBFC(3)=(Tb(3)-BAV(3))/BAV(3)$$

Next, at step 133, it is judged if the correction coefficient KTb(i) is satisfied or not. As explained above, when a predetermined time elapses from when the fuel supply is stopped, the engine speed is within a predetermined range, and the vehicle is not driving over poor roads, for example, when the amplitude AMP of the difference of elapsed times DTa(i) shown in FIG. 13 is not over the set value, it is judged that the learning conditions are satisfied. When the learning conditions are not satisfied, step 138 is proceeded to, where the cumulative value KBFCI(i) of the amount of deviation KFBC(i) is made zero. Next, at step 139, the cumulative count CKBFC is cleared.

As opposed to this, when the learning conditions are satisfied, step 134 is proceeded to, where the amount of deviation KBFC(i) with respect to the cylinders is added to the corresponding cumulative value KBFCI(i), then the cumulative count CKBFC is incremented by exactly 1 at step 135. Next, at step 136, it is judged if the cumulative count CKBFC has become "8" or not. When the cumulative count CKBFC is not "8", the processing cycle is ended. When the cumulative count CKBFC has become "8", step 137 is proceeded to, where the correction coefficient KTb(i) is calculated. That is, if the amount of deviation KBFC(i) is cumulatively added eight times for each cylinder, step 137 is proceeded to, where the correction coefficient KTb(i) is calculated.

At step 137, the correction coefficient KTb(i) is calculated in the following way. That is, first, the cumulative value KBFCI(i) is replaced by KBFCE(i). Next, the basic correction coefficient KTbB(i) is calculated based on the following equation:

$$KTbB(i)=KTb(i)-(KBFCE(i)/8)/4$$

That is, when a deviation occurs from the elapsed time BAV(i) when assuming the actually detected elapsed time Tb(i) increases by an average constant rate of increase, the value of the current correction coefficient KTb(i) revised by exactly ¼ of the average value of the cumulative value KBFCE(i) is made the basic correction coefficient KTbB(i). Next, the average value tKTbM of the basic correction coefficients KTbB(i) for all of the cylinders is calculated based on the following equation:

$$tKTbM=(KTbB(1)+KTbB(2)+KTbB(3)+KTbB(4))/4$$

Next, as shown by the following equation, the basic correction coefficient KTbB(i) is revised by the average value tKTbM to update the correction coefficient KTb(i):

$$KTb(i)=KTbB(i)-tKTbM$$

The correction coefficients KTb(i) for all cylinders at the time the fuel injection is stopped during a deceleration operation are updated in this way.

next, the routine for checking permission for calculation of the torque fluctuation shown in FIG. 19 to FIG. 21 will be explained referring to FIG. 22. This routine is set so as to prohibit the calculation of the amount of torque fluctuation for a specific cylinder when the amplitude AMP of the fluctuation of difference of elapsed times DTa(i) (FIG. 13) becomes large due to the vehicle traveling over a bumpy road.

That is, referring to FIG. 19 to FIG. 21, first, at step 201, whether one of the cylinders is currently at ATDC 30° or not is judged. When none of the cylinders is currently at ATDC 30°, the processing cycle is ended, while when one of the cylinders is at ATDC 30°, step 202 is proceeded to.

At step 202 to step 204, the maximum difference of elapsed times DT30max when the difference of elapsed times DTa(i) increases and then decreases is calculated. That is, at step 202, whether the DTa(i) calculated at step 106 is larger than the maximum difference of elapsed times DT30max or not is judged. When DT30max>DTa(i), step 205 is jumped to, while when DT30max≦DTa(i), step 203 is proceeded to, where DTa(i) is made DT30max. Next, at step 204, the increase flag XMXREC showing that DTa(i) is increasing is set (XMXREC—"1"), then step 205 is proceeded to.

Figure 15:
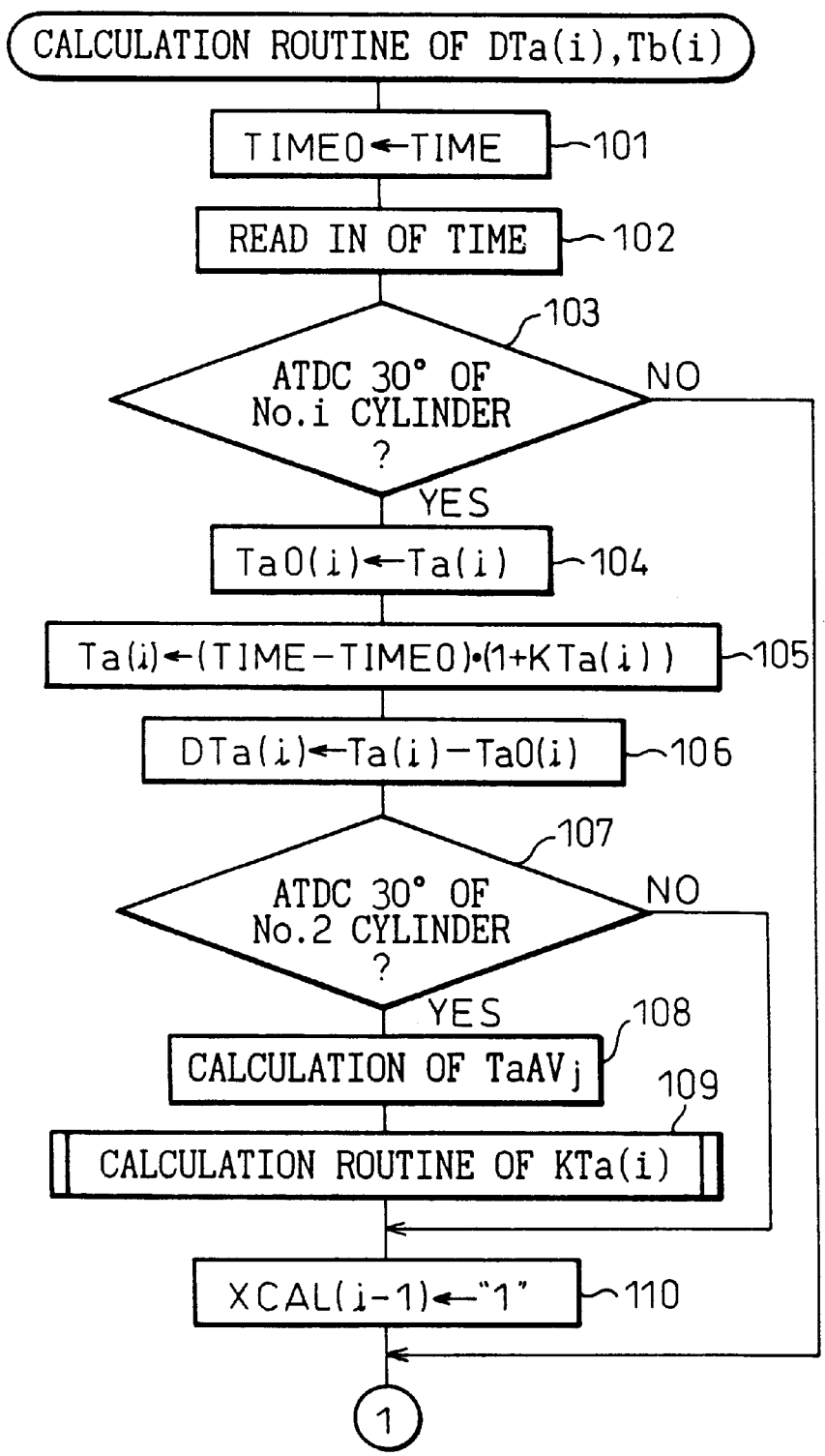
FIGS. 15 and 16 are flowcharts for calculating the difference of elapsed times DTa(i) and the elapsed time Tb(i)

At step 205 to step 207, the minimum difference of elapsed times DT30min when the difference of elapsed time DTa(i) decreases and then increases is calculated. That is, at step 205, it is judged whether the DTa(i) calculated at step 106 of FIG. 15 is smaller than the minimum difference of elapsed times DT30min or not. When DT30min<DTa(i), step 208 is jumped to, while when DT30min≧DTa(i), step 206 is proceeded to, where DTa(i) is made DT30min. Next, at step 207, the decrease flag XMNREC showing that DTa(i) has decreased is set (XMNREC—"1"), then step 208 is proceeded to.

At step 208 to step 214, when the amplitude AMP of the fluctuation of DTa(i) (FIG. 13) has exceeded the set value $A_o$, the prohibition flag prohibiting the calculation of the amount of torque fluctuation for the cylinder giving the maximum DTa(i) is set. That is, at step 208, it is judged whether DT30max>DTa(i) and XMXREC="1" or not. When DT30max≦DTa(i) or the increase flag XMXREC is reset (XMXREC="0"), step 215 is jumped to, while when DT30max>DTa(i) and XMXREC="1", step 209 is proceeded to.

Figure 22:
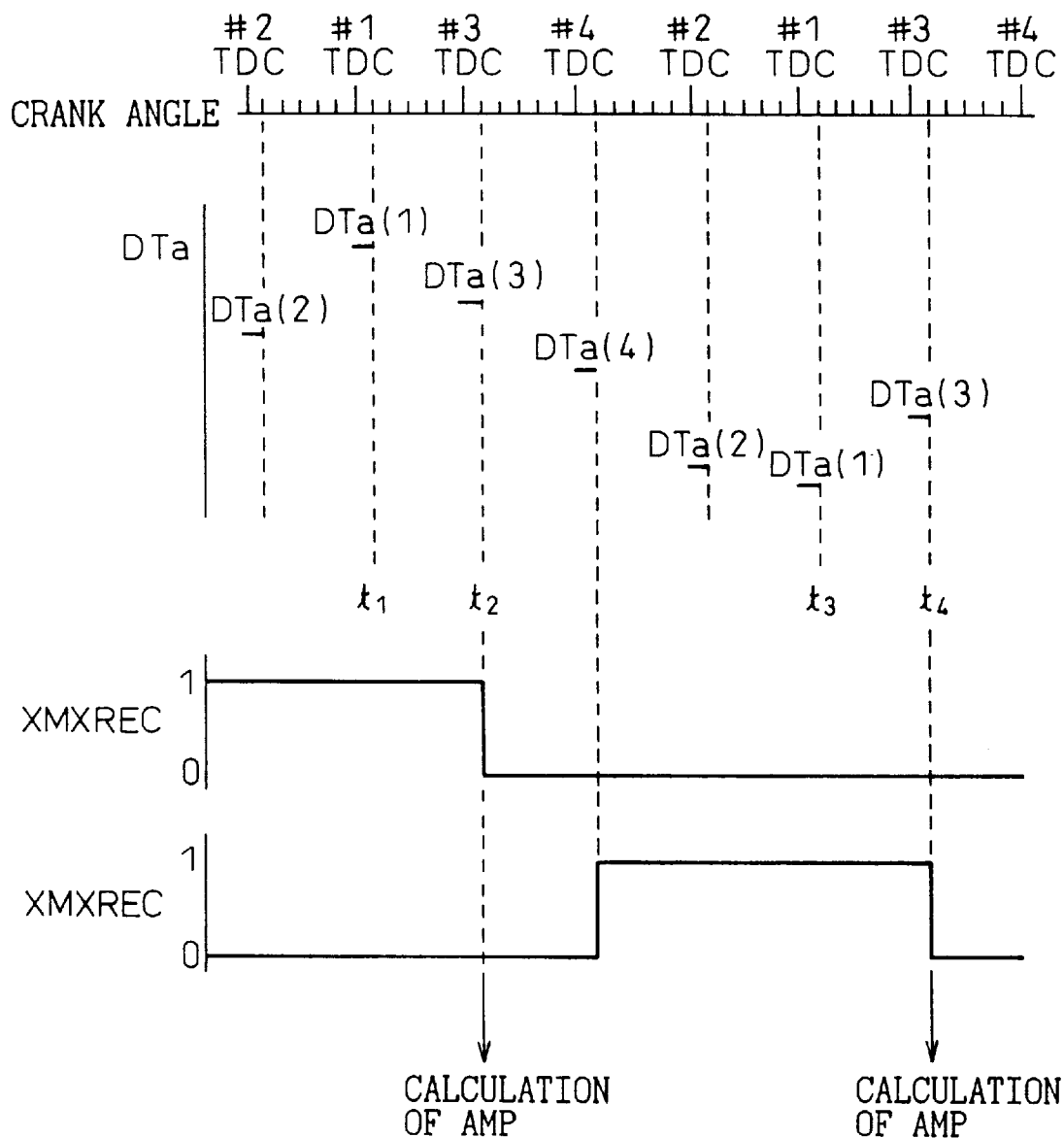
FIG. 22 is a time chart of the changes of the difference of elapsed times DTa(i) and the changes of the flags XMXREC and XMNREC.

That is, as shown in FIG. 22, assume that at the time $t_1$, the difference of the elapsed times DTa(1) of the No. 1 cylinder #1 has become maximum. In this case, in the interruption routine performed at the time $t_1$, step 202 to step 203 is proceeded to, where the DTa(1) is made DT30max, then, at step 204, the maximum flag XMXREC is set. On the other hand, in the interruption routine performed at the time $t_2$ of FIG. 22, step 202 to step 205 is jumped to. At this time, since it is judged at step 208 that DT30max>DTa(3) and XMXREC="1", step 209 is proceeded to. That is, step 209 is proceeded to at the time $t_2$ when the elapsed time DTa(i) starts to decrease.

At step 209, the maximum difference of elapsed times DT30max is made TMXREC. Next, at step 210, the minimum difference of elapsed times TMNREC (found at the later explained step 216) is subtracted from the maximum difference of elapsed times TMXREC so as to calculate the amplitude AMP of the fluctuation of DTa(i). Next, at step 211, the initial value of the minimum difference of elapsed times DT30 min is made DTa(i). Next, at step 212, the increase flag XMXREC is reset (XMXREC—"0"). Next, at step 213, whether the amplitude AMP is larger than the set value $A_0$ or not is judged. When AMP<$A_0$, step 215 is jumped to. As opposed to this, when AMP≧$A_0$, step 214 is proceeded to, where the torque fluctuation calculation prohibition flag XNOCAL is set (XNOCAL—"1"). That is, in the interruption routine performed at the time $t_2$ of FIG. 22, as explained above, the amount of torque fluctuation of the No. 1 cylinder #1 is calculated. Therefore, in this interruption routine, when AMP≧$A_o$ and the torque fluctuation calculation prohibition flag XNOCAL is set, the calculation of the amount of torque fluctuation of the No. 1 cylinder #1, that is, the calculation of the amount of torque fluctuation of the cylinder giving the maximum DTa(i), is prohibited.

At step 215 to step 221, when the amplitude AMP of the fluctuation of DTa(i) has exceeded the set value $A_0$, the prohibition flag prohibiting the calculation of the amount of torque fluctuation of the cylinder giving the minimum DTa(i) is set. That is, at step 215, it is judged whether DT30min<DTa(i) and XMNREC="1" or not. When DT30min≧DTa(i) or the decrease flag XMXREC is reset (XMNREC="0"), step 222 is jumped to, while when DT30min <DTa(i) and XMNREC="1", step 216 is proceeded to.

that is, as shown in FIG. 22, at the time $t_3$, the difference of elapsed times DTa(1) of the No. 1 cylinder #1 is considered to have become the minimum. In this case, at the interruption routine performed at the time $t_3$, step 205 to step 206 are proceeded to, where the DTa(1) is made DT30min, then at step 207, the decrease flag XMNREC is set. On the other hand, the interruption routine performed at the time $t_4$ of FIG. 22 jumps from step 205 to step 208. At this time, since it is judged at step 215 that DT30min<DTa(3) and XMNREC="1", step 216 is proceeded to. That is, step 216 is proceeded to at the time $t_4$ where the difference of elapsed times DTa(i) starts to be increased.

At step 216, the minimum difference of elapsed times DT30min is made TMNREC. Next, at step 217, the minimum difference of elapsed times TMNREC is subtracted from the maximum difference of elapsed times TMXREC whereby the amplitude AMP of the fluctuation of DTa(i) is calculated. Next, at step 218, the initial value of the maximum difference of elapsed times DT30max is made DTa(i). Next, at step 219, the decrease flag XMNREC is reset (XMNREC—"0"). Next, at step 220, it is judged whether the amplitude AMP is larger than the set value $A_0$ or not. When AMP<$A_0$, step 222 is jumped to. As opposed to this, when AMP≧$A_0$, step 221 is proceeded to, where the torque fluctuation calculation prohibition flag XNOCAL is set (XNOCAL—"1"). That is, in the interruption routine performed at the time $t_4$ of FIG. 22, the amount of torque fluctuation of the No. 1 cylinder #1 is calculated. Therefore, in this interruption routine, when AMP≧$A_0$ and the torque calculation prohibition flag XNOCAL is set, the calculation of the amount of torque fluctuation of the No 1 cylinder #1, that is, the calculation of the amount of torque fluctuation of the cylinder where DTa(i) becomes smallest, is prohibited.

At step 222 and step 223, the calculation of the amount of torque fluctuation of a cylinder where the elapsed time DTa(i) changes sharply is prohibited. That is, at step 222, whether |DTa(i−2)−DTa(i−1)|is larger than $K_0$.|DTa(i−1)−DTa(i)|or not is judged. Here, the constant $K_0$ is a value of about 3.0 to 4.0 . When it is judged at step 222 that |DTa(i−2)−DTa(i−1)|<$K_0$.|DTa(i−1)−DTa(i)|, the processing routine is ended, while when it is judged that |DTa(i−2)−DTa(i−1)|≧$K_0$.|DTa(i−1)−DTa(i)|, step 223 is proceeded to, where the torque fluctuation calculation prohibition flag XNOCAL is set.

That is, when the interruption routine is at the time $t_3$ of FIG. 22, whether at this time |DTa(4)−DTa(2)|≧$K_0$.|DTa(2)−DTa(1)| or not is judged. As shown in FIG. 22, when DTa(2) changes rapidly from DTa(4), |DTa(4)−DTa(2)| becomes larger than $K_0$. |DTa(2)−DTa(1)|. At this time, the torque fluctuation calculation prohibition flag is set and the calculation of the amount of torque fluctuation of the No. 2 cylinder #2 where the elapsed time DTa(i) has changed sharply is prohibited.

Next, the torque fluctuation calculation routine shown in FIG. 23 will be explained. Referring to FIG. 23, first, at step 301, whether the flag XCAL(i−1) showing that the amount of torque fluctuation of the No. (i−1) cylinder where combustion had been performed one time before should be calculated is set or not is judged. When the flag XCAL(i−1)="0", that is, when the flag XCAL(i−1) is not set, the processing cycle is ended. As opposed to this, when the flag XCAL(i−1)="1", that is the flag XCAL(i−1) is set, step 302 is proceeded to, where the flag XCAL(i−1 ) is reset, then step 303 is proceeded to.

At step 303, whether the prohibition flag XNOCAL prohibiting the calculation of the amount of torque fluctuation for the cylinder at which the combustion was performed one time before is reset (XNOCAL="0") or not is judged. When this prohibition flag is set (XNOCAL="1"), step 311 is proceeded to, where the prohibition flag XNOCAL is reset. As opposed to this, when the prohibition flag is reset, step 304 is proceeded to. That is, only when the flag XCAL is set and the prohibition flag XNOCAL is reset, step 304 is proceeded to.

At step 304, the assumed difference of elapsed times Kb(i−1) of the No. (i−1) cylinder where the combustion was performed one time before (see FIG. 10 and FIG. 11) is calculated based on the following equation:

$$Kb(i-1)=\{2.DTa(i-1)+DTa(i)\}/3$$

Next, at step 305, the actual output torque DN(i−1) of the No. (i−1) cylinder where combustion was performed one time before is calculated based on the following equation:

$$DN(i-1)=\{30°/Tb(i-1)\}^2-\{30°/Ta(i-1)\}^2$$

Next, at step 306, the assumed output torque DNS(i−1) of the No. (i−1) cylinder where combustion had been performed one time before is calculated based on the following equation:

$$DNS(i-1)=\{30°/(TbO(i-1)+Kb(i-1))\}^2-\{30°/Ta(i-1)\}^2$$

Next, at step 307, as shown in the following equation, the actual output torque DN(i−1) is subtracted from the assumed output torque DNS(i−1) to calculate the amount of torque fluctuation DLN(i−1) of the No. (i−1) cylinder where combustion had been performed one time before.

$$DLN(i-1)=DNS(i-1)-DN(i-1)$$

That is, for example, when the No. 3 cylinder #3 is at ATDC 30° and the flag XCAL(1) is set, the different of elapsed times Kb(1) for the No. 1 cylinder #1 is calculated at step 304, then the actual output torque DN(1) of the No. 1 cylinder #1 is calculated at step 305, the assumed output torque DNS(1) of the No. 1 cylinder #1 is calculated at step 306, then the amount of torque fluctuation DLN(1) of the No. 1 cylinder #1 is calculated at step 307.

Note that when finding the amount of torque fluctuation GLN(i−1) of the cylinders, the following calculation may be performed from step 305 to step 307.

That is, at step 305, instead of finding the actual amount of torque fluctuation DN(i−1), the actual amount of output fluctuation GN(i−1) is calculated based on the following equation:

$$GN(i-1)=\{30°/Tb(i-1)\}-\{30°/Ta(i-1)\}$$

Next, at step 306, instead of finding the assumed amount of torque fluctuation DNS(i−1), the assumed amount of output fluctuation GNS(i−1) is calculated based on the following equation:

$$GNS(i-1)=\{30°/(TbO(i-1)+Kb(i-1)0\}-\{30°/Ta(i-1)\}$$

Next, at step 307, instead of finding the amount of torque fluctuation DLN(i−1), the amount of output fluctuation GLN(i−1) is calculated based on the following equation:

$$GLN(i-1)=GNS(i-1)-GN(i-1)$$

Next, when the amount of torque fluctuation DLN(i−1) is calculated at step 307, step 308 is proceeded to, where it is judged whether the amount of torque fluctuation DLN(i−1) is positive or not. When DLN(i−1) ≧0, step 310 is jumped to, where the cumulative addition request flag XCDLN(i−1) showing that the amount of torque fluctuation DLN(i−1) of the cylinder at which the combustion was performed one time before should be cumulatively added is set (XCDLN (i−1)—"1"). As opposed to this, when DLN(i−1)<0, step 309 is proceeded to, where DLN(i−1) is made zero, then step 310 is proceeded to. Note that, the torque of each cylinder repeatedly rises and falls, so in this case to find the amount of torque fluctuation, it is sufficient to cumulatively add either the amount of increase of the torque or the amount of decrease of the torque. In the routine shown in FIG. 23, just the amount of decrease of the torque is cumulatively added, therefore, as explained above, when DLN(i−1) <0, DLN(i−1) is made zero.

Next, the processing of the counter CDLNIX will be explained referring to FIG. 24. The count value of the counter CDLNIX is used for the later explained calculation of the torque fluctuation value of the engine.

Referring to FIG. 24, first, at step 401, whether the No. 3 cylinder #3 is currently at ATDC 30° or not is judged. When the No. 3 cylinder #3 is currently not at ATDC 30°, the processing cycle is ended, while when the No. 3 cylinder #3 is currently at ATDC 30°, step 402 is proceeded to. At step 402, whether the conditions for calculating the torque fluctuation value are satisfied or not is judged. For example, when the conditions for making the air-fuel ratio lean are not satisfied or the amount of change per unit time ΔPM of the engine load Q/N is more than the set value or the amount of change per unit time ΔN of the engine speed is more than a set value, it is judged that the conditions for calculating the torque fluctuation value are not satisfied, while at other times it is judged that the conditions for calculating the torque fluctuation value are satisfied.

When it is judged at step 402 that the conditions for calculating the torque fluctuation value are satisfied, step 408 is proceeded to, where the count value CDLNIX is incremented by exactly 1. The increment action of this count value CDLNIX is performed every time the No. 3 cylinder #3 reaches ATDC 30°, that is, every 720° crank angle. Next, at step 409, the average value of the engine speed $N_{AVE}$ and the average value $Q_{AVE}$ of the amount of intake air Q in the period from when the increment action of the count value CDLNIX is started to when the count value CDLNIX is cleared are calculated.

On the other hand, when it is judged at step 402 that the conditions for calculating the torque fluctuation value are not satisfied, step 403 is proceeded to, where the count value CDLNIX is cleared. Next, at step 404, the cumulative value DLNI(i) of the torque fluctuation value DLN (i) for each cylinder (this cumulative value is calculated by the later explained routine) is cleared. Next, at step 405, the cumulative count value CDLNI(i) for each cylinder (this cumulative count value is calculated by the later explained routine) is cleared.

Figure 26A:
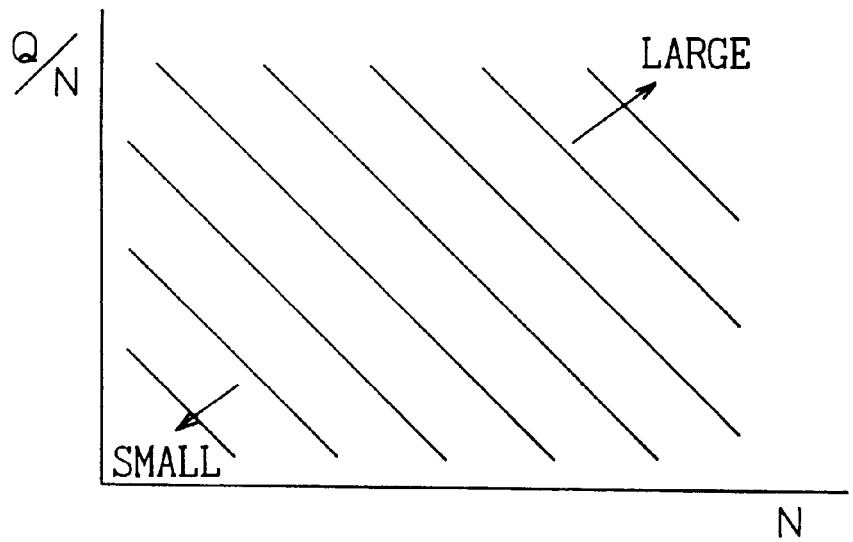
FIGS. 26A and 26B are views of a target torque fluctuation value.

Next, at step 406, the target torque fluctuation value LVLLFB is calculated. In this embodiment according to the present invention, as explained later, the air-fuel ratio is feedback controlled so that the calculated torque fluctuation value becomes this target torque fluctuation value LVLLFB. This target torque fluctuation value LVLLFB, as shown by FIG. 26A showing the equivalent fluctuation value by the solid line, becomes larger the higher the engine load Q/N and become larger the higher the engine speed N. This target torque fluctuation value LVLLFB is stored in the ROM 22 in advance in the form of a map shown in FIG. 26B as a function of the engine load Q/N and the engine speed N. Next, at step 407, the torque fluctuation value DLNISM(i) of each cylinder (this torque fluctuation value is calculated by the later explained routine) is made the target torque fluctuation value LVLLFB calculated from the map of FIG. 26B.

Figure 28:
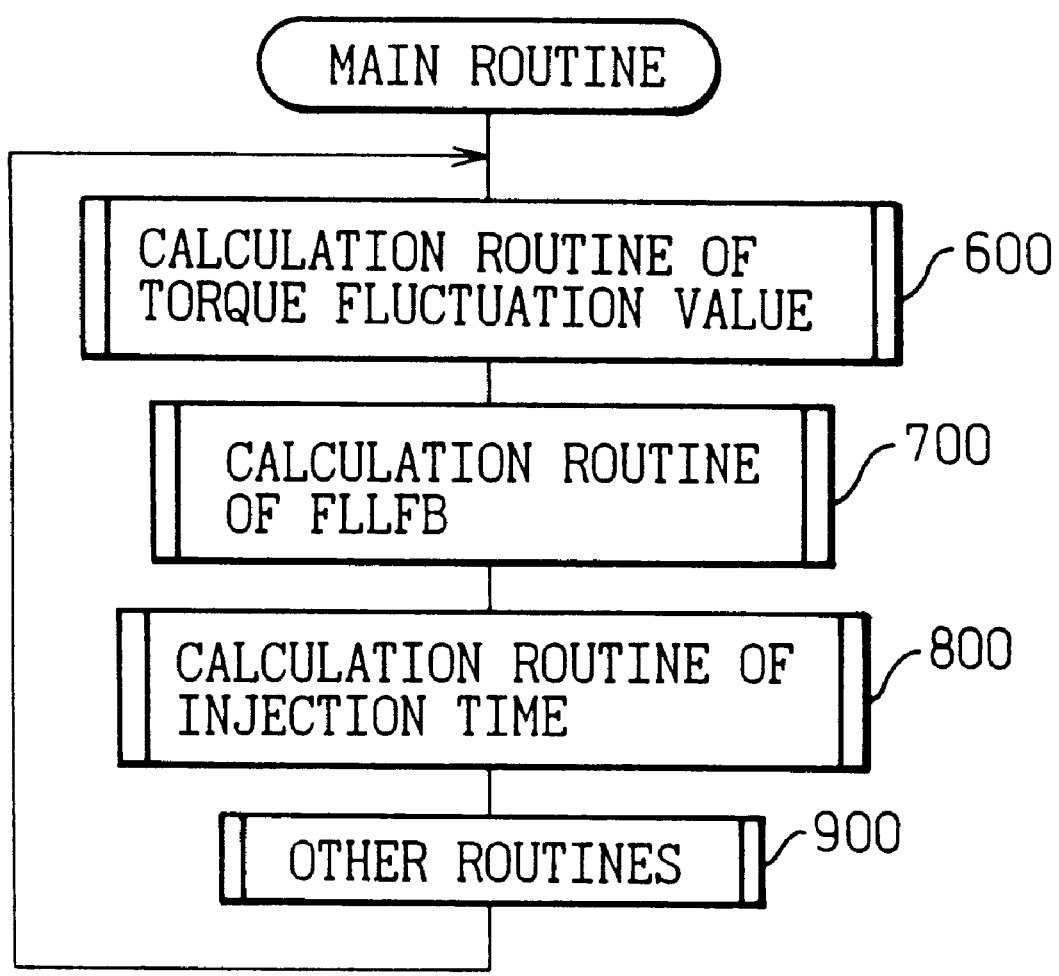
FIG. 28 is a flowchart showing a main routine.
Figure 29:
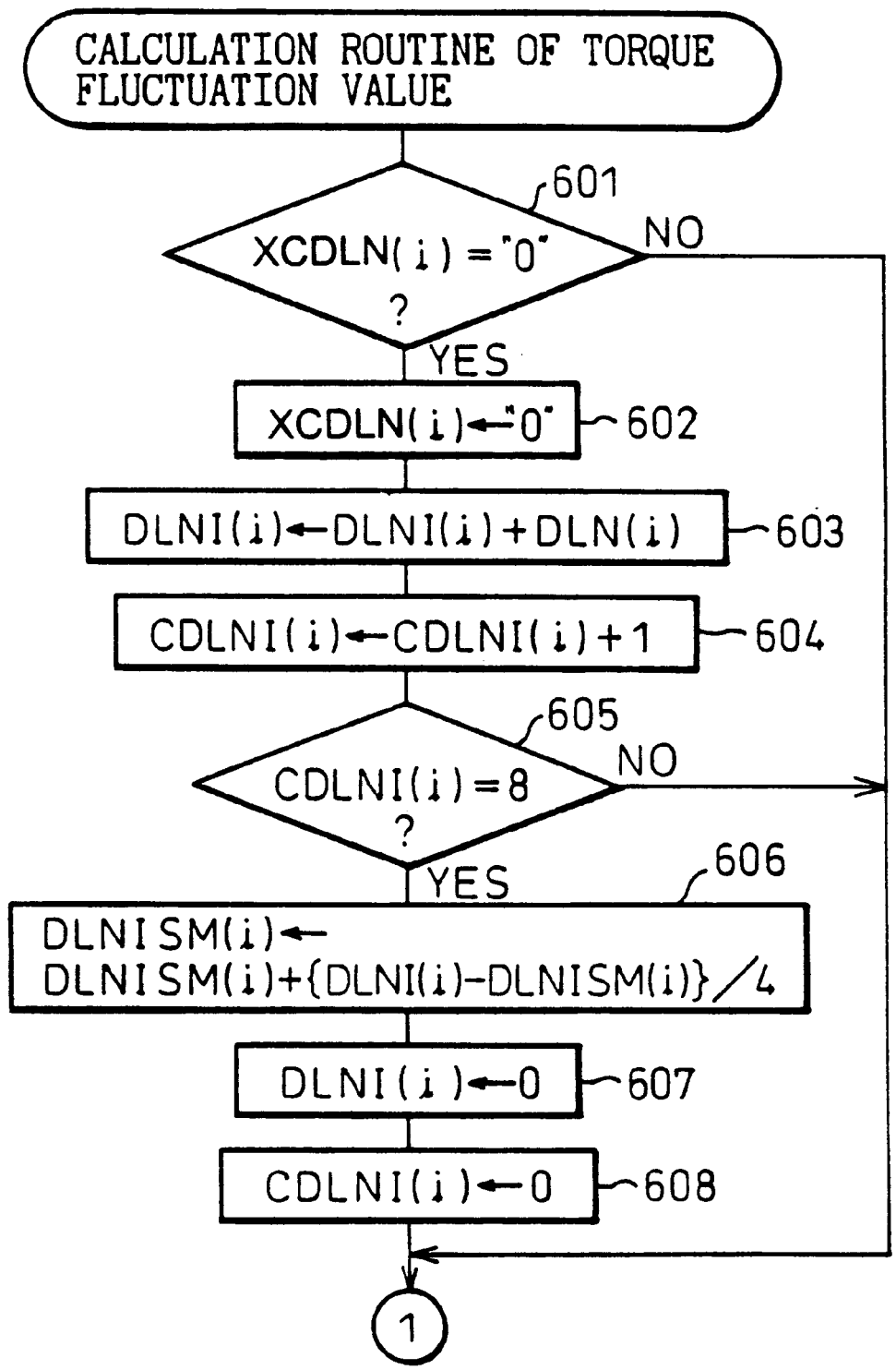
FIGS. 29 and 30 are flowcharts for calculating the torque fluctuation value.
Figure 30:
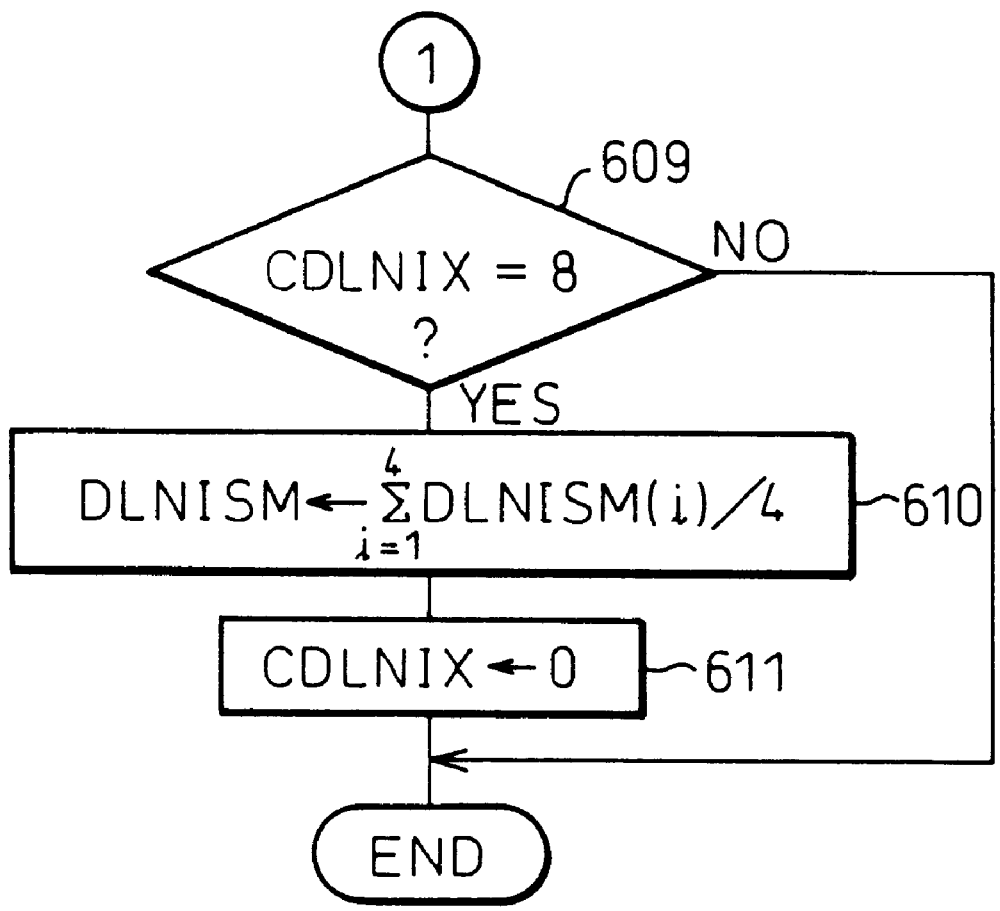
Figure 31:
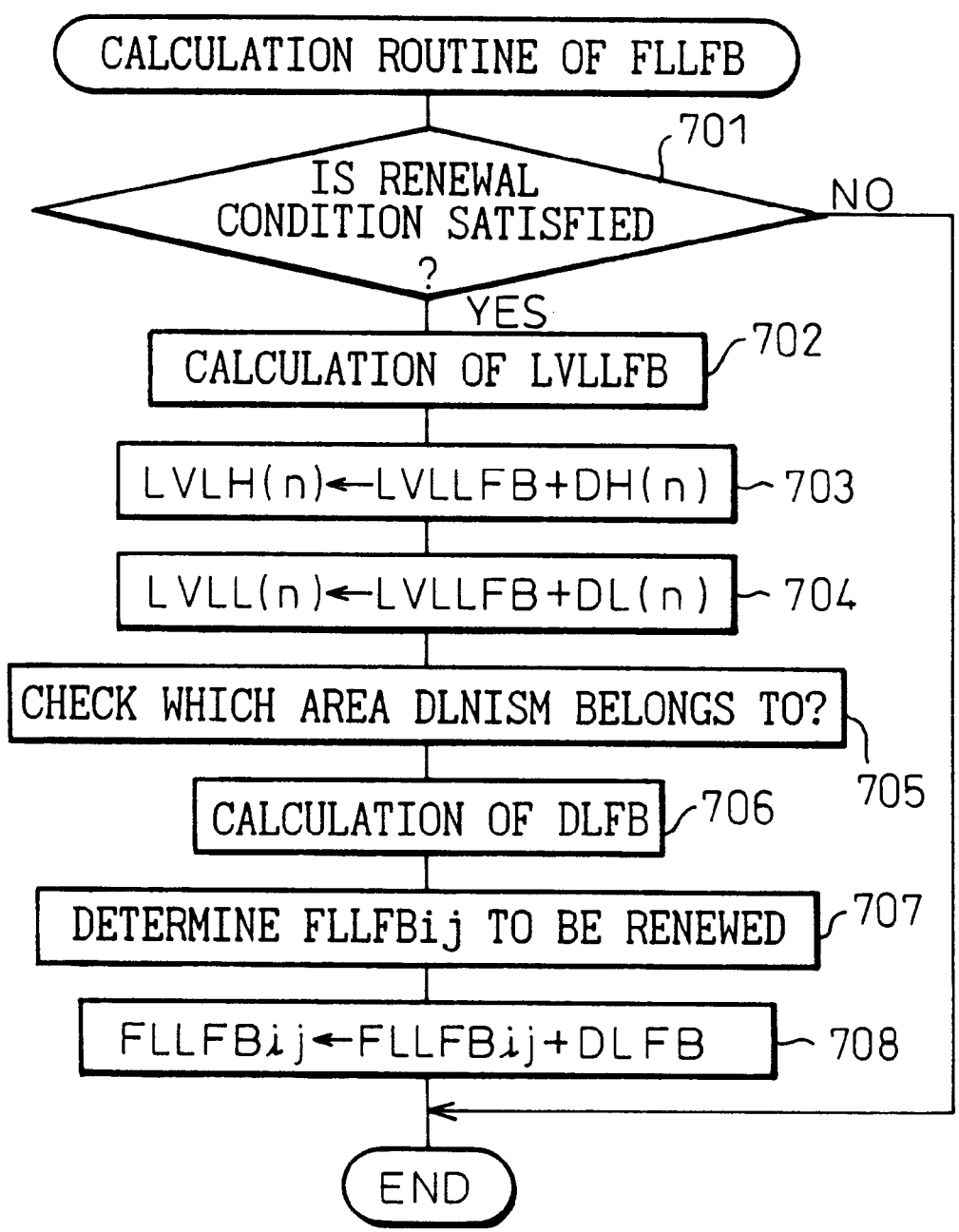
FIG. 31 is a flowchart of the calculation of a lean limit feedback correction coefficient.
Figure 32:
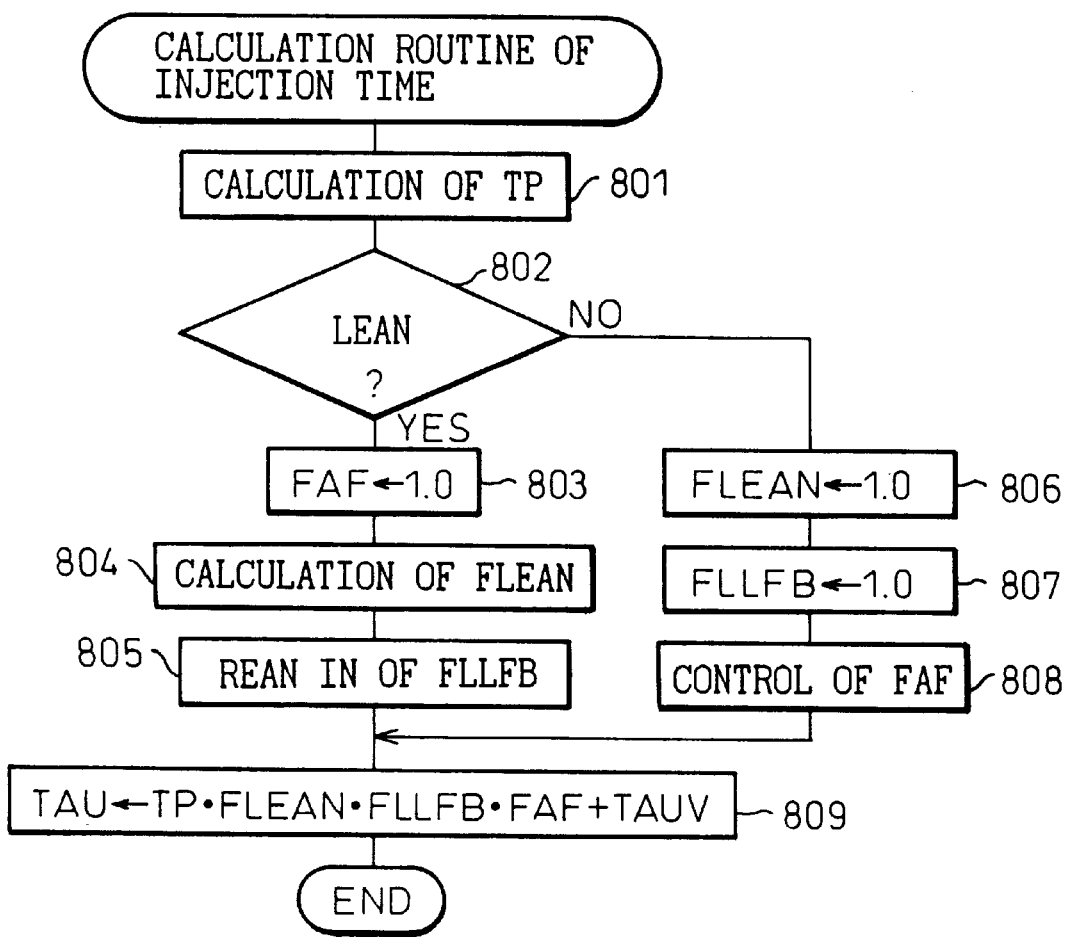
FIG. 32 is a flowchart for calculating the fuel injection time.

FIG. 28 shows the repeatedly executed main routine. In this main routine, first the routine for calculation of the torque fluctuation value (step 600) is executed. This routine is shown in FIG. 29 and FIG. 30. Next, the routine for calculation of the lean limit feedback correction coefficient FLLFB (step 700) is executed. This routine is shown in FIG. 31. Next, when the predetermined crank angle is reached, the routine for calculation of the fuel injection time (step 800) is executed. This routine is shown in FIG. 32. Next, the other routines (step 900) are executed.

Next, the routine for calculation of the torque fluctuation value shown in FIG. 29 and FIG. 30 will be explained.

Referring to FIG. 29 and FIG. 30, first, at step 601, whether the cumulative addition request flag XCDLN(i) showing that the amount of torque fluctuation DLN(i) should be cumulatively added is set (XCDLN(i)="1") or not is judged. When the cumulative addition request flag XCDLN(i) is not set, step 602, the cumulative addition request flag XCDLN(i) is reset. Next, at step 603, the amount of torque fluctuation DLN(i) is added to the cumulative value DLNI(i) of the amount of torque fluctuation. Next, at step 604, the cumulative count value CDLNI(i) is incremented by exactly 1. That is, for example, at step 601, if the cumulative addition request flag XCDLN(i) is set for the No. 1 cylinder, this flag XCDLN(1) is reset at step 602, the cumulative value DLNI(1) of the amount of torque fluctuation is calculated at step 603, and the cumulative count value CDLNI(1) is incremented by exactly 1 at step 604.

Next at step 605, whether the cumulative count value CDLNI(i) has become "8" or not is judged. When CDLNI(i) is not "8", step 609 is jumped to, while when CDLNI(i) becomes "8", step 606 is proceeded to, where the torque fluctuation value DLNISM(i) of the cylinders is calculated from the following equation:

$$DLNISM(i)=DLNISM(i)+\{DLNI(i)-DLNISM(i)\}/4$$

Next, at step 607, the cumulative value DLNI(i) of the amount of torque fluctuation for the cylinders is cleared. Next, at step 608, the cumulative count value CDLNI(i) is reset.

That is, when there is a difference between the calculated cumulative value DLNI(i) of the amount of torque fluctuation and the previously used amount of torque fluctuation DLNISM(i), the value of the different {DLNI(i)−DLNISM (i)} multiplied ¼ is added to the amount of torque fluctuation DLNISM(i). Therefore, for example, when the cumulative count value CDLNI(1) for the No. 1 cylinder #1 become "8", at step 606, the torque fluctuation value DLNISM(1) is calculated.

Next, at step 609, whether the count value CDLNIX calculated at the routine shown in FIG. 24 has become "8" or not is judged. When CDLNIX is not "8", the processing cycle is ended, while when CDLNIX becomes "8", step 610 is proceeded to, where the mean value DLNISM (={DLNISM (1)+DLNISM (2)+DLNISM (3)+DLNISM (4)}/4) of the mean torque fluctuation values DLNSIM(i) of the cylinders is calculated. Next, at step 611, the count value CDLNIX is cleared. In this way, the value DLNISM expressing the amount of torque fluctuation of the engine is calculated.

Note that, as explained above, the count value CDLNIX is incremented by exactly 1 with each 720° crank angle. Unless the calculation of the torque is prohibited for one of the cylinders, when the count value CDLNIX has become "8", the cumulative count values CDLNI(1), CDLNI(2), CDLNI(3), and CDLNI(4) for all of the cylinders have already become "8". Therefore, in this case, the torque fluctuation value DLNISM(i) for all of the cylinders is calculated. On the other hand, for example, if the calculation of the amount of torque fluctuation for the No. 1 cylinder #1 is prohibited, when the count value CDLNIX has become "8", just the cumulative count value CDLNI(1) of the No. 1 cylinder #1 does not become "8", so the new cumulative value CLNI(1) of the amount of torque fluctuation for the No. 1 cylinder #1 is not calculated. Therefore, in this case, when finding the mean torque fluctuation value DLNISM at step 610, the previously calculated torque fluctuation value DLNISM(1) is used just for the No. 1 cylinder #1.

Next, the routine for calculation of FLLFB will be explained referring to FIG. 31.

Referring to FIG. 31, first, at step 701, whether the conditions for updating the lean limit feedback correction coefficient FLLFB are satisfied or not is judged. For example, at the time of engine warmup or when the operating state of the engine is not in the learning region enclosed by the broken lines in FIG. 5, it is judged that the conditions for updating are not satisfied, while at other times it is judged that the conditions for updating are satisfied. When the conditions for updating are not satisfied, the processing cycle is ended, while when the conditions for updating are satisfied, step 702 is proceeded to.

Figure 26B:
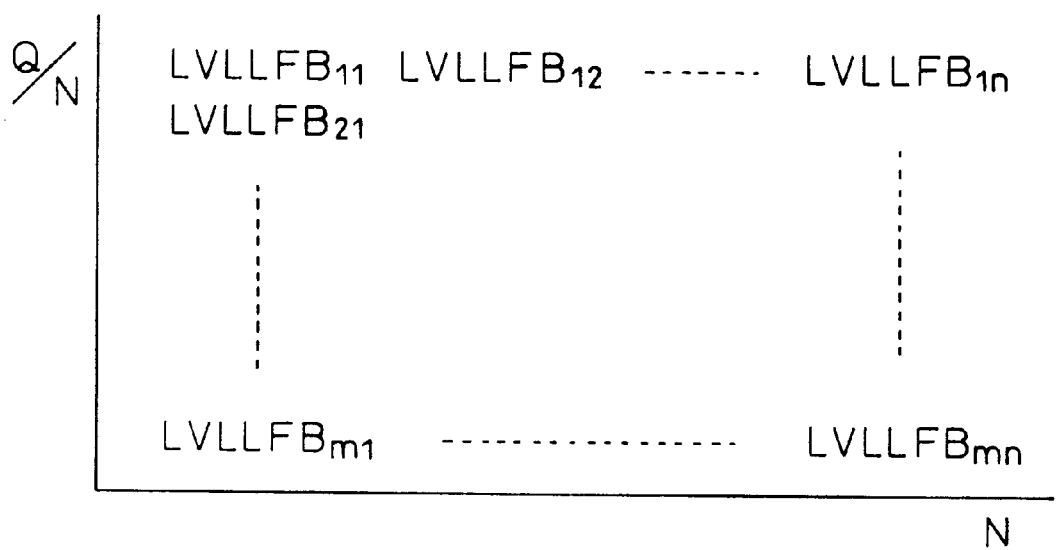

At step 702, the target torque fluctuation value LVLLFB is calculated from the engine load Q/N and the engine speed N based on the map shown in FIG. 26B. Next, at step 703 and step 704, the levels of torque fluctuation LVLH(n) and LVLL(n) shown in the following equations are calculated based on the fluctuation amount judgement values DH(n) and DL(n) in accordance with the target torque fluctuation value LVLLFB:

$$LVLH(n) = LVLLFB + DH(n)$$

$$LVLL(n) = LVLLFB + DL(n)$$

Figures 27A, 27B:
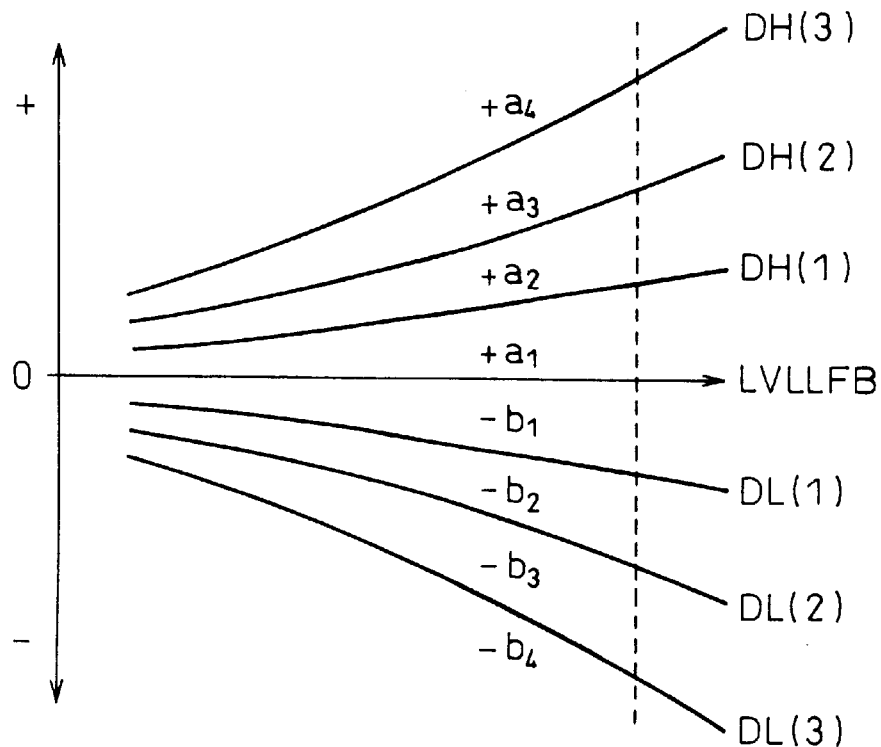
FIGS. 27A and 27B are views of the fluctuation amount judgement values DH(n) and DL(n) and the levels of torque fluctuation LVLH(n) and LVLL(n)

Here, the fluctuation amount judgement values DH(n) and DL(n) are determined in advance as shown in FIG. 27A. That is, as will be understood from FIG. 27A, three positive values are set for DH(n) which are in the relationship of DH(3)>DH(2)>DH(1). Further, these DH(1), DH(2), and DH(3) gradually increase as the target torque fluctuation value LVLLFB becomes larger. On the other hand, three negative values are set for DL(n) which are in the relationship of DL(1)>DL(2)>DL(3). Further, the absolute values of these DL(1), DL(2), and DL(3) gradually increase as the target torque fluctuations values LVLLFB becomes larger.

Assume however that the target torque fluctuation value LLVVFB calculated at step 702 is the value shown by the broken line. In this case, at step 703, the values of DH(1), DH(2), and DH(3) on the broken line plus the target torque fluctuation value LVLLFB are made the levels of torque fluctuation LVLH(1), LVLH(2), and LVLH(3) and, at step 704, the values of DL(1), DL(2), and DL(3) on the broken line plus the target torque fluctuation values LVLLFB are made the levels of torque fluctuation LVLL(1), LVLL(2), and LVLL(3).

On the other hand, the feedback correction values $+a_1$, $+a_2$, $+a_3$, $+a_4$, $-b_1$, $-b_2$, $-b_3$, and $-b_4$ are determined in advance for the regions between the levels of torque fluctuation LVLH(n) and LVLL(n) as shown in FIG. 27B. For example, the feedback correction value becomes $+a_2$ for the region where the level of torque fluctuation is between LVLH(1) and LVLH(2). These feedback correction values are $+a_4 > +a_3 > +a_2 > +a_1$ and $-b_1 > -b_2 > -b_3 > -b_4$. The feedback correction values $+a_1$, $+a_2$, $+a_3$, $+a_4$, $-b_1$, $-b_2$, $-b_3$, and $-b_4$ shown in FIG. 27B are shown in the corresponding regions of FIG. 27A.

When the levels of torque fluctuation LVLH(n) and LVLL (n) are calculated at step 703 and step 704, step 705 is proceeded to, where whether the mean torque fluctuation value DLNISM calculated in the routine for calculation of the torque fluctuation value shown in FIG. 29 and FIG. 30 is between the levels of torque fluctuation LVLH(n) and LVLL(n) shown in FIG. 27B or not is judged. Next, at step 706, the corresponding feedback correction value DLFB is calculated. For example, when the target fluctuation level LVLLFB is the value shown by the broken line in FIG. 27A and the calculated mean torque fluctuation value DLNISM is between LVLH(1) and LVLH(2) of FIG. 27B, that is the deviation of the mean torque fluctuation value DLNISM from the target fluctuation level LVLLFB is between DH(1) and DH(2) on the broken line in FIG. 27A, the feedback correction value DLFB is made $+a_2$.

Next, at step 707, what lean limit feedback correction coefficient of which learning region shown in FIG. 5 the lean limit feedback correction coefficient FLLFBij to be updated based on the average value of the engine speed $N_{AVE}$ and the average value $PM_{AVE}$ of the amount of intake air Q found at step 409 of the processing routine of CDLNIX shown in FIG. 24 is determined. Next, at step 708, the lean limit feedback correction coefficient FLLFBij determined at step 707 is increased by the feedback correction value DLFB.

That is, as explained above, when for example, DLNISM>LVLLFB and LVLH(1)<DLNISM<LVLH(2), the lean limit feedback correction coefficient FLLFBij is increased by $+a_2$. As a result, the air-fuel ratio becomes smaller, so the amount of torque fluctuation of each cylinder is reduced. On the other hand, when DLNISM<LVLLFB and LVLL(1)>DLNISM>LVLL(2), the lean limit feedback correction coefficient FLLFBij is increased by $-b_2$. As a result, the air-fuel ratio becomes larger, so the amount of torque fluctuation of the cylinders is increased. In this way the air-fuel ratio at the time of lean operation is controlled so that the mean torque fluctuation value DLNISM of all of the cylinders becomes the target torque fluctuation value LVLLFB.

Note that, when the conditions for calculation of the torque fluctuation value in the routine shown in FIG. 24 are not satisfied, at step 407, the DLNISM(i) for all of the cylinders is made LVLLFB and therefore the mean torque fluctuation value DLNISM is also made the target torque fluctuation value LVLLFB. Therefore, at this time, the lean limit feedback correction coefficient FLLFBij is not updated.

Next, the routine for calculation of the fuel injection time will be explained with reference to FIG. 32.

Figure 2:
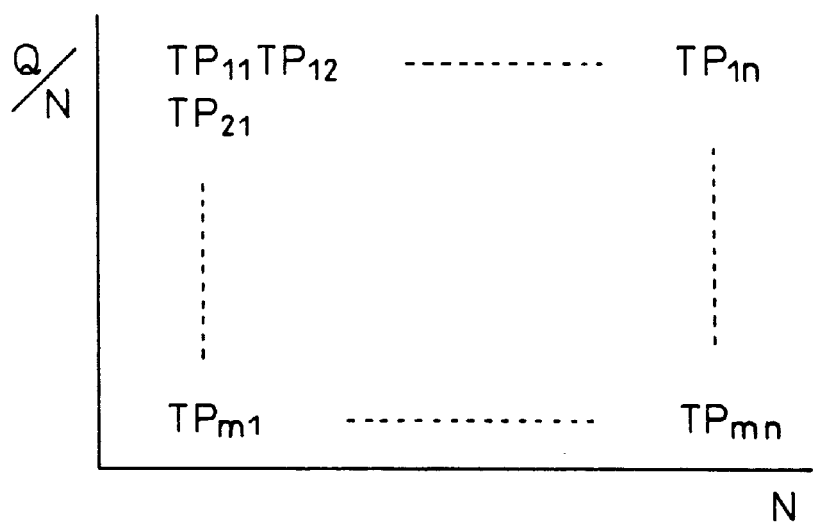
FIG. 2 is a view of a map of the basic fuel injection time.

Referring to FIG. 32, first, at step 801, the basic fuel injection time TP is calculated from the map shown in FIG. 2. Next, at step 802, whether the operating state is one in which a lean operation should be performed or not is judged. When the operating state is one in which a lean operation should be performed, step 803 is proceeded to, where the value of the stoichiometric air-fuel ratio feedback correction coefficient FAF is fixed at 1.0. Next, at step 804, the lean correction coefficient FLEAN is calculated from the map shown in FIG. 4, then at step 805, the lean limit feedback correction coefficient FLLFB is read from the map shown in FIG 5. Next, at step 809, the fuel injection time TAU is calculated from the following equation:

$$TAU=Tp.FLEAN.FLLFB.FAF+TAUV$$

As opposed to this, when it is judged at step 802 that the operating state is not one where a lean operation should be performed, that is, when the air-fuel ratio should be made the stoichiometric air-fuel ratio, step 806 is proceeded to, where the lean correction coefficient FLEAN is fixed at 1.0, then, at step 807, the lean limit feedback correction coefficient FLLFB is fixed at 1.0. Next, at step 808, the stoichiometric air-fuel ratio feedback correction coefficient FAF is controlled based on the output signal of the air-fuel ratio sensor 17 so that the air-fuel ratio becomes the stoichiometric air-fuel ratio. Next, step 809 is proceeded to, where the fuel injection time TAU is calculated.

Next, an explanation will be made of an example of a second embodiment shown from FIG. 33 to FIG. 38.

As explained above, when torsional vibration occurs in the drive system of the engine, this torsional vibration of the drive system causes torsional vibration to occur in the crankshaft. Further, if there is an unbalance in the drive wheels, the drive wheels 19 undergo rational vibration, which rotational vibration causes torsional vibration in the crankshaft. In this case, if the natural frequency of the drive system and the primary frequency of rotation of the drive wheels 19 match, the torsional vibration produced in the crankshaft will be increased and the vehicle will start to shake.

When calculating the amount of torque fluctuation based on the angular velocity Wa, Wb of the crankshaft as in the present invention, if the torsional vibration produced in the crankshaft is increased in the above way, the calculated amount of torque fluctuation will become larger despite the fact that the actual amount of torque fluctuation is small. If the calculated amount of torque fluctuation becomes larger the air-fuel ratio is controlled to the rich side so as to reduce the amount of torque fluctuation. Even if the air-fuel ratio is controlled to the rich side in this way, however, the torsional vibration of the crankshaft will not settle down. Therefore, if an operating state where the natural frequency of the drive system and the primary frequency of rotation of the drive wheels 19 match continues, since the air-fuel ratio will continue to be controlled to the rich side, the problem will arise that the air-fuel ratio will end up widely deviating to the rich side of the optimum air-fuel ratio. Therefore, in the second embodiment, correction of the air-fuel ratio is prohibited when the operating state is one where the natural frequency of the drive system and the primary frequency of rotation of the drive wheels 19 match.

That is, explained in more detail, the natural frequency of the drive system changes along with the shift position of the transmission 18. In the embodiment according to the present invention, the natural frequency of the drive system is near 6 Hz when the shift position is the 2nd speed position, is near 7 Hz when the shift position is the 3rd speed position, is near 8 Hz when the shift position is the 4th speed position, and is near 10 Hz when the shift position is the 5th speed position.

On the other hand, if the vehicle speed is shown by SPD (km/h) and the ratio of the drive wheels 19 is shown by R(m), the primary frequency of rotation f of the drive wheels 19 is expressed by the following equation:

$$f=SPD \cdot (100/3600) \cdot (1/2\pi R)$$

That is, the primary frequency f of rotation of the drive sheels 19 is a function of the vehicle speed SPD. The primary frequency f of rotation of the drive wheels 19 matches the natural frequency of the drive system at the specific vehicle speed SPD0 for different shift positions. The specific vehicle speed SPD0 is near 55 km/h when the shift position is the 2nd speed position. When the shift position is the 3rd speed position, it is near 70 km/h. When the shift position is the 4th speed position, it is near 80 km/h. When the shift position is the 5th speed position, it is near 85 km/h.

Therefore, in the second embodiment, when the vehicle speed SPD is in a predetermined range for different shift positions (n) as shown in the following table, it is judged that the primary frequency f of rotation of the drive wheels 19 and the natural frequency of the drive system match.

| Shift position | Vehicle speed |
|---|---|
| 2nd speed | GL(2) < SPD < GH(2) |
| 3rd speed | GL(3) < SPD < GH(3) |
| 4th speed | GL(4) < SPD < GH(4) |
| 5th speed | GL(5) < SPD < GH(5) |

Here, GL(n) (n=2, 3, 4, or 5) shows a vehicle speed about 3 km/h lower than a specific vehicle speed SPD0 for different shift positions (n), while GH(n) (n=2, 3, 4, or 5) shows a vehicle speed about 3 km/h higher than a specific vehicle speed SPD0 for different shift positions (n). For example, if the specific vehicle speed SPD0 when the shift position (n) is 2nd speed (n=2) is 55 km/h, GL(2) is made 52 km/h and GH(2) is made 58 km/h.

In the second embodiment, when it is judged that the vehicle speed SPD is between the GL(n) and GH(n) for the different shift positions (n), the correction of the air-fuel ratio is prohibited. As a result, it is possible to prevent the air-fuel ratio from deviating widely to the rich side.

Figure 33:
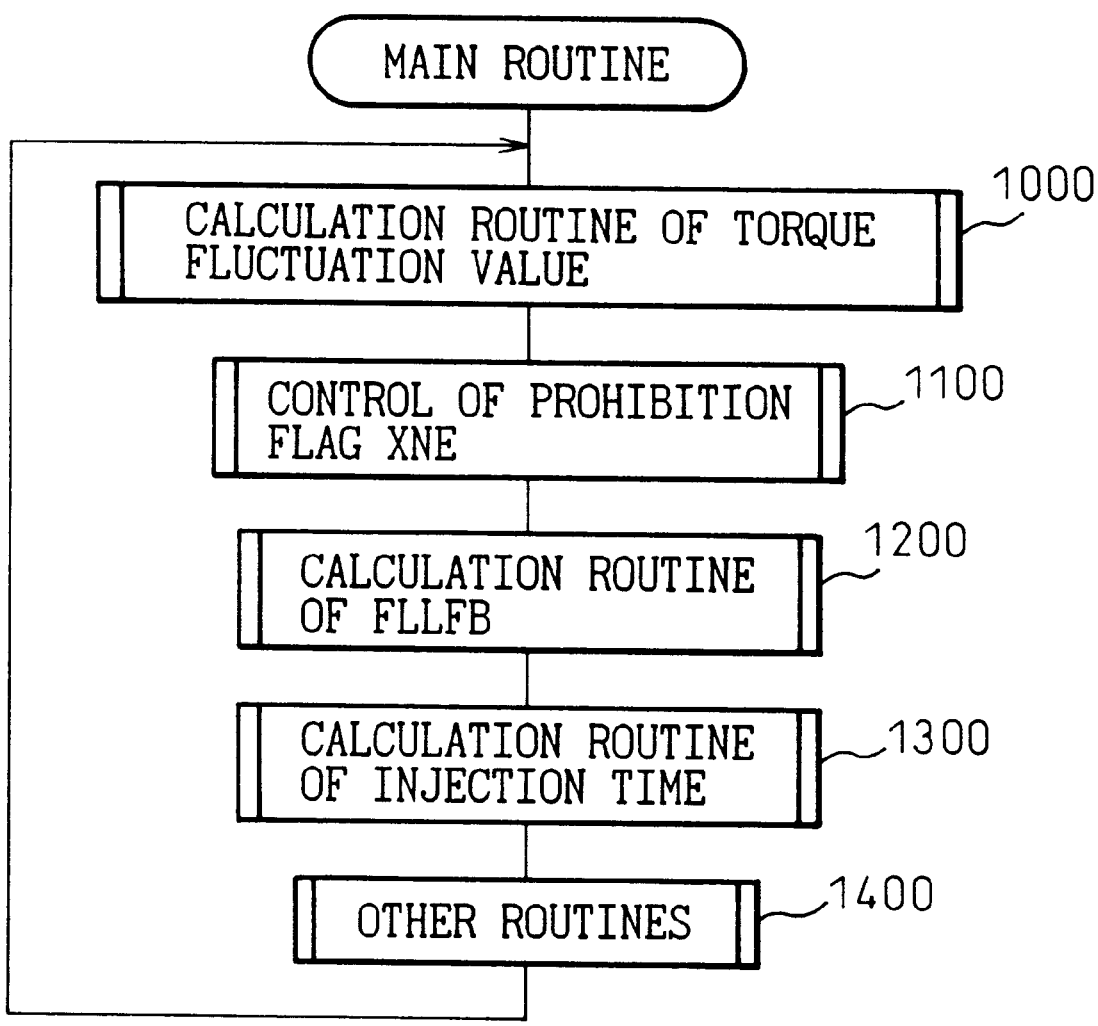
FIG. 33 is a flowchart of another embodiment of the main routine.
Figure 34:
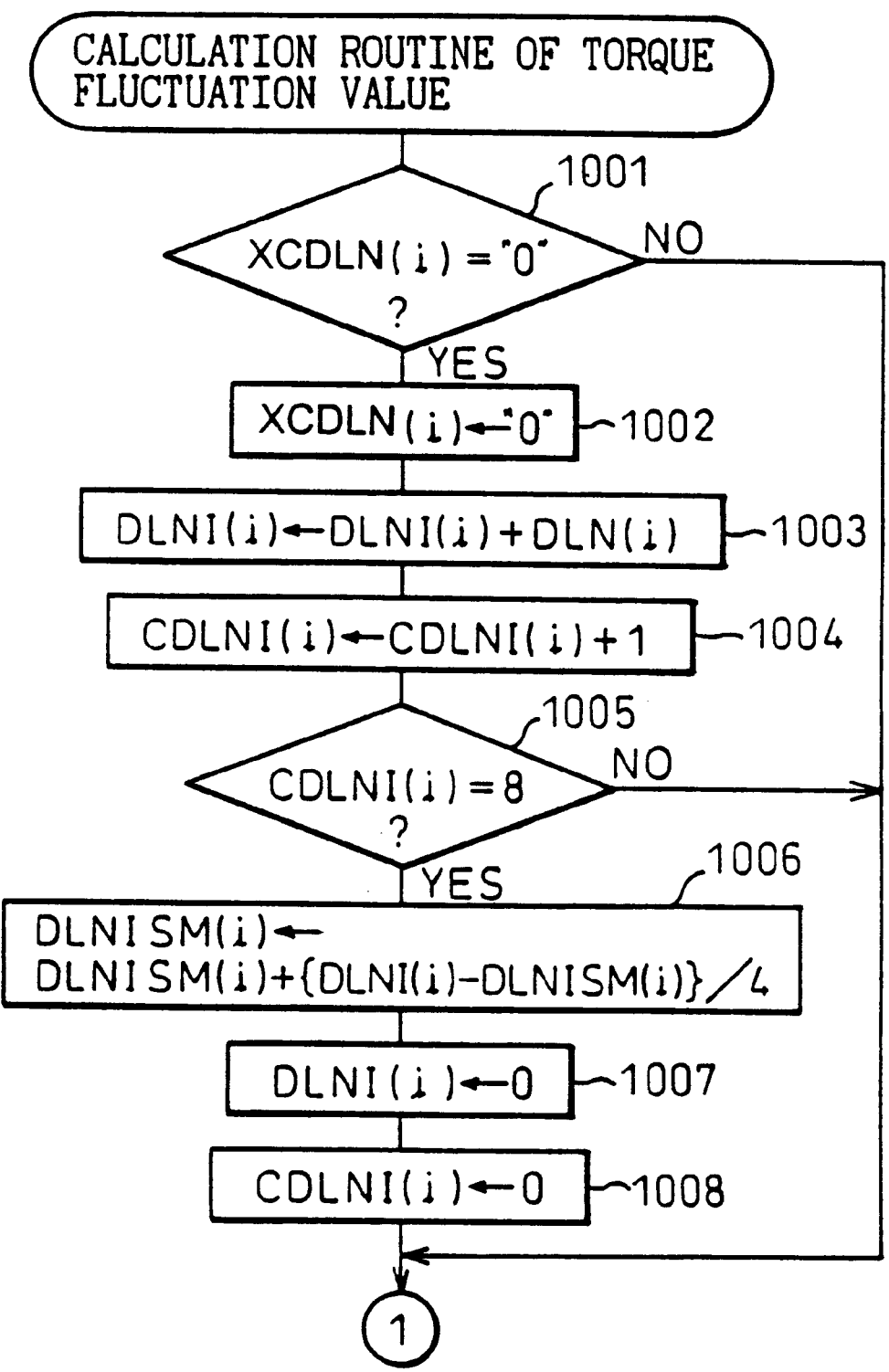
FIGS. 34 and 35 are flowcharts for calculating the amount of fluctuation of torque.
Figure 35:
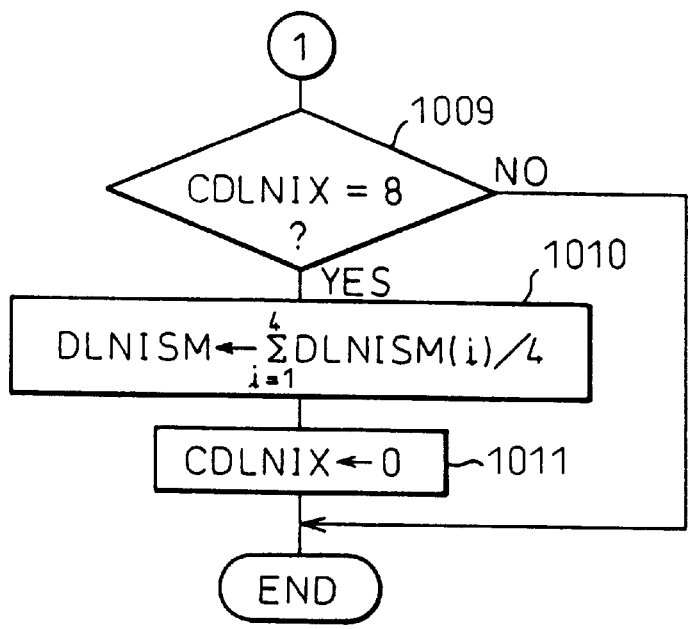
Figure 36:
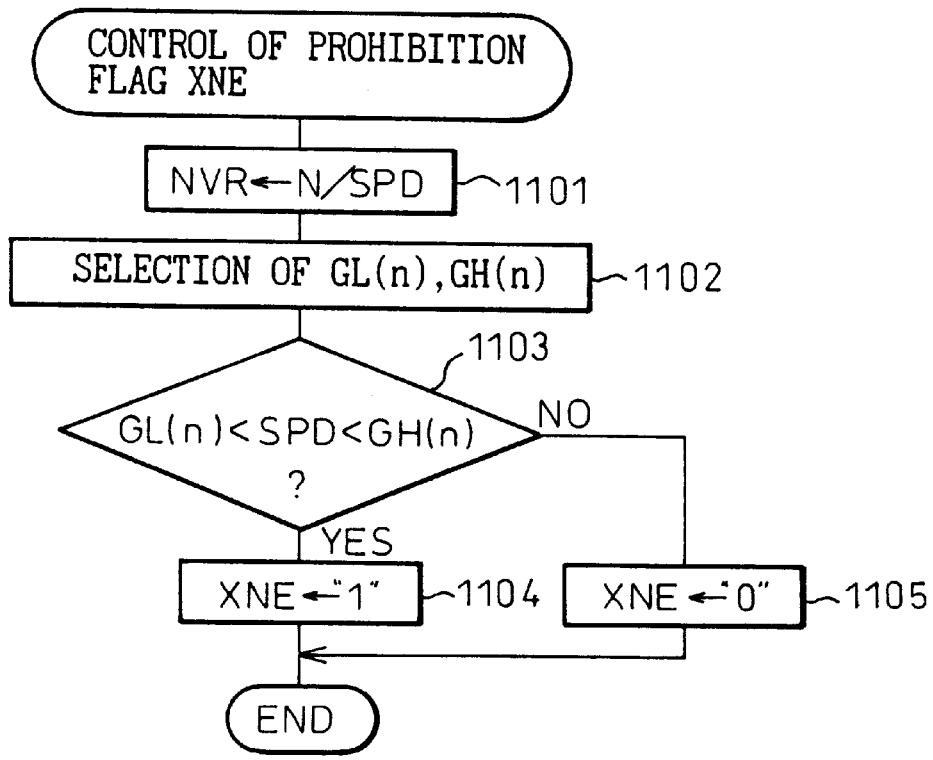
FIG. 36 is a flowchart for the control of the prohibition flag XNE.
Figure 37:
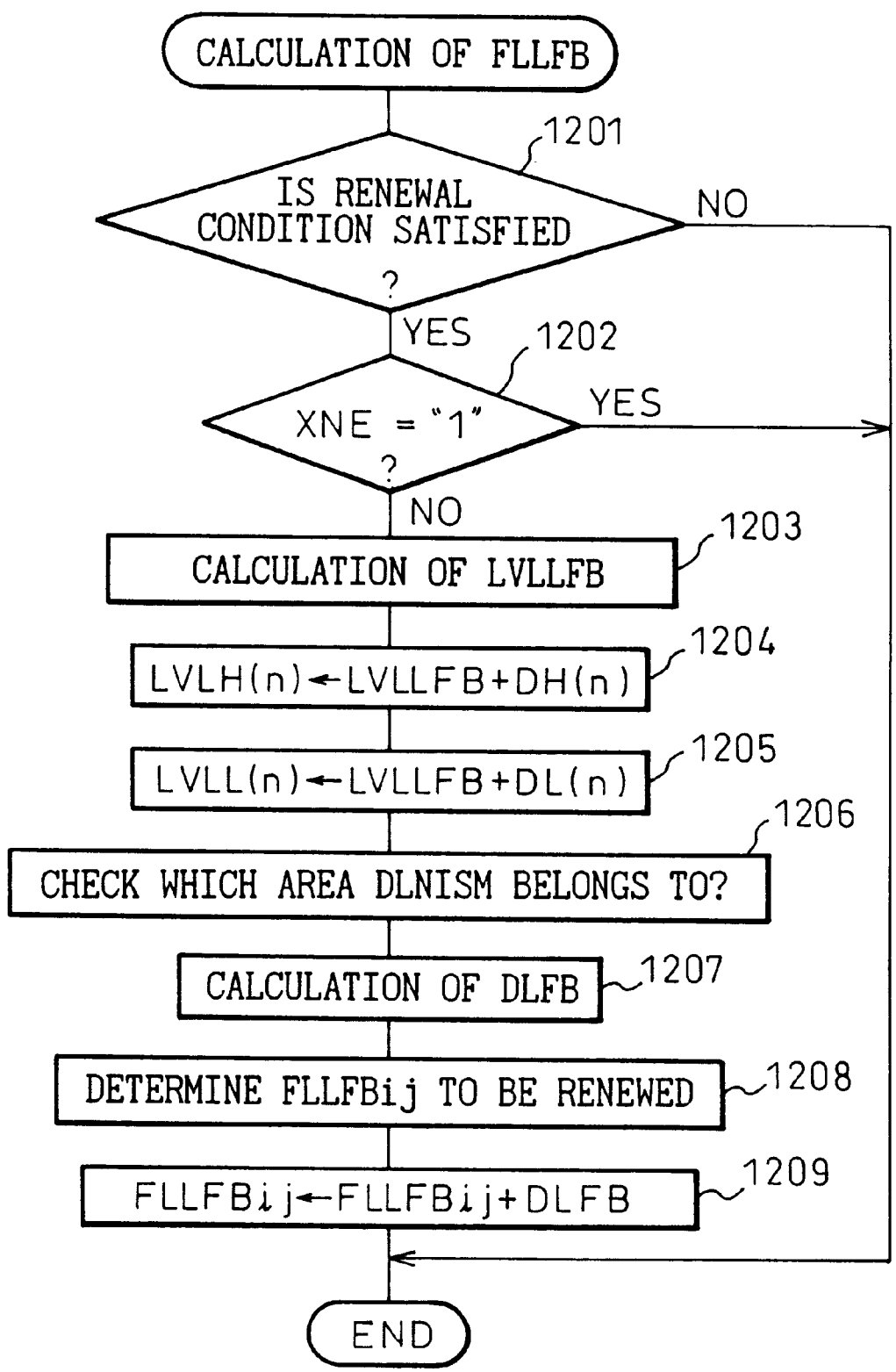
FIG. 37 is a flowchart for calculating the lean limit feedback correction coefficient.
Figure 38:
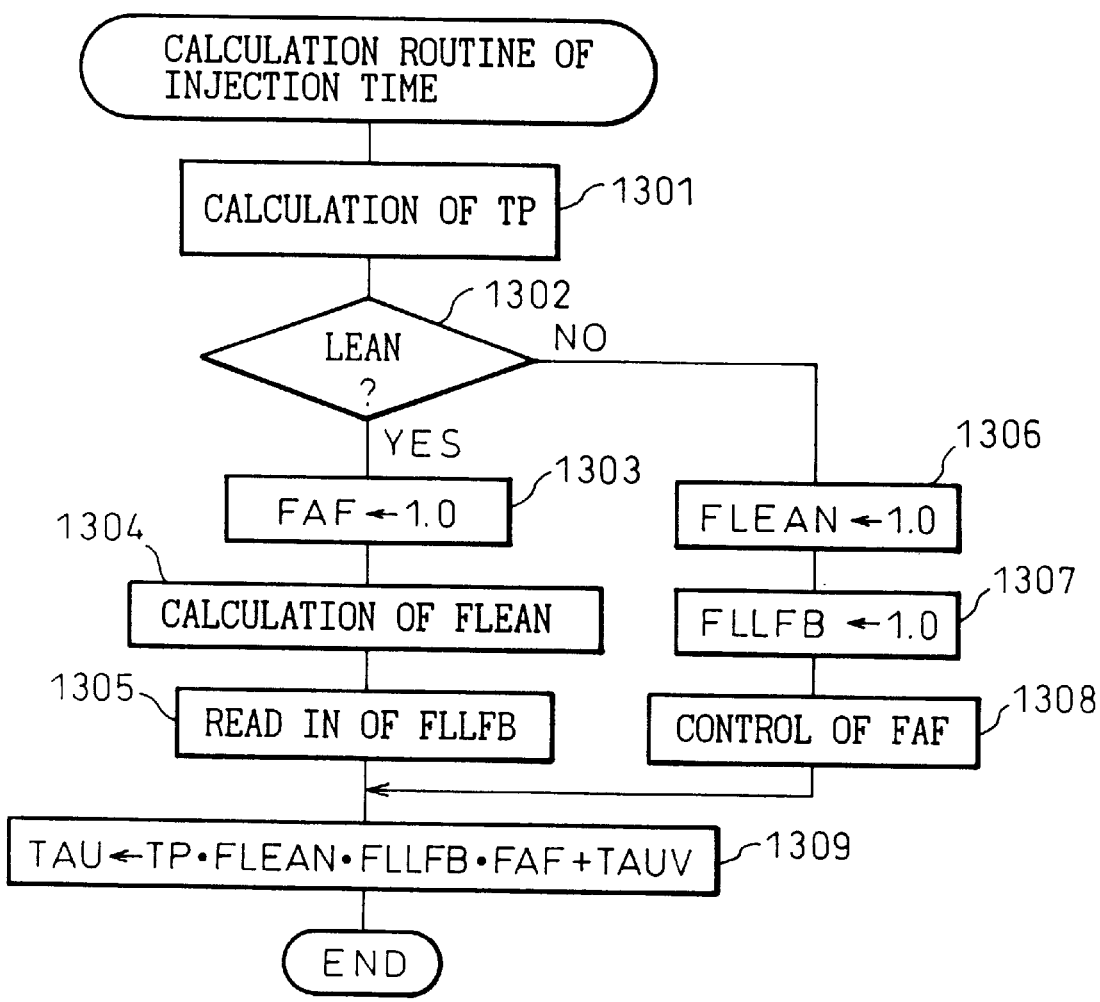
FIG. 38 is a flowchart for calculating the fuel injection time.

FIG. 33 shows the repeatedly executed main routine. In this main routine, first the routine for calculation of the torque fluctuation value (step 1000) is executed. This routine is shown in FIG. 34 and FIG. 35. Next, the routine for control of the prohibition flag XNE (step 1100) is executed. This routine is shown in FIG. 36. Next, the routine for calculation of the lean limit feedback correction coefficient FLLFB (step 1200) is executed. This routine is shown in FIG. 37. Next, when the predetermined crank angle is reached, the routine for calculation of the injection time (step 1300) is executed. This routine is shown in FIG. 38. Next, the other routines (step 1400) are executed.

Next, the routine for calculation of the torque fluctuation value shown in FIG. 34 and FIG. 35 will be explained.

Referring to FIG. 34 and FIG. 35, first, at step 1001, whether the cumulative addition request flag XCDLN(i) showing that the amount of torque fluctuation DLN(i) should be cumulatively added is set (XCDLN(i)="1") or not is judged. When the cumulative addition request flag XCDLN(i) is not set, step 1009 is jumped to, while when the cumulative addition request flag XCDLN(i) is set, step 1002 is proceeded to. At step 1002, the cumulative addition request flag XCDLN(i) is reset. Next, at step 1003, the amount of torque fluctuation DLN(i) is added to the cumulative value DLNI(i) of the amount of torque fluctuation. Next, at step 1004, the cumulative count value CDLNI(i) is incremented by exactly 1. That is, as explained above, for example, at step 1001, if the cumulative addition request flag XCDLN(1) is set for the No. 1 cylinder, this flag XCDLN(1) is reset at step 1002, the cumulative value DLN(1) of the amount of torque fluctuation is calculated at step 1003, and the cumulative count value CDLNI(1) is incremented by exactly 1 at step 1004.

Next, at step 1005, whether the cumulative count value CDLNI(i) has become "8" or not is judged. When CDLNI(i) is not "8", step 1009 is jumped to, while when CDLNI(i) becomes "8", step 1006 is proceeded to, where the torque fluctuation value DLNISM(i) of the cylinders is calculated from the following equation:

$$DLNISM(i)=DLNISM(i)+\{DLNI(i)-DLNISM(i)\}/4$$

Next, at step 1007, the cumulative value DLNI(i) of the amount of torque fluctuation for the cylinders is cleared. Next, at step 1008, the cumulative count value CDLNI(i) is reset.

That is, when there is a difference between the calculated cumulative value DLNI(i) of the amount of torque fluctuation and the previously used amount of torque fluctuation DLNISM(i), the value of the difference {DLNI(i)−DLNISM(i)} multiplied by ¼ is added to the amount of torque fluctuation DLNISM(i). Therefore, for example, when the cumulative count value CDLNI(1) for the No. 1 cylinder #1 becomes "8", at step 1006, the torque fluctuation value DLNISM(1) is calculated.

Next, at step 1009, whether the count value CDLNIX calculated at the routine shown in FIG. 24 has become "8" or not is judged. When CDLNIX is not "8", the processing cycle is ended, while when CDLNIX becomes "8", step 1010 is proceeded to, where the mean value DLNISM (={DLNISM(1)+DLNISM(2)+DLNISM(3)+DLNISM(4)}/4) of the mean torque fluctuation values DLNISM(i) of the cylinders is calculated. Next, at step 1011, the count value CDLNIX is cleared. In this way value DLNISM expressing the amount of torque fluctuation of the engine is calculated.

Note that, as explained above, the count value CDLNIX is incremented by exactly 1 with each 720° crank angle. Unless the calculation of the torque is prohibited for one of the cylinders, when the count value CDLNIX has become "8", the cumulative count values CDLNI(1), CDLNI(2), CDLNI(3), and CDLNI(4) for all of the cylinders have already become "8". Therefore, in this case, the torque fluctuation value DLNISM(i) for all of the cylinders is claculated. On the other hand, for example, if the calculation of the amount of torque fluctuation for the No. 1 cylinder #1 is prohibited, when the count value CDLNIX has become "8", just the cumulative count value CDLNI(1) of the No. 1 cylinder #1 does not become "8", so that new cumulative value DLNI(1) of the amount of torque fluctuation for the No. 1 cylinder #1 is not calculated. Therefore, in this case, when finding the mean torque fluctuation value DLNISM at step 1010, the previously calculated torque fluctuation value DLNISM(1) is used just for the No. 1 cylinder #1.

Next, the routine for calculation of FLLFB will be explained referring to FIG. 36.

Referring to FIG. 36, first, at step 1101, the shift position (n) of the transmission 18 is found from the value NVR (=N/SPD) obtained by dividing the engine speed N by the vehicle speed SPD. Next, at step 1102, the value of GL(n) and GH(n) showing the range of the vehicle speed SPD for the different shift positions (n) is selected. For example, when it is judged at step 1101 that the shift position (n) is 2nd speed (n=2), GL(2) is made 52 km/h and GH(2) is made 58 km/h at step 1102.

Next, at step 1103, it is judged if the vehicle speed SPD is between GL(n) and GH(n) for the different shift positions (n). When SPD ≦GL(n) or when SPD ≧GH(n), speed 1105 is proceeded to, where the prohibition flag XNE is reset (XNE←"0"). As opposed to this, when GL(n)<SPD<GH(n), step 1104 is proceeded to, where the prohibition flag XNE is set (XNE←"1"). If the prohibition flag XNE is set, the correction of the air-fuel ratio is prohibited as explained later.

Referring to FIG. 37, first, at step 1201, whether the conditions for updating the lean limit feedback correction coefficient FLLFB are satisfied or not is judged. For example, at the time of engine warmup or when the operating state of the engine is not in the learning region enclosed by the broken lines in FIG. 5, it is judged that the conditions for updating are not satisfied, while at other times it is judged that the conditions for updating are satisfied. When the conditions for updating are not satisfied, the processing cycle is ended, while when the conditions for updating are satisfied, step 1202 is proceeded to.

At step 1202, it is judged if the prohibition flag XNE is set or not. When the prohibition flag XNE is set (XNE="1"), the processing cycle is ended. At this time, the correction of the air-fuel ratio is prohibited. As opposed to this, when the prohibition flag XNE is reset (XNE="0"), step 1203 is proceeded to.

At step 1203, the target torque fluctuation value LVLLPB is calculated from the engine load Q/N and the engine speed N based on the map shown in FIG. 26B. Next, at step 1204 and step 1205, the levels of torque fluctuation LVLH(n) and LVLL(n) shown in the following equations are calculated based on the fluctuation amount judgement values DH(n) and DL(n) in accordance with the target torque fluctuation value LVLLFB:

$$LVLH(n)=LVLLFB+DH(n)$$
$$LVLL(n)=LVLLFB+DL(n)$$

Here, the fluctuation amount judgement values DH(n) and DL(n) are determined in advance as shown in FIG. 27A.

When the levels of torque fluctuation LVLH(n) and LVLL (n) are calculated at step 1204 and step 1205, step 1206 is proceeded to, where whether the mean torque fluctuation value DLNISM calculated in the routine for calculation of the torque fluctuation value shown in FIG. 34 and FIG. 35 is between the levels of torque fluctuation LVLH(n) and LVLL(n) shown i FIG. 27B or not is judged. Next, at step 1206, the corresponding feedback correction value DLFB is calculated.

Next, at step 1208, what lean limit feedback correction coefficient of which learning region shown in FIG. 5 the lean limit feedback correction coefficient FLLFBij to be updated based on the average value of the engine speed $N_{AVE}$ and the average value $PM_{AVE}$ of the amount of intake air Q found at step 1209 of the processing routine of CDLNIX shown in FIG. 5 is determined. Next, at step 1209, the lean limit feedback correction coefficient FLLFBij determined at step 1208 is increased by the feedback correction value DLFB.

Next, the routine for calculation of the fuel injection time will be explained with reference to FIG. 38.

Referring to FIG. 38, first, at step 1301, the basic fuel injection time TP is calculated from the map shown in FIG. 2. Next, at step 1302, whether the operating state is one in which a lean operation should be performed or not is judged. When the operating state is one in which a lean operation should be performed, step 1303 is proceeded to, where the value of the stoichiometric air-fuel ratio feedback correction coefficient FAF is fixed at 1.0. Next, at step 1304, the lean correction coefficient FLEAN is calculated from the map shown in FIG. 4, then at step 1305, the lean limit feedback correction coefficient FLLFB is read from the map shown in FIG. 5. Next, at step 1309, the fuel injection time TAU is calculated from the following equation:

$$TAU = TP \cdot FLEAN \cdot FLLFB \cdot FAF + TAUV$$

As opposed to this, when it is judged at step 1302 that the operating state is not one where a lean operation should be performed, that is, when the air-fuel ratio should be made the stoichiometric air-fuel ratio, step 1306 is proceeded to, where the lean correction coefficient FLEAN is fixed at 1.0, then, at step 1307, the lean limit feedback correction coefficient FLLFB is fixed at 1.0. Next, at step 1308, the stoichiometric air-fuel ratio feedback correction coefficient FAF is controlled based on the output signal of the air-fuel ratio sensor 17 so that the air-fuel ratio becomes the stoichiometric air-fuel ratio. Next, step 1309 is proceeded to, where the fuel injection time TAU is calculated.

In this way, in the second embodiment, the correction of the air-fuel ratio is prohibited in an operating state where the natural frequency of the engine drive system and the primary frequency of the rotation of the drive system match, so it is possible to prevent the air-fuel ratio from deviating to the rich side of the optimal air-fuel ratio.

While the invention has been described by reference to specific embodiments chosen for purposes of illustration, it should be apparent that numerous modifications could be made thereto by those skilled in the art without departing from the basic concept and scope of the invention.

What is claimed is:

1. A method of detection of output fluctuation of a multi-cylinder engine having a crankshaft in which combustion is performed in a first cylinder and then combustion is performed in a second cylinder, comprising the steps of:

setting a first crank angle range in a crank angle region in a middle portion of the expansion stroke a predetermined crank angle away from the first crank angle range;

detecting a first angular velocity of the crankshaft in the second crank angle range;

detecting a second angular velocity of the crankshaft in the second crank angle range;

finding an amount of change between the first angular velocity at a time of a previous combustion and the first angular velocity at another time of a next combustion for the first cylinder;

finding an amount of change between the first angular velocity at the time of a previous combustion and the first angular velocity at the another time of a next combustion for the second cylinder;

finding an assumed second angular velocity at the time of the next combustion of the first cylinder when assuming that the output of the first cylinder will not fluctuate, on a basis of the amount of change of the first angular velocity for the first cylinder, the amount of change of the first angular velocity of the second cylinder, and the second angular velocity at the time of the previous combustion of the first cylinder; and detecting the output fluctuation of the first cylinder based on the assumed second angular velocity and an actual second angular velocity at the another time of the next combustion of the first cylinder.

2. A method of detection of output fluctuation as set forth in claim 1, wherein an assumed amount of change between the second angular velocity at the time of the previous combustion and the second angular velocity at the time of the another next combustion of the first cylinder, which change is obtained when asssuming that the output of the first cylinder does not fluctuate, is found from an interpolated value between the amount of change of the first angular velocity for the first cylinder and the amount of change of the first angular velocity for the second cylinder and said assumed amount of change is added to the second angular velocity of the time of the previous combustion in the first cylinder to find the assumed second angular velocity.

3. A method of detection of output fluctuation as set forth in claim 2, wherein said interpolated value is calculated based on the following equation:

Interpolated value={(Crank angle between the second crank angle range of the first cylinder and the first crank angle range of the second cylinder)·(amount of change of the first angular velocity of the first cylinder)+(crank angle between the first crank angle range of the first cylinder and the second crank angle range of the first cylinder)·(amount of change of first angular velocity of said second cylinder)}/Crank angle between the first crank angle range of the first cylinder and the first crank angle range of the second cylinder.

4. A method of detection of output fluctuation as set forth in claim 1, wherein an amount of the output fluctuation of the first cylinder is found from a difference between said actual second angular velocity and said assumed second angular velocity.

5. A method of detection of output fluctuation as set forth in claim 1, wherein an amount of output torque fluctuation of the first cylinder is found from a difference between a square of said actual first angular velocity and a square of said assumed second angular velocity.

6. A method of detection of output fluctuation as set forth in claim 5, wherein the amount of output torque fluctuations is found for each cylinder and an amount of output torque fluctuations of the engine is found from these amounts of output torque fluctuation.

7. A method of detection of output fluctuation as set forth in claim 5, comprising the steps of finding a cumulative value of the amount of torque fluctuation by cumulatively adding successively calculated amounts of torque fluctuation by exactly a predetermined number of times for each cylinder, finding a representative value of the amount of torque fluctuation for each cylinder based on the cumulative value of the amount of torque fluctuation, and finding an average torque fluctuation value for all cylinders, which is an average value of the representative values of the cylinders.

8. A method of detection of output fluctuation as set forth in claim 7, wherein when there is a difference between the current representative value and the cumulative value of the amount of torque fluctuation, the representative value is updated to reduce the difference.

9. A method of detection of output fluctuation as set forth in claim 5, wherein the amount of change of the first angular velocity is found for each cylinder, the amplitude of the fluctuation of the amount of change of the first angular velocity is found, and, when the amplitude becomes larger than a predetermined amplitude, a calculation of a amount of output torque fluctuation of the cylinder giving a maximum or minimum amount of change of the first angular velocity is prohibited.

10. A method of detection of output fluctuation as set forth in claim 5, wherein when the difference between the amount of change of the first angular velocity of the cylinder where combustion had been performed previously and the amount of change of the first angular velocity of the cylinder where combustion had been performed next is larger by a certain ratio than a difference between the amount of change of the first angular velocity of the cylinder where combustion had been performed next and the amount of change of the first angular velocity of the cylinder where combustion is performed next after that, a calculation of the amount of output torque fluctuation of the cylinder where combustion had been performed second is prohibited.

11. A method of detection of output fluctuation as set forth in claim 1, wherein when a supply of fuel is stopped during engine operation, an average rate of decrease of the first angular velocity is found, a first angular velocity assuming a decrease by said average rate of decrease is found, and an actually detected first angular velocity is corrected based on an amount of deviation of the actually detected first angular velocity with respect to the first angular velocity assuming a decrease by said average rate of decrease.

12. A method of detection of output fluctuation as set forth in claim 11, wherein said amount of deviation is calculated a predetermined number of times and the actually detected first angular velocity is corrected based on an average value of the amount of deviation calculated a predetermined number of times.

13. A method of detection of output fluctuation as set forth in claim 11, wherein a predetermined ratio of the amount of deviation corrects for the first angular velocity so that the actually detected first angular velocity gradually becomes equal to the first angular velocity assuming a decrease by said average rate of decrease.

14. A method of detection of output fluctuation as set forth in claim 1, wherein when a supply of fuel is stopped during engine operation, an average rate of decrease of the second angular velocity is found, a second angular velocity assuming a decrease by said average rate of decrease is found, and the actually detected second angular velocity is corrected based on an amount of deviation of an actually detected second angular velocity with respect to the second angular velocity assuming a decrease by said average rate of decrease.

15. A method of detection of output fluctuation as set forth in claim 14, said amount of deviation is calculated a predetermined number of times and the actually detected second angular velocity is corrected based on the average value of the amount of deviation calculated a predetermined number of times.

16. A method of detection of output fluctuation as set forth in claim 14, wherein a predetermined ratio of deviation corrects for the second angular velocity so that the actually detected second angular velocity gradually becomes equal to the second angular velocity assuming a decrease by said average rate of decrease.

17. A method of detection of output fluctuation as set forth in claim 1, wherein a determination is made if an operating state is one in which an inherent frequency of an engine drive system and a primary frequency of rotation of drive wheels match and when the operating state is one in which the inherent frequency of the engine drive system and the primary frequency of rotation of the drive wheels match, correction of an air-fuel ratio based on the output fluctuation is prohibited.

18. A method of detection of output fluctuation as set forth in claim 17, wherein when a vehicle speed is in a predetermined range, a determination is made that the inherent frequency of the engine drive system and the primary frequency of rotation of the drive wheels match.

19. A method of detection of output fluctuation as set forth in claim 18, wherein the predetermined range of vehicle speed is determined individually for each shift position of a transmission.

* * * * *